US012123306B2

(12) United States Patent
Trivedi et al.

(10) Patent No.: US 12,123,306 B2
(45) Date of Patent: Oct. 22, 2024

(54) SEAL ASSEMBLIES FOR TURBINE ENGINES AND RELATED METHODS

(71) Applicant: General Electric Company, Schenectady, NY (US)

(72) Inventors: Deepak Trivedi, Halfmoon, NY (US); Rahul Anil Bidkar, Niskayuna, NY (US); Bugra Han Ertas, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 7 days.

(21) Appl. No.: 17/851,672

(22) Filed: Jun. 28, 2022

(65) Prior Publication Data

US 2023/0417148 A1 Dec. 28, 2023

(51) Int. Cl.
*F01D 11/00* (2006.01)
*F01D 11/08* (2006.01)

(52) U.S. Cl.
CPC ........ *F01D 11/08* (2013.01); *F05D 2220/323* (2013.01); *F05D 2240/55* (2013.01)

(58) Field of Classification Search
CPC ........ F01D 11/00; F01D 11/001; F01D 11/02; F01D 11/005; F01D 11/025; F05D 2240/55; F05D 2220/323; F16J 15/44; F16J 15/445
See application file for complete search history.

(56) References Cited

U.S. PATENT DOCUMENTS

| | | | | |
|---|---|---|---|---|
| 3,119,623 | A | 1/1964 | Shevchenko | |
| 6,572,115 | B1 * | 6/2003 | Sarshar ................ | F16J 15/3288 277/412 |
| 6,692,006 | B2 | 2/2004 | Holder | |
| 6,840,519 | B2 * | 1/2005 | Dinc ...................... | F16J 15/445 277/303 |
| 9,255,642 | B2 | 2/2016 | Bidkar et al. | |
| 9,359,908 | B2 | 6/2016 | Bidkar et al. | |
| 10,161,259 | B2 | 12/2018 | Gibson et al. | |
| 10,443,424 | B2 | 10/2019 | McCaffrey | |
| 10,563,772 | B2 * | 2/2020 | Trivedi ................ | F16J 15/0887 |

(Continued)

OTHER PUBLICATIONS

Grondahl et al., Film Riding Leaf Seals for Improved Shaft Sealing, GT2010-23629, Proceedings of ASME Turbo Expo 2010: Power for Land, Sea and Air, Glasgow, UK, Jun. 14-18, 2020, 8 Pages.

*Primary Examiner* — David E Sosnowski
*Assistant Examiner* — Maxime M Adjagbe
(74) *Attorney, Agent, or Firm* — Dority & Manning, P.A.

(57) ABSTRACT

A seal assembly for an aeronautical turbine engine includes a passive flow regulator. The passive flow regulator includes a seal body defining an aspiration conduit, and a flow constrictor disposed within and/or adjacently upstream of the aspiration conduit. The aspiration conduit provides fluid communication across the seal body from a relatively higher-pressure fluid volume to a relatively lower-pressure fluid volume. The flow constrictor includes one or more flexure elements that move in one or more degrees of freedom as a result of changes in a pressure differential across the flow constrictor. The movement of the one or more flexure elements changes a hydraulic resistance of fluid flow past the flow constrictor based at least in part on a position of the flow constrictor in relation to the aspiration conduit.

20 Claims, 17 Drawing Sheets

(56) References Cited

U.S. PATENT DOCUMENTS

| | | | |
|---|---|---|---|
| 10,895,324 | B2 | 1/2021 | Tran et al. |
| 10,920,593 | B2 | 2/2021 | Millier et al. |
| 11,035,242 | B2 | 6/2021 | Morliere et al. |
| 2006/0216143 | A1 | 9/2006 | Trinks et al. |
| 2012/0248704 | A1 | 10/2012 | Fennell et al. |
| 2018/0058241 | A1* | 3/2018 | Sarawate .................. F01D 5/02 |

* cited by examiner

SEAL ASSEMBLIES FOR TURBINE ENGINES AND RELATED METHODS

FIELD

The present disclosure generally pertains to seal assemblies for rotary machines, and more particularly, to aspirating seals for rotary machines such as turbine engines, as well as methods of operating a rotary machine that includes a seal assembly.

BACKGROUND

Rotary machines such as gas turbine engines have seals between rotating components (e.g., rotors) and corresponding stationary components (e.g., stators). These seals may help to reduce leakage of fluids between the rotors and stators. These seals may additionally or alternatively help separate fluids that have respectively different pressures and/or temperatures. The sealing properties of a seal may impact not only the amount of leakage and/or separation of fluids, but also the overall operation and/or operating efficiency of the rotary machine. Accordingly, it would be welcomed in the art to provide improved seal assemblies for rotary machines such as turbine engines, as well as improved methods of sealing an interface between a rotor and a stator of a rotary machine.

BRIEF DESCRIPTION OF THE DRAWINGS

A full and enabling disclosure, including the best mode thereof, directed to one of ordinary skill in the art, is set forth in the specification, which makes reference to the appended figures, in which.

DETAILED DESCRIPTION

Figure 1:
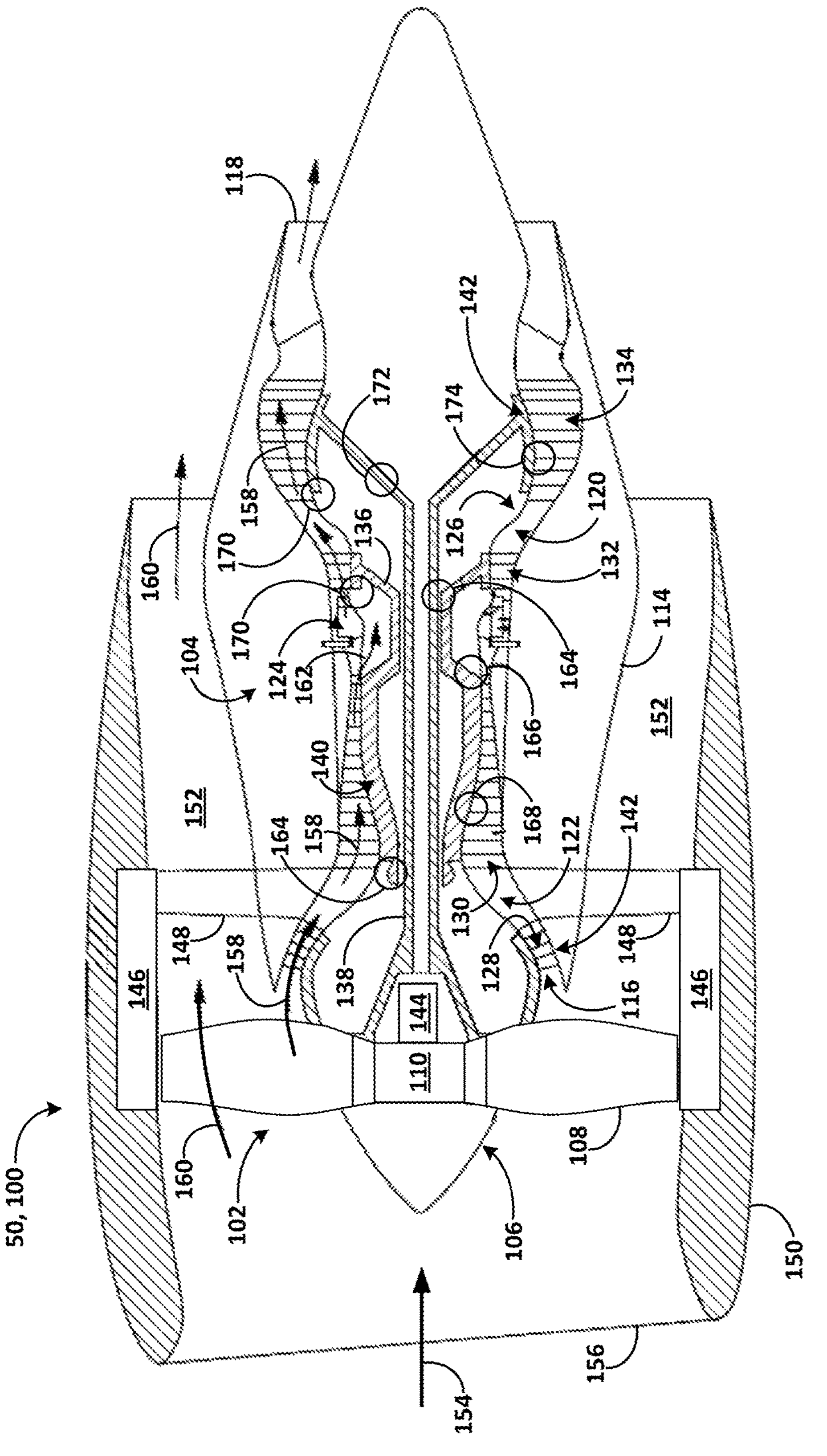
FIG. 1 shows a schematic cross-sectional view of an exemplary rotary machine that includes a turbine engine.

Reference will now be made in detail to embodiments of the present disclosure, one or more examples of which are illustrated in the accompanying figures. The present disclosure uses numerical and letter designations to refer to features in the figures. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

As used herein, the terms "first", "second", and "third" may be used interchangeably to distinguish one component from another and are not intended to signify location or importance of the individual components.

The term "turbomachine" refers to a machine including one or more compressors, a heat generating section (e.g., a combustion section), and one or more turbines that together generate a torque output.

The term "turbine engine" refers to an engine having a turbomachine as all or a portion of its power source. Example turbine engines include open rotor turbine engines, turbofan engines, turboprop engines, turbojet engines, turboshaft engines, etc. Exemplary turbine engines include gas turbine engines, such as the aforementioned turbine engines that utilize a gas fuel source, as well as hybrid-electric versions of these engines. Exemplary turbine engines include aeronautical turbine engines, as well as turbine engines configured for land or marine based use.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., –er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, the term "rated speed" with reference to a rotary machine, such as a gas turbine engine, refers to a maximum rotational speed that the rotary machine may achieve while operating properly. For example, the rotary machine may be operating at the rated speed during maximum load operations, such as during takeoff operations.

As used herein, the term "cruising speed" refers to operation of a turbine engine utilized to power an aircraft that may operate at a cruising speed when the aircraft levels after climbing to a specified altitude. A turbine engine may operate at a cruising speed that is from 50% to 90% of a rated speed, such as from 70% to 80% of the rated speed. In some embodiments, a cruising speed may be achieved at about 80% of full throttle, such as from about 50% to about 90% of full throttle, such as from about 70% to about 80% full throttle. As used herein, the term "cruise flight" refers to a phase of flight in which an aircraft levels in altitude after a climb phase and prior to descending to an approach phase. In various examples, cruise flight may take place at a cruise altitude up to approximately 65,000 ft. In certain examples, cruise altitude is between approximately 28,000 ft. and approximately 45,000 ft. In yet other examples, cruise altitude is expressed in flight levels (FL) based on a standard air pressure at sea level, in which cruise flight is between FL280 and FL650. In another example, cruise flight is between FL280 and FL450. In still certain examples, cruise altitude is defined based at least on a barometric pressure, in which cruise altitude is between approximately 4.85 psia and approximately 0.82 psia based on a sea-level pressure of approximately 14.70 psia and sea-level temperature at approximately 59 degrees Fahrenheit. In another example, cruise altitude is between approximately 4.85 psia and approximately 2.14 psia. It should be appreciated that, in certain examples, the ranges of cruise altitude defined by pressure may be adjusted based on a different reference sea-level pressure and/or sea-level temperature.

As used herein, the term "nominal operating state" refers to operation of a rotary machine, such as a turbine engine, at a speed that is greater than an idle speed and less than a rated speed for the rotary machine. For example, nominal operating state may include an operating speed that is at least 10% greater than an idle speed and at least 10% less than the rated speed. As an example, a nominal operating state may include operating at a cruising speed.

As used herein, the term "low-power operating state" refers to operation of a rotary machine, such as a turbine engine, at an idle speed or at a speed that is less than 10% greater than the idle speed for the rotary machine.

As used herein, the term "high-power operating state" refers to operation of a rotary machine, such as a turbine engine, at a rotational speed that is at least 90% of a rated speed for the engine.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

For purposes of the present disclosure, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the term "nominal operating conditions" refers to operation of a rotary machine, such as a turbine engine, at a rotational speed that is greater than an idle speed and less than a rated speed for the rotary machine. For example, nominal operating conditions may include a rotational speed that is at least 10% greater than the idle speed and at least 10% less than the rated speed.

As used herein, the term "cruise operating conditions" refers to operation of a rotary machine, such as a turbine engine, at a relatively high rotational speed for a sustained period of time. For example, a rotary machine, such as a turbine engine, utilized to power an aircraft may exhibit cruise operating conditions when the aircraft levels after a claim to a specified altitude. In some embodiments, a rotary machine may exhibit cruise operating conditions at a rotational speed that is from about 50% to about 90% of the rated speed, such as from about 70% to about 80% of the rated speed.

As used herein, the term “rotor” refers to any component of a rotary machine, such as a turbine engine, that rotates about an axis of rotation. By way of example, a rotor may include a shaft or a spool of a rotary machine, such as a turbine engine.

As used herein, the term “stator” refers to any component of a rotary machine, such as a turbine engine, that has a coaxial configuration and arrangement with a rotor of the rotary machine. A stator may be stationary or may rotate about an axis of rotation. A stator may be disposed radially inward or radially outward along a radial axis in relation to at least a portion of a rotor. Additionally, or in the alternative, a stator may be disposed axially adjacent to at least a portion of a rotor.

As used herein, the terms “integral”, “unitary”, “monolithic,” or “monolithically integrated” as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

As used herein the term “coupled” refers to both direct coupling, fixing, or attaching, as well as indirect coupling, fixing, or attaching through one or more intermediate components or features, unless otherwise specified herein.

The present disclosure generally provides seal assemblies for rotary machines. Exemplary embodiments may be particularly suitable for turbomachines, such as turbine engines, and the like. The presently disclosed seal assemblies include aspirating seals that provide a thin film of fluid between a face of the seal and a face of the rotor. The thin film of fluid may be provided by a one or more aspiration conduits that allow fluid, such as pressurized air or gasses within a turbine engine to flow from a higher-pressure region on one side of the seal assembly to a lower-pressure region on another side of the seal assembly. The fluid flowing through the aspiration conduits provides a thin film of pressurized fluid between the seal face and the rotor face. The thin film of pressurized fluid may act as a fluid bearing, such as a gas bearing, that inhibits contact between the seal and the rotor. For example, the fluid bearing may be a hydrostatic bearing, an aerostatic bearing, or the like.

The presently disclosed seal assemblies include one or more passive flow regulators configured to change a hydraulic resistance of the one or more aspiration conduits. Such passive flow regulators may sometimes additionally or alternatively be referred to as a pressure-actuated flow regulator. The one or more passive flow regulators respectively include one or more flow constrictors that flex, bend, hinge, or otherwise move as a result of changes in a pressure of the fluid supplied to the corresponding one or more aspiration conduits. Movement of the one or more flow constrictors may change one or more dimensions, such as a cross-sectional area and/or width of the corresponding one or more aspiration conduits. The hydraulic resistance of the corresponding one or more aspiration conduits depends at least in part on such one or more dimensions. Thus, movement of the one or more flow constrictors passively regulate the flow of fluid through the corresponding one or more aspiration conduits as a function of fluid pressure.

Movement of a passive flow regulator may be configured to augment a flow of fluid through one or more corresponding aspiration conduits in several advantageous ways, as disclosed herein. In some embodiments, a passive flow regulator may be configured to provide a substantially constant fluid flow rate through a corresponding one or more aspiration conduits over a specified pressure range. Additionally, or in the alternative, a passive flow regulator may be configured to provide an increasing flow rate and/or a decreasing flow rate over a specified pressure range. The hydraulic resistance and corresponding fluid flow through one or more aspiration conduits may depend at least in part on a fluid pressure upstream and/or downstream of the seal assembly and/or the passive flow regulator. Additionally, or in the alternative, the hydraulic resistance and corresponding fluid flow through the one or more aspiration conduits may depend at least in part on a pressure drop across the seal assembly and/or the passive flow regulator.

In some embodiments, the presently disclosed seal assemblies may include one or more passive flow regulators configured to provide a flow of fluid to a fluid bearing at a flow rate that corresponds to one or more operating conditions of a rotary machine. For example, the one or more passive flow regulators may provide a respectively suitable flow of fluid for a low-power operating state, a nominal operating state, and/or a high-power operating state. The respectively suitable flow may include a relatively constant flow over a range of operating conditions that include one or more of such operating states. For example, the one or more passive flow regulators may provide a relatively constant flow at respectively different pressure differentials corresponding to respectively different operating conditions, such as respectively different operating conditions corresponding to one or more of such operating states.

The presently disclosed seal assemblies may include one or more passive flow regulators configured to provide fluid to a fluid bearing at a suitable hydraulic stiffness over a range of operating conditions. The presently disclosed seal assemblies may exhibit improved tracking of rotor movements, including, for example, when operating with a relatively low pressure differential and/or during aberrant operating conditions. Additionally, or in the alternative, the presently disclosed seal assemblies may exhibit improved clearance and/or reduced tendency for rub events, including, for example, when operating with relatively high pressure differential and/or during aberrant operating conditions. Additionally, or in the alternative, the presently disclosed seal assemblies may be operated over a wider pressure differential range, for example, while maintaining a pressure differential above a lower-pressure differential threshold and/or while maintaining the pressure differential below an upper-pressure differential threshold. Such wider pressure differential range may be determined in relation to a comparative flow rate curve. Additionally, or in the alternative, the presently disclosed seal assemblies may be configured with tighter operating clearances, and/or suitable hydraulic stiffness may be realized at a relatively lower pressure differential. The presently disclosed seal assemblies may reduce rub events and/or allow wider range of operating conditions while maintaining suitable hydraulic stiffness, including, for example a suitable hydraulic stiffness at relatively low pressure differentials, for example, while also maintaining suitable fluid flow rates for desired sealing properties, including, for example, suitable fluid flow rates for desired sealing properties at relatively high pressure differentials.

As used herein, the term “hydraulic stiffness” refers to the extent to which a fluid volume decreases as a result of an increase in pressure. The hydraulic stiffness ($C_H$) of a fluid depends on the bulk modulus of the fluid (E). The hydraulic stiffness of a fluid may be determined according to expression (1) as follows:

$$C_H = A^2/V \quad (1)$$

The parameter (A) represents the area of a non-contacting interface of a fluid-bearing gap, and the parameter (V) represents the volume of the fluid within the fluid-bearing gap. By way of example, the hydraulic stiffness of a non-contacting interface may increase with increasing length of the fluid-bearing gap.

The presently disclosed seal assemblies are generally considered non-contacting seals, in that the fluid bearing inhibits contact between the seal face and the rotor face. The presently disclosed seal assemblies include a seal assembly defined by a rotor face of a seal rotor and a stator face of a seal slider. The seal assembly may be configured as an aspirating face seal, a fluid bearing, a gas bearing, or the like. The seal slider may be slidably coupled to a seal stator, allowing the seal slider to slidably engage and retract the stator face with respect to the rotor face.

In some embodiments, the presently disclosed seal assemblies may advantageously provide smooth movement of the seal slider, allowing responsive movement with changes in operating conditions. Additionally, the presently disclosed seal assemblies may provide improved responsiveness to motive forces caused by transient operating conditions of the rotary machine and/or aberrant movement of the rotor. The seal assemblies include features described herein that provide for improved movement of the seal slider, improved positioning of the seal face relative to the rotor face, enhanced range of motion of the seal slider, and/or improved responsiveness to transient operating conditions and/or aberrant movement of the rotor. The presently disclosed seal assemblies may accommodate a wider range of operating conditions and/or may provide improved operating performance, including improved performance of the seal assembly and/or improved performance of the rotary machine. Additionally, or in the alternative, the presently disclosed seal assemblies may provide for a lower likelihood of contact between the seal face and the rotor face during transient conditions, enhancing the durability and/or useful life of the seal assembly, rotor, and/or related components of the rotary machine.

Exemplary embodiments of the present disclosure will now be described in further detail. Referring to FIG. 1, an exemplary rotary machine 50 will be described. As shown, the rotary machine 50 may include and/or may be configured as a turbine engine 100. The presently disclosed seal assemblies may be included in any desired rotary machine 50, such as the turbine engine 100. In some embodiments, the turbine engine 100 may be mounted to an aircraft, such as in an under-wing configuration or a tail-mounted configuration. The turbine engine 100 shown in FIG. 1 is provided by way of example and not to be limiting, and that the subject matter of the present disclosure may be implemented with other types of turbine engines, as well as other types of rotary machines.

In general, the turbine engine 100 may include a fan section 102 and a core engine 104 disposed downstream from the fan section 102. The fan section 102 may include a fan 106 with any suitable configuration, such as a variable pitch, single stage configuration. The fan 106 may include a plurality of fan blades 108 coupled to a fan disk 110 in a spaced apart manner. The plurality of fan blades 108 may extend outwardly from the fan disk 110 generally along a radial direction. The core engine 104 may be coupled directly or indirectly to the fan section 102 to provide torque for driving the fan section 102.

The core engine 104 may include an engine case 114 that encases one or more portions of the core engine 104, including, a compressor section 122, a combustor section 124, and a turbine section 126. The engine case 114 may define a core engine-inlet 116, an exhaust nozzle 118, and a core air flowpath 120 therebetween. The core air flowpath 120 may pass through the compressor section 122, the combustor section 124, and the turbine section 126. The compressor section 122 may include a first, booster or low pressure (LP) compressor 128 and a second, high pressure (HP) compressor 130. The turbine section 126 may include a first, high pressure (HP) turbine 132 and a second, low pressure (LP) turbine 134. The compressor section 122, the combustor section 124, turbine section 126, and the exhaust nozzle 118 may be arranged in serial flow relationship and may respectively define a portion of the core air flowpath 120 through the core engine 104.

The core engine 104 and the fan section 102 may be coupled to a shaft driven by the core engine 104. By way of example, as shown in FIG. 1, the core engine 104 may include a high pressure (HP) shaft 136 and a low pressure (LP) shaft 138. The HP shaft 136 may drivingly connect the HP turbine 132 to the HP compressor 130. The LP shaft 138 may drivingly connect the LP turbine 134 to the LP compressor 128. In other embodiments, a turbine engine may have three shafts, such as in the case of a turbine engine that includes an intermediate pressure turbine. A shaft of the core engine 104, together with a rotating portion of the core engine 104, may sometimes be referred to as a "spool." The HP shaft 136, a rotating portion of the HP compressor 130 coupled to the HP shaft 136, and a rotating portion of the HP turbine 132 coupled to the HP shaft 136, may be collectively referred to as a high pressure (HP) spool 140. The LP shaft 138, a rotating portion of the LP compressor 128 coupled to the LP shaft 138, and a rotating portion of the LP turbine 134 coupled to the LP shaft 138, may be collectively referred to as a low pressure (LP) spool 142.

In some embodiments, the fan section 102 may be coupled directly to a shaft of the core engine 104, such as directly to the LP shaft 138. Alternatively, as shown in FIG. 1, the fan section 102 and the core engine 104 may be coupled to one another by way of a power gearbox 144, such as a planetary reduction gearbox, an epicyclical gearbox, or the like. For example, the power gearbox 144 may couple the LP shaft 138 to the fan 106, such as to the fan disk 110 of the fan section 102. The power gearbox 144 may include a plurality of gears for stepping down the rotational speed of the LP shaft 138 to a more efficient rotational speed for the fan section 102.

Still referring to FIG. 1, the fan section 102 of the turbine engine 100 may include a fan case 146 that at least partially surrounds the fan 106 and/or the plurality of fan blades 108. The fan case 146 may be supported by the core engine 104, for example, by a plurality of outlet guide vanes 148 circumferentially spaced and extending substantially radially therebetween. The turbine engine 100 may include a nacelle 150. The nacelle 150 may be secured to the fan case 146. The nacelle 150 may include one or more sections that at least partially surround the fan section 102, the fan case 146, and/or the core engine 104. For example, the nacelle 150 may include a nose cowl, a fan cowl, an engine cowl, a thrust reverser, and so forth. The fan case 146 and/or an inward portion of the nacelle 150 may circumferentially surround an outer portion of the core engine 104. The fan case 146 and/or the inward portion of the nacelle 150 may define a bypass passage 152. The bypass passage 152 may be disposed annularly between an outer portion of the core engine 104 and the fan case 146 and/or inward portion of the nacelle 150 surrounding the outer portion of the core engine 104.

During operation of the turbine engine 100, an inlet airflow 154 enters the turbine engine 100 through an inlet 156 defined by the nacelle 150, such as by a nose cowl of the nacelle 150. The inlet airflow 154 passes across the plurality of fan blades 108. The inlet airflow 154 splits into a core airflow 158 that flows into and through the core air flowpath 120 of the core engine 104 and a bypass airflow 160 that flows through the bypass passage 152. The core airflow 158 is compressed by the compressor section 122. Pressurized air from the compressor section 122 flows downstream to the combustor section 124 where fuel is introduced to generate combustion gasses, as represented by arrow 162. The combustion gasses exit the combustor section 124 and flow through the turbine section 126, generating torque that rotates the compressor section 122 to support combustion while also rotating the fan section 102. Rotation of the fan section 102 causes the bypass airflow 160 to flow through the bypass passage 152, generating propulsive thrust. Additional thrust is generated by the core airflow 158 exiting the exhaust nozzle 118.

In some embodiments, the turbine engine 100 may be a relatively large power class turbine engine 100 that may generate a relatively large amount of thrust when operated at a rated speed. For example, the turbine engine 100 may be configured to generate from about 300 Kilonewtons (kN) of thrust to about 700 kN of thrust, such as from about 300 kN to about 500 kN of thrust, such as from about 500 kN to about 600 kN of thrust, or such as from about 600 kN to about 700 kN of thrust. However, the various features and attributes of the turbine engine 100 described with reference to FIG. 1 are provided by way of example only and not to be limiting. In fact, the present disclosure may be implemented with respect to any desired turbine engine, including those with attributes or features that differ in one or more respects from the turbine engine 100 described herein.

Still referring to FIG. 1, the turbine engine 100 includes seal assemblies at a number of locations throughout the turbine engine 100, any one or more of which may be configured according to the present disclosure. A presently disclosed seal assembly may be provided in a turbine engine 100 at any location that includes an interface with a rotating portion of the turbine engine 100, such as an interface with a rotating portion or spool of the core engine 104. For example, a seal assembly may be included at an interface with a portion of the LP spool 142 and/or at an interface with the HP spool 140. In some embodiments, a seal assembly may be included at an interface between a spool, such as the LP spool 142 or the HP spool 140, and a stationary portion of the core engine 104. Additionally, or in the alternative, a seal assembly may be included at an interface between the LP spool 142 and the HP spool 140. Additionally, or in the alternative, a seal assembly may be included at an interface between a stationary portion of the core engine 104 and the LP shaft 138 or the HP shaft 136, and/or at an interface between the LP shaft 138 and the HP shaft 136.

By way of example, FIG. 1 shows some exemplary locations of a seal assembly. As one example, a seal assembly may be located at or near a bearing compartment 164. A seal assembly located at or near the bearing compartment 164 may sometimes be referred to as a bearing compartment seal. Such a bearing compartment seal may be configured to inhibit air flow, such as core airflow 158 from passing into the bearing compartment 164 of the turbine engine 100, such as the bearing compartment 164 located at an interface between the LP shaft 138 and the HP shaft 136. As another example, a seal assembly may be located at or near the compressor section 122 of the turbine engine 100. In some embodiments, a seal assembly may be located at or near a compressor discharge 166, for example, of the HP compressor 130. A seal assembly located at or near the compressor discharge 166 may sometimes be referred to as a compressor discharge pressure seal. Such a compressor discharge pressure seal may be configured to maintain pressure downstream of the compressor section 122 and/or to provide bearing thrust balance. Additionally, or in the alternative, a seal assembly may be located between adjacent compressor stages 168 of the compressor section 122. A seal assembly located between adjacent compressor stages 168 may be sometimes referred to as a compressor interstage seal. Such a compressor interstage seal may be configured to limit air recirculation within the compressor section 122. As another example, a seal assembly may be located at or near the turbine section 126 of the turbine engine 100. In some embodiments, a seal assembly may be located at or near the turbine inlet 170, for example, of the HP turbine 132 or the LP turbine 134. A seal assembly located at or near the turbine inlet 170 may sometimes be referred to as a forward turbine seal. Such a forward turbine seal may be configured to contain high-pressure cooling air for the HP turbine 132 and/or the LP turbine 134, such as for turbine disks and turbine blades thereof. Additionally, or in the alternative, a seal assembly may be located at or near one or more turbine disk rims 172. A seal assembly located at or near the turbine disk rim 172 may sometimes be referred to as a turbine disk rim seal. Such a turbine disk rim seal may be configured to inhibit hot gas ingestion into the disk rim area. Additionally, or in the alternative, a seal assembly may be located between adjacent turbine stages 174 of the turbine section 126. A seal assembly located between adjacent turbine stages 174 may be sometimes referred to as a turbine interstage seal. Such a turbine interstage seal may be configured to limit air recirculation within the turbine section 126.

A seal assembly at any one or more of these locations or other location of the turbine engine 100 may be configured in accordance with the present disclosure. Additionally, or in the alternative, the turbine engine 100 may include a presently disclosed seal assembly at one or more other locations of the turbine engine 100. The presently disclosed seal assemblies may also be used in other rotary machines. The turbine engine 100 described with reference to FIG. 1 is provided by way of example and not to be limiting.

Figure 2A:
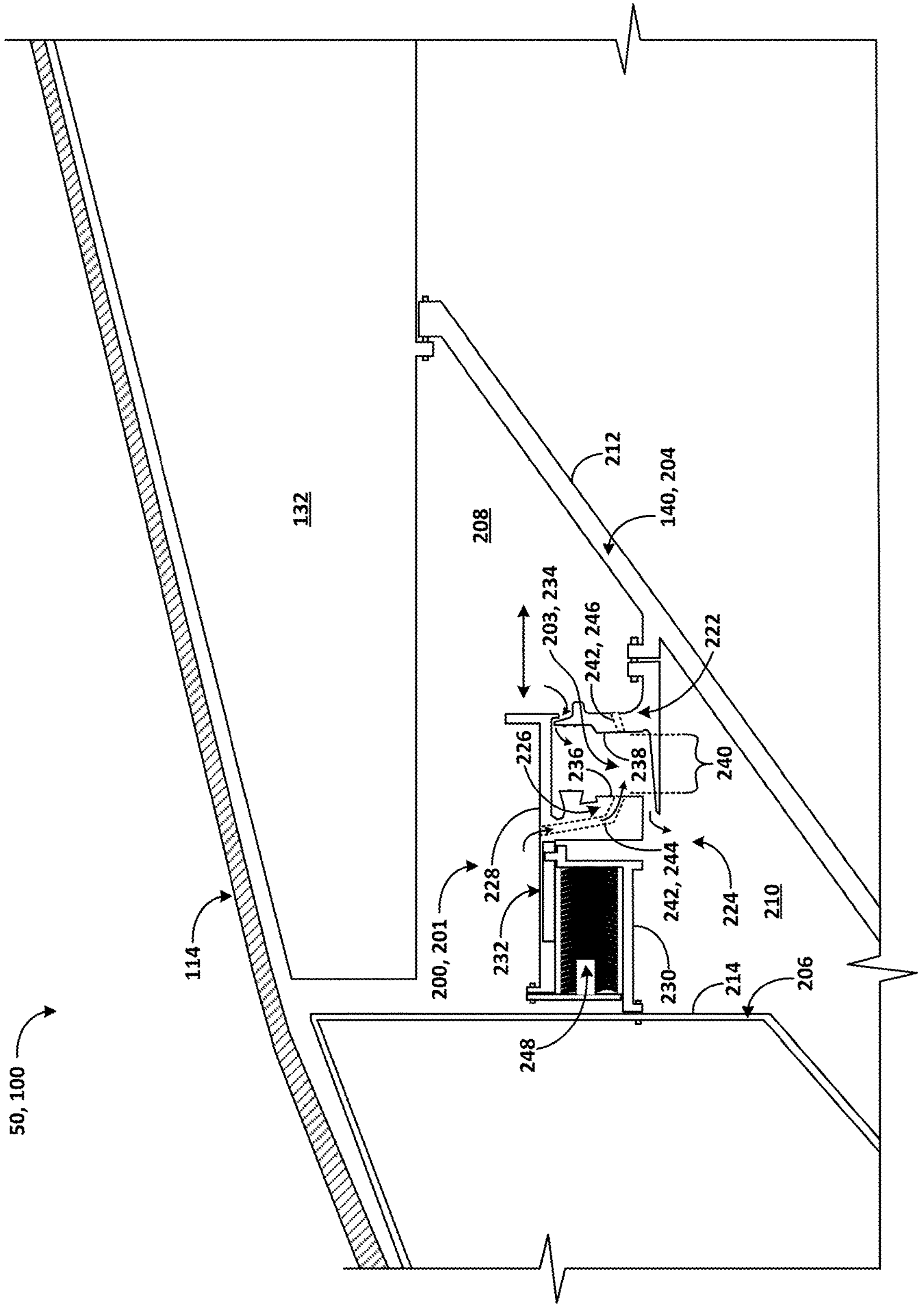
FIGS. 2A and 2B respectively show schematic perspective views of an exemplary seal assembly disposed between a rotor and a stator of a rotary machine.
Figure 2B:
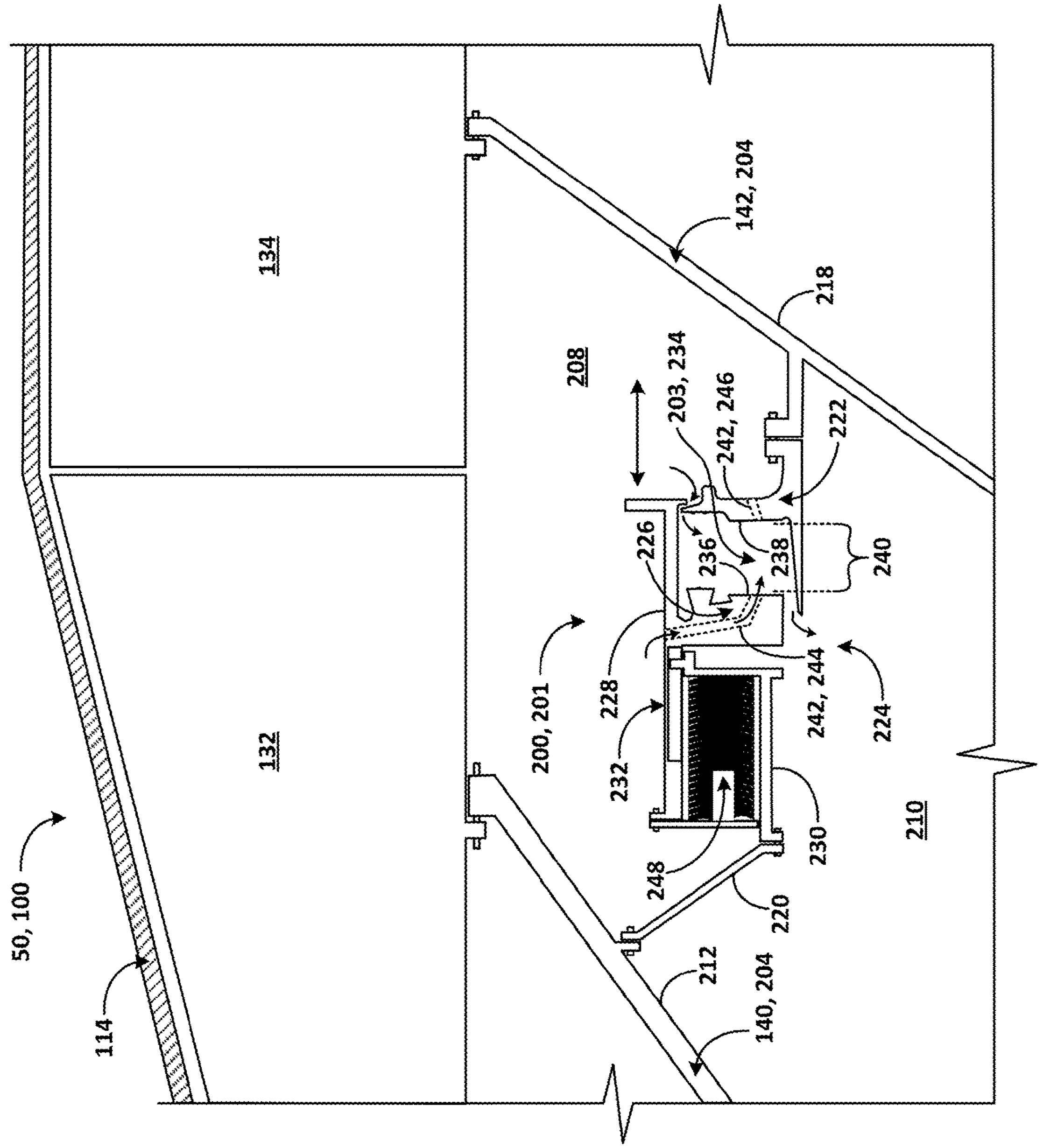

Now referring to FIGS. 2A and 2B, exemplary seal assemblies 200 are further described. As shown in FIGS. 2A and 2B, a rotary machine 50, such as a turbine engine 100, may include a seal assembly 200 configured to provide a seal interface 203 with a rotor 204, such as between a rotor 204 and a stator 206 of a rotary machine 50. The seal assembly 200 may be integrated into any rotary machine 50, such as a turbine engine 100 as described with reference to FIG. 1. For example, the rotary machine 50, such as the turbine engine 100, may include a core engine 104. The core engine 104 may include a rotor 204, a stator 206, and a seal assembly 200 that provide a seal interface 203 with the rotor 204, such as between the rotor 204 and the stator 206 of the core engine 104.

As shown in FIGS. 2A and 2B, the seal assembly 200 may separate an inlet plenum 208 from an outlet plenum 210. The inlet plenum 208 may define a region of the rotary machine 50 that includes a relatively higher-pressure fluid volume.

The outlet plenum 210 may define a region of the rotary machine 50 that includes a relatively lower-pressure fluid volume. The seal assembly 200 may have an annular configuration. In some embodiments, the seal assembly 200 may include a plurality of seal segments 201 that may be assembled to provide the seal assembly 200. The plurality of seal segments 201 may be coupled to one another such that the seal segments 201 respectively define a semi-annular portion of the seal assembly 200. Additionally, or in the alternative, the seal assembly 200 may include a plurality of annular seal segments 201 that may be assembled to provide the seal assembly 200.

In some embodiments, as shown, for example, in FIG. 2A, the seal assembly 200 may provide a seal interface 203 between an HP spool 140 and a stationary portion of the core engine 104 (FIG. 1). For example, the rotor 204 may include a portion of the HP spool 140. Additionally, or in the alternative, the rotor 204 may include an HP spool cone 212 that defines a portion of the HP spool 140. In some embodiments, the stator 206 may include a turbine center frame 214. The seal assembly 200 may provide a seal interface 203 between the HP spool cone 212 and the turbine center frame 214. Additionally, or in the alternative, in some embodiments, as shown, for example, in FIG. 2B, a seal assembly 200 may provide a seal interface 203 between rotating bodies, such as between the HP spool 140 and the LP spool 142. The rotor 204 may include a portion of the LP spool 142. For example, the rotor 204 may include an LP spool cone 218 that defines the portion of the LP spool 142. Additionally, or in the alternative, the seal assembly 200 may be coupled to the HP spool cone 212. For example, the seal stator 224 may be coupled to the HP spool 140, such as to the HP spool cone 212. A seal rotor 222 may be coupled to the LP spool 142, such as to the LP spool cone 218. The seal assembly 200 may define a seal interface 203 between the HP spool cone 212 and the LP spool cone 218. In some embodiments, an inner extension 220 may couple the seal assembly 200 to the HP spool cone 212.

Referring again to FIGS. 2A and 2B, as shown, the seal assembly 200 may be disposed adjacent to a rotor 204. The seal assembly 200 may include the seal rotor 222 and the seal stator 224. The seal rotor 222 may be coupled to the rotor 204, such as to the HP spool cone 212 or another portion of the HP spool 140, or such as to the LP spool cone 218 or other portion of the LP spool 142. In some embodiments, the seal stator 224 may be coupled to a stationary portion of the core engine 104, such as to the turbine center frame 214. In some embodiments, the seal stator 224 may be coupled to a rotating portion of the core engine 104, such as to the HP spool cone 212 or other portion of the HP spool 140, or such as to the LP spool cone 218 or other portion of the LP spool 142. Additionally, or in the alternative, the seal stator 224 may be coupled to the inner extension 220, as shown, for example, in FIG. 2B.

As shown in FIGS. 2A and 2B, the seal stator 224 may include a stator shoe 226. In some embodiments, the seal stator 224 may include a seal slider 228. The stator shoe 226 may be coupled to or monolithically integrated with the seal slider 228. In some embodiments, the seal stator 224 may include a stator flange 230. The seal slider 228 may be slidably coupled to the stator flange 230, for example, at a slide interface 232. The seal rotor 222 and the seal stator 224 may respectively have an annular configuration. Additionally, or in the alternative, the seal rotor 222 and the seal stator 224 may respectively include a plurality of semi-annular elements that may be assembled to provide an annular assembly. The seal assembly 200 may be configured as a film riding seal, an aspirating face seal, a fluid bearing, a gas bearing, or the like. The seal assembly 200 may have an annular configuration defined by one or more annular or semi-annular components of the seal assembly, such as the seal stator 224 and/or the seal rotor 222.

The seal assembly 200 may include a plurality of aspiration conduits 242. The plurality of aspiration conduits 242 may be respectively configured to allow fluid to flow from a higher-pressure region on one side of the seal assembly 200, such as the inlet plenum 208, to a lower-pressure region on another side of the seal assembly 200, such as the outlet plenum 210. In some embodiments, the fluid may include pressurized air, gasses, and/or vapor. In other embodiments, the fluid may include a liquid. The fluid may flow through the seal interface 203 located between the relatively higher-pressure region and the relatively lower-pressure region. The plurality of aspiration conduits 242 may be respectively configured to supply fluid from the inlet plenum 208 to the seal interface 203. Fluid flowing to the seal interface 203 may discharge to the outlet plenum 210.

The seal interface 203 may include a fluid-bearing gap 240 between the rotor 204 and the stator 206. The stator, such as the stator shoe 226 may include a stator face 236. The rotor 204, such as the seal rotor 222, may include a rotor face 238. The fluid-bearing gap 240 may be defined between the stator face 236 and the rotor face 238. Pressurized fluid within the fluid-bearing gap 240 may provide a non-contacting interface 234 between the rotor 204 and the stator 206, such as between the stator face 236 and the rotor face 238. The non-contacting interface 234 may include the fluid-bearing gap 240. The pressurized fluid at the non-contacting interface 234 may inhibit contact between the stator face 236 and the rotor face 238. In some embodiments, the seal assembly 200 may be configured as an aspirating seal, such as a film riding seal, an aspirating face seal, a fluid bearing, a gas bearing, or the like. The non-contacting interface 234 may sometimes be referred to as a fluid bearing, such as a gas bearing. The non-contacting interface 234 may be defined at least in part by the stator shoe 226 and the seal rotor 222, such as by the stator face 236 of the stator shoe 226 and the rotor face 238 of the seal rotor 222. The seal slider 228 may be configured to slidably engage and retract the stator shoe 226 with respect to the seal rotor 222. Radial movement of seal stator 224 and/or seal slider 228, such as responsive to transient operating conditions and/or aberrant movement of the rotor 204, may maintain a suitable dimension of the fluid-bearing gap 240, thereby providing proper functioning of fluid bearing and/or inhibiting contact between the stator face 236 and the rotor face 238.

The plurality of aspiration conduits 242 may be defined by a structure, such as a monolithic structure, of one or more components of the seal assembly 200. In some embodiments, the stator shoe 226 may include a plurality of aspiration conduits 242 configured to supply fluid from the inlet plenum 208 to the fluid-bearing gap 240. The aspiration conduits 242 defined by the stator shoe 226 may sometimes be referred to as stator-aspiration conduits 244. The stator-aspiration conduits 244 may define an internal conduit, pathway, or the like that passes through the stator shoe 226. The stator-aspiration conduits 244 may discharge fluid from the inlet plenum 208 to the fluid-bearing gap 240, for example, at a plurality of openings in the stator face 236.

Additionally, or in the alternative, in some embodiments, the seal rotor 222 may include a plurality of aspiration conduits 242 configured to supply fluid from the inlet plenum 208 to the fluid-bearing gap 240. The plurality of aspiration conduits 242 may be defined by a monolithic structure of the seal rotor 222. The aspiration conduits 242 defined by the seal rotor 222 may sometimes be referred to as rotor-aspiration conduits 246. The rotor-aspiration conduits 246 may define an internal conduit, pathway, or the like that passes through the seal rotor 222. The rotor-aspiration conduits 246 may discharge fluid from the inlet plenum 208 to the fluid-bearing gap 240, for example, at a plurality of openings in the rotor face 238.

During operation, the seal slider 228 may slide forward and aft relative to the seal stator 224 and the seal rotor 222. Movement of the seal slider 228 may be initiated at least in part due to a pressure difference between the inlet plenum 208 and the outlet plenum 210. By way of example, FIGS. 2A and 2B show the seal slider 228 in a retracted position such that the fluid-bearing gap 240 is relatively open. The seal slider 228 may occupy a retracted position, for example, when the rotary machine 50 operates at idle. As the power output and/or rotational speed increases, the seal slider 228 may slide forward towards the seal rotor 222, for example, as the pressure differential increases between the inlet plenum 208 and the outlet plenum 210. The seal slider 228 may occupy an engaged position, for example, when the rotary machine 50 operates at nominal operating conditions and/or at rated operating conditions. With the seal slider 228 in an engaged position, the stator face 236 and the rotor face 238 come into close proximity, while fluid may flow from the inlet plenum 208 to the outlet plenum 210 through the fluid-bearing gap 240, such as by way of the plurality of aspiration conduits 242. The fluid flowing through the fluid-bearing gap 240, with stator face 236 and the rotor face 238 being in close proximity, provides a non-contacting interface 234 between the stator face 236 and the rotor face 238.

The seal assembly 200 may include a secondary seal 248. The secondary seal 248 may have an annular configuration defined by one or more annular or semi-annular components. The secondary seal 248 may exhibit elasticity while compressing and rebounding, and/or while expanding and rebounding, over at least a portion of a range of motion of the seal slider 228. The secondary seal 248 may inhibit or prevent fluid from passing therethrough, such as from the inlet plenum 208 to the outlet plenum 210, for example, while allowing the seal slider 228 to slide forward and aft relative to the seal stator 224 and the seal rotor 222, such as between a retracted position and an engaged position, in accordance with operating conditions of the rotary machine 50.

Figure 2C:
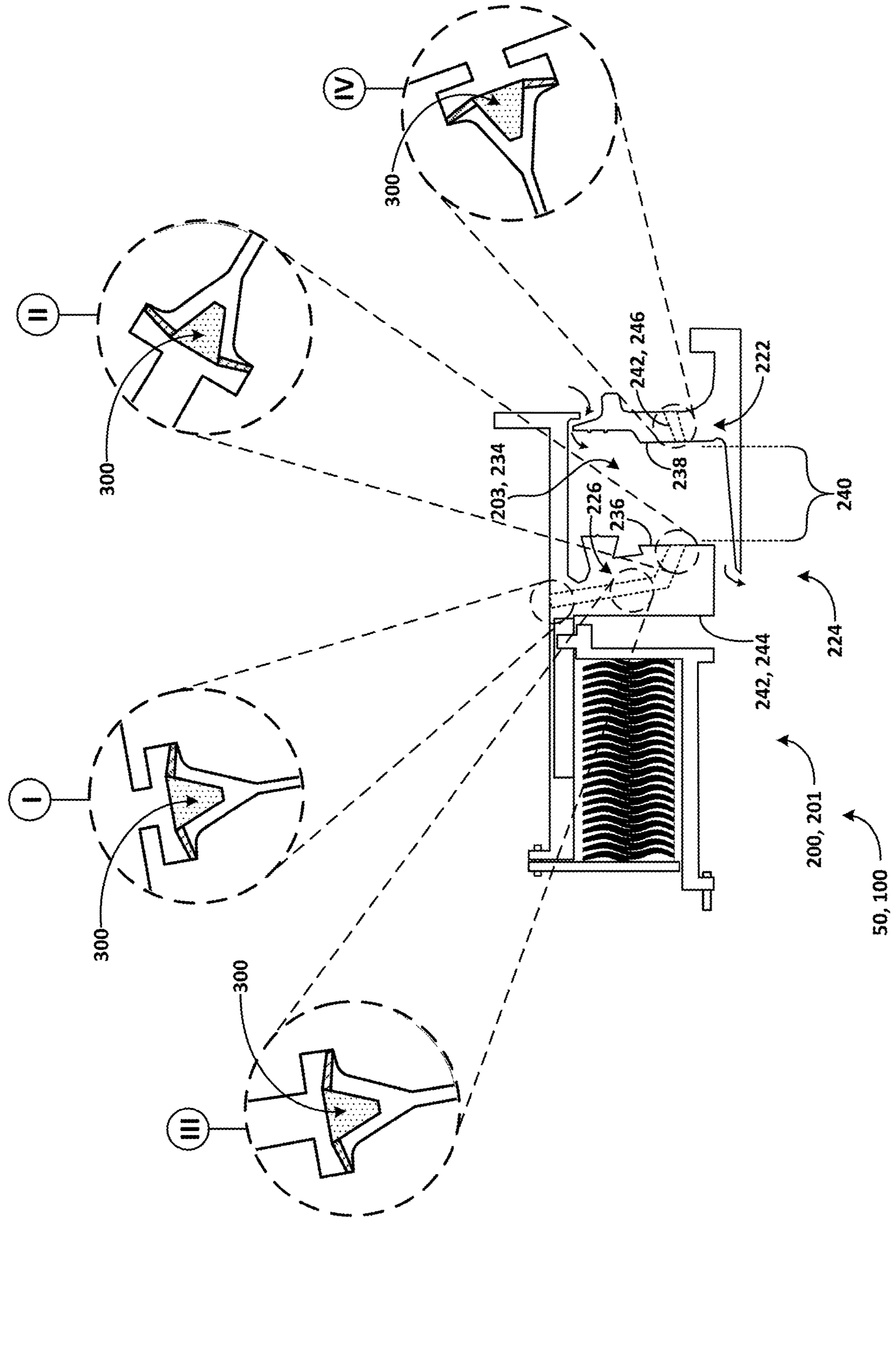
FIG. 2C shows a schematic perspective view of an exemplary seal assembly that includes one or more passive flow regulators.

As shown in FIG. 2C, the plurality of aspiration conduits 242 may respectively include one or more passive flow regulators 300 respectively configured to change a hydraulic resistance of the corresponding aspiration conduit 242. The one or more passive flow regulators 300 may respectively regulate the flow of fluid through the corresponding aspiration conduit 242 as a function of fluid pressure. A passive flow regulator 300 may be incorporated into any portion of the seal assembly 200 where one or more aspiration conduits 242 are located. For example, FIG. 2C shows enlarged views “I,” “II,” and “III,” respectively, depicting exemplary locations of a passive flow regulator 300 incorporated into a stator shoe 226. The passive flow regulators 300 respectively shown at enlarged views “I,” “II,” and “III,” may regulate a flow of fluid through a stator-aspiration conduit 244. As depicted by enlarged view “I,” in some embodiments, a passive flow regulator 300 may be located about an inlet of an aspiration conduit 242, such as about an inlet of a stator-aspiration conduit 244. As depicted by enlarged view “II,” in some embodiments, a passive flow regulator 300 may be located about an outlet of an aspiration conduit 242, such as about an outlet of a stator-aspiration conduit 244. As depicted by enlarged view “III,” in some embodiments, a passive flow regulator 300 may be located about a midward region of an aspiration conduit 242, such as about a midward region of a stator-aspiration conduit 244. As another example, FIG. 2C further shows enlarged view “IV,” depicting an exemplary location of a passive flow regulator 300 incorporated into a seal rotor 222. The passive flow regulator 300 shown at enlarged view “IV” may regulate a flow of fluid through a rotor-aspiration conduit 246. As depicted by enlarged view “IV,” a passive flow regulator 300 may be located about any suitable region of a rotor-aspiration conduit 246, such as about an inlet, an outlet, and/or a midward region of the rotor-aspiration conduit 246.

Figure 3A:
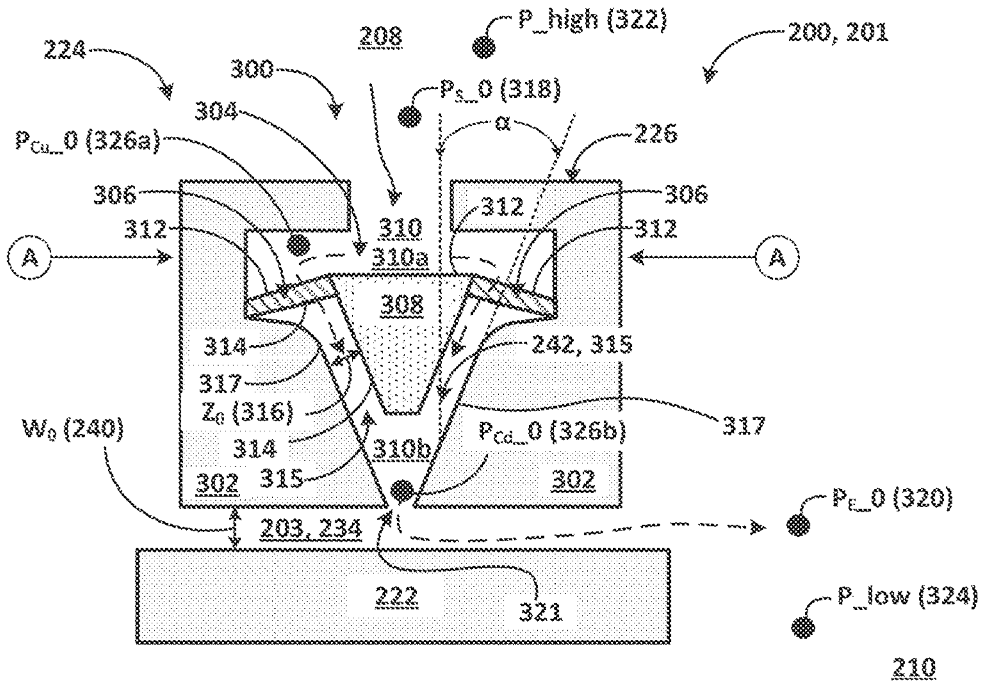
FIGS. 3A and 3B respectively show a schematic side cross-sectional view of an exemplary passive flow regulator, respectively depicting a position of a seal body of the passive flow regulator during operation at a first operating condition and a second operating condition.
Figure 3B:
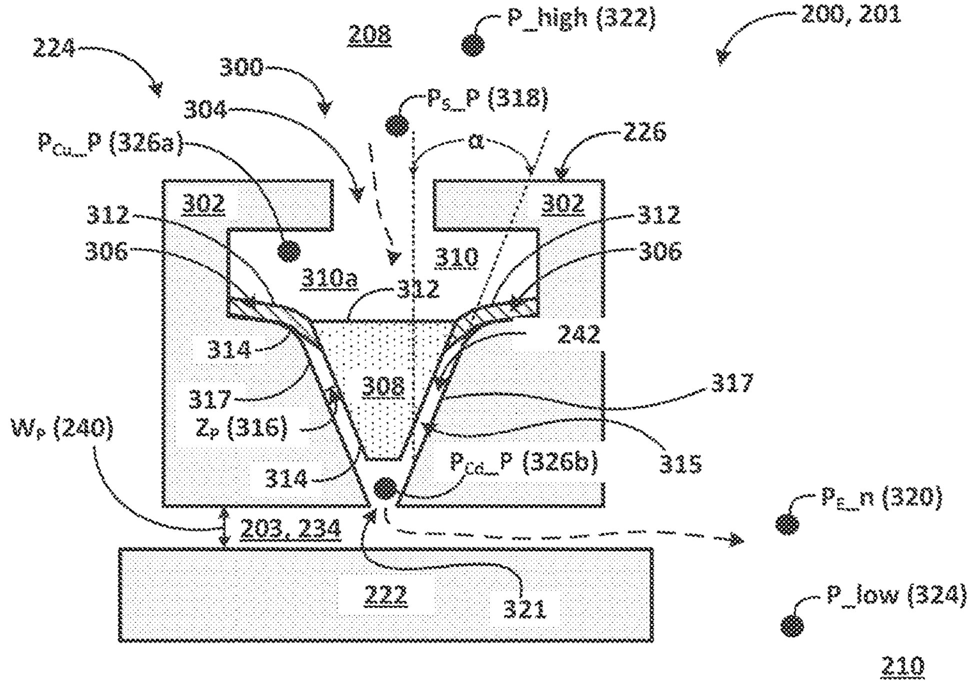

Referring now to FIGS. 3A and 3B, exemplary passive flow regulators 300 are further described. As shown, a passive flow regulator 300 may include a seal body 302 and one or more flow constrictors 304. The seal body 302 may include one or more aspiration conduits 242 defined by a structure, such as a monolithic structure, of the seal body 302. The one or more aspiration conduits 242 provide fluid communication across the seal body 302 from a relatively higher-pressure fluid volume, such as an inlet plenum 208, to a relatively lower-pressure fluid volume, such as a fluid-bearing gap 240 and/or an outlet plenum 210. The one or more flow constrictors 304 may be coupled to or monolithically integrated with at least a portion of the seal body 302 in proximity to a corresponding one or more aspiration conduits 242. The one or more flow constrictors 304 may respectively include one or more flexure elements 306. For example, the one more flexure elements 306 may be coupled to or monolithically integrated with at least a portion of the seal body 302. In some embodiments, the flow constrictor 304 may include one or more constrictor elements 308. The one or more constrictor elements 308 may be coupled to or monolithically integrated with the one or more flexure elements 306.

The one or more flexure elements 306 may move (e.g., flex, bend, hinge, etc.) in one or more degrees of freedom, for example, in relation to a corresponding aspiration conduit 242, as a result of changes in a pressure differential across the passive flow regulator 300 and/or across the flow constrictor 304. Movement of the one or more flexure elements 306 may allow the one or more constrictor elements 308 to correspondingly move as a result of changes in the pressure differential. Movements of the one or more flexure elements 306 may be attributable to a force acting on the one or more flexure elements 306 and/or a force acting on the one or more constrictor elements 308 as a result of the changes in a pressure differential. Movement of the flow constrictor 304, such as movement of the one or more flexure elements 306, changes a position of the flow constrictor 304 in relation to the aspiration conduit 242, such as a position of the one or more flexure elements 306 and/or a position of the one or more constrictor elements 308. Such changes in the position of the flow constrictor 304 may cause the flow constrictor 304 to change a hydraulic resistance of fluid flow through the aspiration conduit 242 in proportion to a position of the flow constrictor 304 in relation to the aspiration conduit 242. The hydraulic resistance of fluid flow through the aspiration conduit 242 may depend at least in part on a position of the flow constrictor 304 in relation to the aspiration conduit 242. The change in hydraulic resistance caused by movement of the flow constrictor 304 in relation to the aspiration conduit 242 may be attributable to and/or include hydraulic resistance from the one or more flexure elements 306 and/or hydraulic resistance from the one or more constrictor elements 308.

In some embodiments, the one or more flexure elements 306 may be formed of a material that has material properties suitable to allow the flexure elements 306 to move in the one or more degrees of freedom as a result of changes in fluid pressure differential across the passive flow regulator 300 and/or across the flow constrictor 304. For example, one more flexure elements 306 may be formed of a material that has an elastic modulus (sometimes referred to as a Young's modulus, E) selected to allow the respective flexure elements 306 to move in the one or more degrees of freedom over a desired range of motion, for example without being deformed elastically. The desired range of motion of the respective flexure elements 306 may correspond to a pressure differential range across the passive flow regulator 300 and/or across the flow constrictor 304 that may be encountered during operation of a rotary machine, such as the rotary machine 50 of FIG. 1, within which the seal assembly 200 may be utilized. Additionally, or in the alternative, the one or more flexure elements 306 may be formed of a material that has a suitable bending modulus, stiffness, fatigue limit, tensile strength, flexural strength, yield strength, ductility, and so forth. Additionally, or in the alternative, the one or more flexural elements 306 may include one or more additive features and/or one or more subtractive features configured to augment one or more apparent material properties exhibited by the respective flexural elements 306 responsive to the pressure differential encountered during operation of the rotary machine 50. For example, the one or more flexural elements 306 may respectively include a living hinge, a flexure bearing, notches, groups, ridges, dimples, protuberances, or the like.

In some embodiments, the passive flow regulator 300 may include a flexure chamber 310. The flexure chamber 310 may include an upstream-flexure chamber region 310*a* and/or a downstream-flexure chamber region 310*b* (with references to 310*a* in the figures referring both to the flexure chamber 310 and the upstream-flexure chamber region 310*a*, and references to 310*b* referring to both the flexure chamber 310 and the downstream-flexure chamber region 310*b*). The flexure chamber 310 may be defined at least in part by a monolithic structure of the seal body 302. The flexure chamber 310 may define at least a portion of one or more aspiration conduits 242. For example, the flexure chamber 310 may define a portion of an aspiration conduit 242 that has an enlarged cross-sectional dimension, such as an enlarged cross-sectional width and/or area, relative to a portion of the aspiration conduit 242 located upstream and/or downstream from the flexure chamber 310. The flow constrictor 304 may be located at least partially within the flexure chamber 310. The flow constrictor 304 may flex and relax in relation to the flexure chamber 310 and/or the aspiration conduit 242 responsive to changes in a pressure differential across the passive flow regulator 300 and/or the flow constrictor 304, changing a hydraulic resistance of fluid flow through the flexure chamber 310 and/or aspiration conduit 242 in proportion to a position of the flow constrictor 304 in relation to the flexure chamber 310 and/or the aspiration conduit 242. The hydraulic resistance may be generated as between a surface of the flow constrictor 304, such as a surface of the constrictor element 308, and a surface of the seal body 302 defining the flexure chamber 310 and/or the aspiration conduit 242.

The upstream-flexure chamber region 310*a* may fluidly communicate with a relatively higher-pressure fluid volume upstream from the flow constrictor 304. The upstream-flexure chamber region 310*a* may generally be located upstream from the flow constrictor 304. At least a portion of the flow constrictor 304, such as at least a portion of the one or more flexure elements 306 and/or at least a portion of the one or more constrictor elements 308, may include a flexion surface 312. The flexion surface 312 may be in fluid contact with, and/or oriented towards, the relatively higher-pressure fluid volume, such as the upstream-flexure chamber region 310*a*, the upstream portion of the aspiration conduit 242, and/or the inlet plenum 208. A force acting upon the flexion surface 312 by the relatively higher-pressure fluid volume, such as in the upstream-flexure chamber region 310*a*, may cause the flow constrictor 304 to move in relation to the seal body 302, the flexure chamber 310, and/or the aspiration conduit 242. The flexion surface 312 may define at least a portion of the upstream-flexure chamber region 310*a*. The downstream-flexure chamber region 310*b* may fluidly communicate with a relatively lower-pressure fluid volume downstream from the flow constrictor 304. The downstream-flexure chamber region 310*b* may generally be located downstream from the flow constrictor 304.

At least a portion of the flow constrictor 304, such as at least a portion of the one or more flexure elements 306 and/or at least a portion of the one or more constrictor elements 308, may include a flow constrictor-surface 314 that defines at least a portion of a variable-resistance pathway 315. In some embodiments, the seal body 302 may include a pathway surface 317 that further defines at least a portion of the variable-resistance pathway 315, for example, together with the flow constrictor-surface 314. The pathway surface 317 may include a portion of the aspiration conduit 242 and/or a portion of the flexure chamber 310. In some embodiments, the variable-resistance pathway 315 may be defined between the flow constrictor-surface 314 and the pathway surface 317. The variable-resistance pathway 315 may be described with reference to a variable-resistance pathway-parameter (Z) 316. The variable-resistance pathway-parameter 316 may include and/or represent one or more dimensions of the flexure chamber 310 and/or the aspiration conduit 242 that depend at least in part on a position of at least a portion of the flow constrictor 304. In some embodiments, the variable-resistance pathway-parameter 316 may represent a cross-sectional area and/or width of the variable-resistance pathway 315. For example, the variable-resistance pathway-parameter 316 may be determined with respect to a surface of the seal body 302 and a surface of the flow constrictor 304. The variable-resistance pathway 315 may generate hydraulic resistance based at least in part on the variable-resistance pathway-parameter 316, such as a distance between the flow constrictor-surface 314 and the pathway surface 317. The variable-resistance pathway-parameter 316 of the aspiration conduit 242 may change in correspondence with a changing position of the flow constrictor 304 in relation to the aspiration conduit 242 and/or the flexure chamber 310.

The variable-resistance pathway-parameter 316 may correspond to an extent to which the flow constrictor 304 constricts (e.g., at least partially blocks, narrows, contracts, obstructs, etc.) the variable-resistance pathway 315, thereby causing hydraulic resistance. The hydraulic resistance generated by the flow constrictor 304 constricting the variable-resistance pathway 315, may depend at least in part on the variable-resistance pathway-parameter 316. Constriction of the flexure chamber 310 and/or the aspiration conduit 242, such as the variable-resistance pathway 315, by the flow constrictor 304 may be realized at least in part by a position of the flow constrictor 304, such as a position of the one or more flexure elements 306 and/or the one more constrictor elements 308.

A flow constrictor, such as the exemplary flow constrictor 304 shown in FIGS. 3A and 3B, may have a nominal position when a pressure differential across the flow constrictor 304 is less than a threshold pressure differential sufficient to move the flow constrictor 304. A flow constrictor that has a nominal position as a result of the pressure differential across the flow constrictor being less than the threshold pressure differential sufficient to move the flow constrictor may sometimes be referred to as in a relaxation state. By way of example, the flow constrictor 304 may be in a relaxation state when a pressure differential across the flow constrictor 304 equals zero. An exemplary flow constrictor that is in a relaxation state is shown, for example, in FIG. 3A. When the flow constrictor 304 is in a relaxation state, the variable-resistance pathway-parameter (Z) may have a nominal value ($Z_0$).

A flow constrictor may have a flexed position when a pressure differential across the flow constrictor is greater than a threshold pressure differential sufficient to move the flow constrictor. A flow constrictor that has a flexed position as a result of the pressure differential across the flow constrictor being greater than the threshold pressure differential sufficient to move the flow constrictor may sometimes be referred to as a flexion state. By way of example, the flow constrictor 304 may be in a flexion state when a pressure differential across the flow constrictor 304 is sufficient to move the flow constrictor 304 from a nominal position corresponding to the relaxation state. An exemplary flow constrictor that is in a flexion state is shown, for example, in FIG. 3B. When the flow constrictor 304 is in a flexion state, the variable-resistance pathway-parameter (Z) may have a flexion value ($Z_P$) that is less than the nominal value ($Z_0$).

In some embodiments, the flow constrictor-surface 314 may be in fluid contact with, and/or at least partially oriented towards, the relatively lower-pressure fluid volume, such as the downstream-flexure chamber region 310*b*, the downstream portion of the aspiration conduit 242, the fluid-bearing gap 240, and/or the outlet plenum 210. The flow constrictor-surface 314 may define at least a portion of the downstream-flexure chamber region 310*b*. A volume of the upstream-flexure chamber region 310*a* and/or a volume of the downstream-flexure chamber region 310*b* may vary as the flow constrictor 304 extends and retracts within the flexure chamber 310 responsive to changes in the pressure differential across the flow constrictor 304 and/or seal body 302. Fluid from the relatively higher-pressure fluid volume (e.g., fluid from the upstream-flexure chamber region 310*a*, the upstream portion of the aspiration conduit 242, and/or the inlet plenum 208) may impart a force upon the flow constrictor 304, such as upon the flexion surface 312 of the one or more flexure elements 306 and/or upon the flexion surface 312 of the one or more constrictor elements 308. Fluid from the relatively lower-pressure fluid volume (e.g., the downstream-flexure chamber region 310*b*, the downstream portion of the aspiration conduit 242, the fluid-bearing gap 240, and/or the outlet plenum 210) may impart force upon the flow constrictor 304, such as upon the flow constrictor-surface 314 of the one or more flexure elements 306 and/or upon the flow constrictor-surface 314 of the one or more constrictor elements 308. The force acting upon the flow constrictor 304 may correspond to a pressure differential across the flow constrictor 304 and/or the passive flow regulator 300. The flow constrictor 304 may occupy a position in relation to the flexure chamber 310 and/or the aspiration conduit 242 that depends at least in part on the pressure differential across the flow constrictor 304 and/or the passive flow regulator 300.

As shown in FIGS. 3A and 3B, the flow constrictor-surface 314 may generate hydraulic resistance based at least in part on a variable-resistance pathway-parameter 316 corresponding, for example, to a variable-resistance pathway 315 defined between the flow constrictor-surface 314 and a pathway surface 317 adjacent to the flow constrictor-surface 314. As shown, the flow constrictor-surface 314 may include a lateral surface of the constrictor element 308 and/or a downstream surface of the constrictor element 308. A lateral surface of the constrictor element 308 may be oriented laterally with respect to an orientation of the flexure chamber 310 and/or the aspiration conduit 242. A downstream surface of the constrictor element 308 may be oriented downstream with respect to an orientation of the flexure chamber 310 and/or the aspiration conduit 242. The pathway surface 317 may be adjacent to such a lateral surface and/or downstream surface of the constrictor element 308 that defines the flow constrictor-surface 314. The pathway surface 317 may be laterally adjacent to the flow constrictor-surface 314. Additionally, or in the alternative, the pathway surface 317 may be adjacently downstream from the flow constrictor-surface 314. The flow constrictor-surface 314 may be oriented towards the pathway surface 317, such as a laterally adjacent surface and/or an adjacently downstream surface of the flexure chamber 310 and/or aspiration conduit 242.

At least a portion of the flow constrictor 304, such as at least a portion of the one or more flexure elements 306 and/or at least a portion of the one or more constrictor elements 308, may increasingly constrict a variable-resistance pathway 315 through the flexure chamber 310 and/or the aspiration conduit 242 with increasing pressure differential across the flow constrictor 304 and/or the passive flow regulator 300. The variable-resistance pathway 315 may be defined at least in part by the flow constrictor-surface 314 and the pathway surface 317. Additionally, or in the alternative, at least a portion of the flow constrictor 304, such as at least a portion of the one or more flexure elements 306 and/or at least a portion of the one or more constrictor elements 308, may increasingly constrict a flexure chamber-outlet 321 with increasing pressure differential across the flow constrictor 304 and/or the passive flow regulator 300. The flexure chamber-outlet 321 may include one or more orifices, openings, or the like, providing fluid communication between the flexure chamber 310 and the fluid-bearing gap 240, and/or between the flexure chamber 310 and an aspiration conduit 242 disposed between the flexure chamber 310 and the fluid-bearing gap 240. The term "orifice" may refer to an aperture, a hole, or the like. The term "opening" may refer to a gap or space between adjacent surfaces.

The flow constrictor-surface 314 may increasingly approach the pathway surface 317, such as the laterally adjacent surface and/or the adjacently downstream surface of the flexure chamber 310 and/or aspiration conduit 242, with increasing pressure differential across the flow constrictor 304 and/or the passive flow regulator 300. The increasing pressure differential may correspond to a decreasing variable-resistance pathway-parameter 316, such as a decreasing cross-sectional area and/or width of at least a portion of the flexure chamber 310 and/or the aspiration conduit 242. The decreasing cross-sectional area and/or width of the flexure chamber 310 and/or the aspiration conduit 242 may include a decreasing cross-sectional area and/or width of the variable-resistance pathway 315. At least a portion of the flow constrictor 304, such as at least a portion of the one or more flexure elements 306 and/or at least a portion of the one or more constrictor elements 308, may decreasingly constrict at least a portion of the flexure chamber 310 and/or the aspiration conduit 242, such as the variable-resistance pathway 315 and/or the flexure chamber-outlet 321, with decreasing pressure differential across the flow constrictor 304. The decreasing pressure differential across the flow constrictor 304 may correspond to an increasing variable-resistance pathway-parameter 316, such as an increasing cross-sectional area and/or width of the flexure chamber 310 and/or the aspiration conduit 242, such as an increasing cross-sectional area and/or width of the variable-resistance pathway 315.

In some embodiments, as shown, for example, in FIGS. 3A and 3B, at least a portion of the flow constrictor 304 and at least a portion of the flexure chamber 310 may have a geometrically complementary configuration relative to one another. As used herein, the term "geometrically complementary," when used in reference to the flow constrictor 304 (or a portion thereof) and the flexure chamber 310 (or a portion thereof), refers to configurations and arrangements in which the flow constrictor 304 (or a portion thereof) increasingly fits, mates, or matingly fits with the flexure chamber 310 (or a portion thereof) when the flow constrictor 304 moves responsive to an increasing pressure differential across the flow constrictor 304. Additionally, or in the alternative, such uses of the term "geometrically complementary" refers to configurations and arrangements in which the flow constrictor 304 (or a portion thereof) has a first one or more surfaces respectively oriented towards corresponding ones of a second one or more surfaces of the flexure chamber 310 (or a portion thereof), and the respective facing surfaces increasingly fit, mate, or matingly fit with one another when the flow constrictor 304 moves responsive to an increasing pressure differential across the flow constrictor 304. By way of example, a flow constrictor (or a portion thereof) and a flexure chamber (or a portion thereof) that have a reciprocal or inverse configuration are geometrically complementary to one another.

In some embodiments, at least a portion of the constrictor element 308 may be geometrically configured in the shape of a polyhedron, a prismatoid, a cylinder, an annulus, or a truncated cone. By way of example, a polyhedron may include a tetrahedron, a hexahedron, a pentahedron, and so forth. A prismatoid may include any polyhedron that has vertices that reside in two parallel planes. By way of example, a prismatoid may include a pyramid (e.g., in which one plane may be defined by a single point), a wedge (e.g., in which one plane may be defined by two points), a prisms, an antiprisms, a frustum (e.g., a truncated pyramid), a parallelepiped, a rhombohedron, a trigonal trapezohedron, a cuboid, and so forth. In some embodiments, at least a portion of the flexure chamber 310 and/or the aspiration conduit 242 may define a volume geometrically corresponding to the shape of the constrictor element 308, such as to the polyhedral shape, the prismatoidal shape, or the truncated conical shape of the constrictor element 308. Additionally, or in the alternative, the flow constrictor 304 and the aspiration conduit 242 may have a geometrically complementary configuration relative to one another. In some embodiments, the flow constrictor 304 may include constrictor element 308 and/or one or more flexure elements 306 that have a geometrically converging configuration complementary to one or more geometrically converging surfaces the seal body 302 defining at least a portion of the flexure chamber 310 and/or the aspiration conduit 242. For example, as shown in FIGS. 3A and 3B, at least a portion of the constrictor element 308, and/or a corresponding portion of the flexure chamber 310 and/or aspiration conduit 242, may have a geometrically converging shape that includes a polyhedron, a prismatoid, a cylinder, an annulus, or a truncated cone. The geometrically complementary configuration and/or the geometrically converging shape may include a conical shape, a frusto-conical shape (e.g., a truncated cone), a pyramid shape, or a frustum shape.

In some embodiments, as shown, for example, in FIGS. 3A and 3B, at least a portion of the flow constrictor 304, such as at least a portion of the constrictor element 308 of the flow constrictor 304, may fit within a corresponding portion of the flexure chamber 310, such as a corresponding portion of the downstream-flexure chamber region **310*b*. The portion of the flow constrictor 304, such as the portion of the constrictor element 308, and the corresponding portion of the flexure chamber 310, such as the corresponding portion of the downstream-flexure chamber region 310*b*, may respectively have a geometric shape configured to mate with one another. Such corresponding portions may increasingly mate with one another with increasing pressure differential. For example, the flow constrictor-surface 314 and the pathway surface 317 may be configured to mate with one another. Such portion of the flow constrictor 304 and/or constrictor element 308 may be configured as a stopper, a bung, a plug, or the like, that fits, mates, or matingly fits within the corresponding portion of the flexure chamber 310, such as the corresponding portion of the downstream-flexure chamber region 310*b*. An extent to which such corresponding portions fit, mate, or matingly fit with one another may be described with reference to the variable-resistance pathway-parameter 316**.

Referring further to FIGS. 3A and 3B, the position of the flow constrictor 304 in relation to the flexure chamber 310 and/or the aspiration conduit 242 may depend at least in part on a pressure differential (ΔP) across the flow constrictor 304 and/or the passive flow regulator 300. The position of the flow constrictor 304 may provide a fluid-bearing gap (W) 240 that has a desired hydraulic stiffness corresponding to operating conditions of the rotary machine 50. The pressure differential (ΔP) may be determined as between a source pressure ($P_S$) 318 corresponding to a relatively higher-pressure fluid volume, and an exit pressure ($P_E$) 320 corresponding to a relatively lower-pressure fluid volume. The source pressure ($P_S$) 318 may correspond to an inlet plenum-pressure (P_high) 322 representing a pressure of the inlet plenum 208. The exit pressure ($P_E$) 320 may correspond to an outlet plenum-pressure (P_low) 324 representing a pressure of the outlet plenum 210. Additionally, or in the alternative, the pressure differential may be determined as between a source pressure ($P_S$) 318 corresponding to a flexure chamber-pressure ($P_C$) 326 representing a pressure of the flexure chamber 310, and an exit pressure ($P_E$) 320 corresponding to an outlet plenum-pressure (P_low) 324. The flexure chamber-pressure ($P_C$) 326 may be an upstream flexure chamber-pressure ($P_{Cu}$) **326*a* representing a pressure of the upstream-flexure chamber region 310*a*, or a downstream flexure chamber-pressure ($P_{Cd}$) 326*b* representing a pressure of the downstream-flexure chamber region 310*b*. Additionally, or in the alternative, the pressure differential (ΔP) may be determined as between a source pressure ($P_S$) 318 corresponding to an inlet plenum-pressure (P_high) 322, and an exit pressure ($P_E$) 320 correspond to a flexure chamber-pressure ($P_C$) 326, such as an upstream flexure chamber-pressure ($P_{Cu}$) 326*a* or a downstream flexure chamber-pressure ($P_{Cd}$) 326***b*. Additionally, or in the alternative, the pressure differential (ΔP) may be determined as between a source pressure ($P_S$) 318 corresponding to an upstream flexure chamber-pressure ($P_{Cu}$) 326*a*, and an exit pressure ($P_E$) 320 corresponding to a downstream flexure chamber-pressure (Pal) 326*b*. As depicted, for example, in FIG. 3A, parameters that represent a relaxation state are denoted with a subscript underscore "0" (e.g., $P_S$_0, $P_{Cu}$_0, $P_{Cd}$_0, $Z_0$). As depicted, for example, in FIG. 3B, parameters that represent a flexion state are denoted with a subscript underscore "P" (e.g., $P_S$_P, $P_{Cu}$_P, $P_{Cd}$_P, $Z_P$).

FIG. 3A shows a passive flow regulator 300 with a flow constrictor 304 situated in a first position corresponding to a first operating condition, and FIG. 3B shows the passive flow regulator 300 with the flow constrictor 304 situated in a second position corresponding to a second operating condition. The first position of the flow constrictor 304 may correspond to a relatively low pressure differential across the flow constrictor 304. In the first position, the flow constrictor 304 may generally be in a retracted position in relation to the aspiration conduit 242 and/or the flexure chamber 310. The retracted position of the flow constrictor 304 may correspond to a relatively lower hydraulic resistance, corresponding, for example, to a relatively larger variable-resistance pathway-parameter 316 of the flexure chamber 310 and/or aspiration conduit 242. In the first position, the flow constrictor 304 may be in a nominal position represented by a variable-resistance pathway-parameter ($Z_0$). Additionally, or in the alternative, the second position of the flow constrictor 304 may correspond to a relatively high pressure differential across the flow constrictor 304. In the second position, the flow constrictor 304 may generally have a flexed position in relation to the aspiration conduit 242 and/or the flexure chamber 310. The flexed position of the flow constrictor 304 may correspond to a relatively higher hydraulic resistance, corresponding, for example, to a relatively smaller variable-resistance pathway-parameter 316 of the flexure chamber 310 and/or aspiration conduit 242.

In some embodiments, a pressure differential across the flow constrictor 304 may correspond to respective operating conditions of a rotary machine 50, such as a turbine engine 100, within which the seal assembly 200 may be installed. For example, the first operating condition shown in FIG. 3A may correspond to a nominal operating state, and the second operating condition shown in FIG. 3B may correspond to a high-power operating state. Additionally, or in the alternative, the first operating condition shown in FIG. 3A may correspond to a low-power operating state, and the second operating condition shown in FIG. 3B may correspond to a nominal operating state.

As shown in FIG. 3A, the flow constrictor 304 may be situated in the first position at an initial pressure differential (ΔP_0) as between an initial source pressure ($P_S$_0) 318 and an initial exit pressure ($P_E$_0) 320. The first position may correspond to a relaxation state of the flow constrictor 304. In the first position, the variable-resistance pathway-parameter (Z) may have a nominal value ($Z_0$). The first position of the flow constrictor 304 may provide an initial fluid-bearing gap ($W_0$) 240 that has a desired hydraulic stiffness corresponding to operating conditions of the rotary machine 50. The initial pressure differential (ΔP_0) may correspond to the first operating condition, such as a low-power operating state or a nominal operating state. At the initial pressure differential (ΔP_0), the flexure chamber 310 may exhibit an initial flexure chamber-pressure ($P_C$_0) 326, such as an initial upstream flexure chamber-pressure ($P_{Cu}$_0) 326*a* and/or an initial downstream flexure chamber-pressure ($P_{Cd}$_0) 326*b*.

As shown in FIG. 3B, the flow constrictor 304 may be situated in the second position at a subsequent pressure differential (ΔP_P) as between a subsequent source pressure ($P_S$_P) 318 and a subsequent exit pressure ($P_E$_P) 320.

The second position may correspond to a flexion state of the flow constrictor 304. In the second position, the variable-resistance pathway-parameter (Z) may have a flexion value ($Z_P$) that is less than the nominal value ($Z_0$). The second position of the flow constrictor 304 may provide a subsequent fluid-bearing gap ($W_P$) 240 that has a desired hydraulic stiffness corresponding to operating conditions of the rotary machine 50. The subsequent fluid-bearing gap ($W_P$) 240 and/or the corresponding hydraulic stiffness and remain within a desired range for the operating conditions of the rotary machine 50 based at least in part on movement of the flow constrictor 304 as a result of the subsequent pressure differential (ΔP_P). The subsequent pressure differential (ΔP_P) may correspond to the second operating condition, such as a nominal operating state or a high-power operating state. At the subsequent pressure differential (ΔP_P), the flexure chamber 310 may exhibit a subsequent flexure chamber-pressure ($P_C$_P) 326, such as a subsequent upstream flexure chamber-pressure ($P_{Cu}$_P) 326*a* and/or a subsequent downstream flexure chamber-pressure ($P_{Cd}$_P) 326*b*.

Figure 4A:
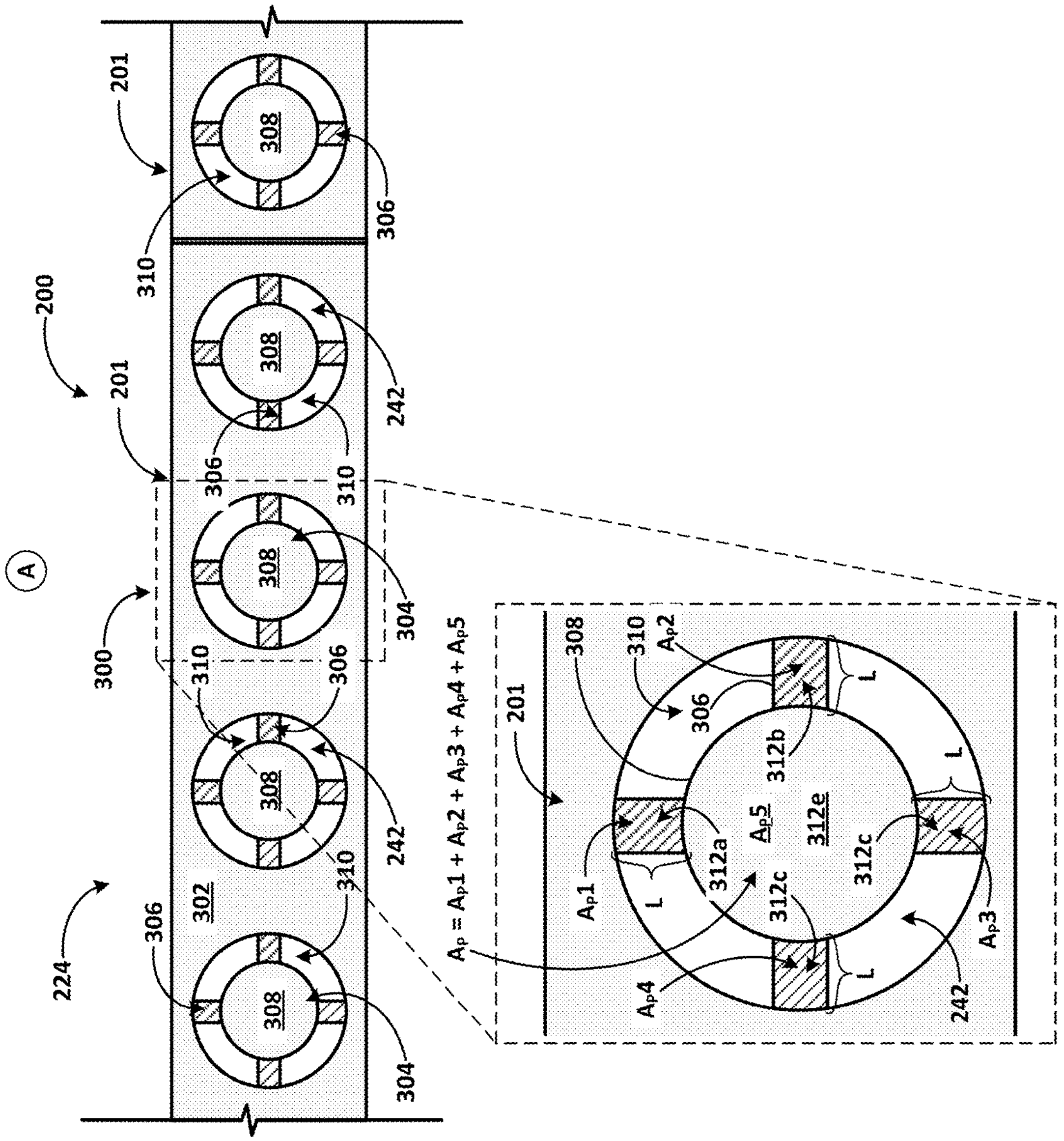
FIGS. 4A and 4B respectively show a schematic facing cross-sectional view of an exemplary passive flow regulator, such as the passive flow regulator of FIGS. 3A and 3B.
Figure 4B:
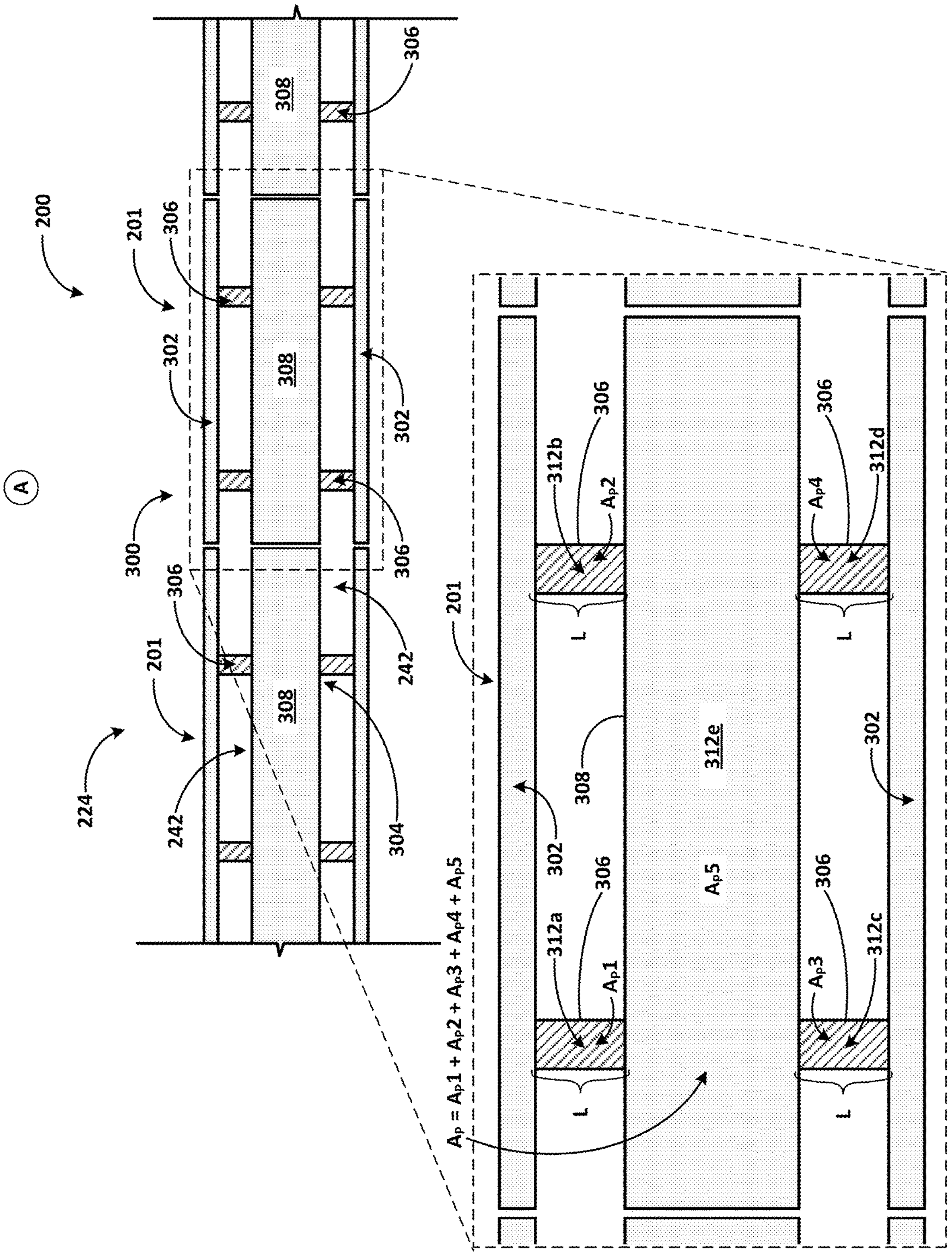

FIGS. 4A and 4B show facing cross-sectional views of exemplary passive flow regulators 300. The facing cross-sectional views shown in FIGS. 4A and 4B may correspond to the passive flow regulator 300 shown in FIGS. 3A and 3B, for example, at section (A) as indicated in FIG. 3A. As shown in FIG. 4A, the constrictor element 308 may be geometrically configured in the shape of a truncated cone. As another example, as shown in FIG. 4B, the constrictor element 308 may be geometrically configured in the shape of a frustum, such as an elongated frustum. As shown in FIGS. 4A and 4B, respective ones of the plurality of flexure elements 306 may be configured as extension elements extending between the seal body 302 and the constrictor element 308.

As shown in FIGS. 4A and 4B, respective ones of the plurality of flexure elements 306 may include a flexion surface 312. Additionally, or in the alternative, respective ones of the plurality of constrictor element 308 may include a flexion surface 312. A force acting upon the flexion surface 312 by the relatively higher-pressure fluid volume, such as in the upstream-flexure chamber region 310*a*, may cause the flow constrictor 304 to move in relation to the seal body 302, the flexure chamber 310, and/or the aspiration conduit 242. The force acting on the respective flexion surfaces 312 may depend at least in part on a projected area of the sum of the respective flexion surfaces 312 ($A_P$) of the flow constrictor 304. By way of example, as shown, a first flexion surface 312*a* may have a first area $A_P1$, a second flexion surface 312*b* may have a second area $A_P2$, a third flexion surface 312*c* may have a third area $A_P3$, a fourth flexion surface 312*d* may have a fourth area $A_P4$, and/or a fifth flexion surface 312*e* may have a fifth area $A_P5$. As shown, by way of example, the first, second, third, and fourth flexion surfaces 312 may correspond to flexure elements 306, and the fifth flexion surface 312 may correspond to a constrictor element 308. In the foregoing example, the parameter ($A_P$) representing the projected area of the sum of the respective flexion surfaces 312 may be described by the property: $A_P=A_P1+A_P2+A_P3+A_P4+A_P5$. Movement of a flow constrictor 304 as a result of the force acting upon the respective flexion surfaces 312 may depend at least in part on a length (L) of the respective flexion surfaces 312 of the respective flexure elements 306.

Referring now to FIGS. 5A and 5B, FIGS. 5C and 5D, FIGS. 5E and 5F, FIGS. 5G and 5H, and FIGS. 5I and 5J, further exemplary seal assemblies 200 that include a passive flow regulator 300 are described. The seal assemblies 200 respectively shown in FIGS. 5A and 5B, FIGS. 5C and 5D, FIGS. 5E and 5F, FIGS. 5G and 5H, and FIGS. 5I and 5J, may include a passive flow regulator 300 with certain aspects configured in a similar manner as the exemplary passive flow regulator 300 in the seal assembly 200 shown in FIGS. 3A and 3B, and accordingly, unless the context otherwise requires, the presently disclosed seal assemblies 200 described with respect to FIGS. 3A and 3B applies similarly to the exemplary seal assemblies 200 shown and described with reference to FIGS. 5A and 5B, FIGS. 5C and 5D, FIGS. 5E and 5F, FIGS. 5G and 5H, and FIGS. 5I and 5J, with corresponding reference numbers referring to the same or similar elements. Additionally, or in the alternative, features and embodiments described with reference to any of FIGS. 3A and 3B, FIGS. 4A and 4B, FIGS. 5A and 5B, FIGS. 5C and 5D, FIGS. 5E and 5F, FIGS. 5G and 5H, and FIGS. 5I and 5J, may also be included in combination with and/or in substitution for other features and embodiments described with reference thereto. In some embodiments, the seal assemblies shown in FIGS. 5A and 5B, FIGS. 5C and 5D, FIGS. and 5F, FIGS. 5G and 5H, and FIGS. 5I and 5J may respectively show a seal assembly in a relaxation state (FIGS. 5A, 5C, 5E, 5G, and SI) and a flexion state (FIGS. 5B, 5D, 5F, 5H, and 5J).

Figure 5A:
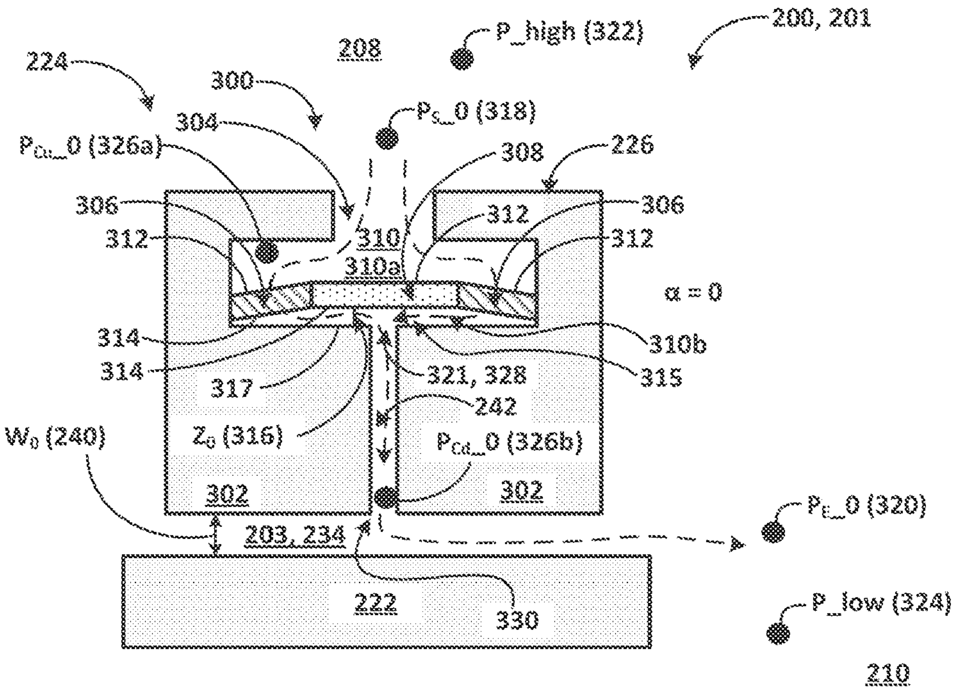
FIGS. 5A and 5B respectively show a schematic side cross-sectional view of another exemplary passive flow regulator, respectively depicting a position of a seal body of the passive flow regulator during operation at a first operating condition and a second operating condition.
Figure 5B:
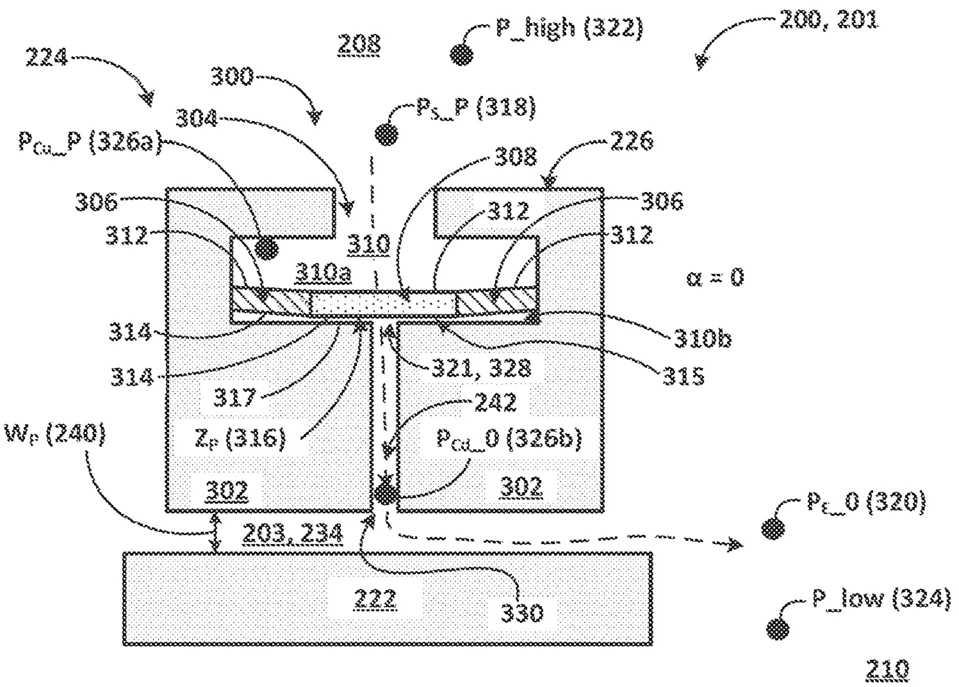

Referring now, by way of example, to FIGS. 5A and 5B, a passive flow regulator 300 may include a seal body 302 that defines a flexure chamber 310 and an aspiration conduit 242 located downstream from the flexure chamber 310. As shown, at least a portion of the flow constrictor 304, such as at least a portion of the one or more flexure elements 306 and/or at least a portion of the constrictor element 308, may be located adjacently upstream of the aspiration conduit 242. The term "adjacently upstream," when used herein with reference to a location of a flow constrictor 304, and/or a location of a flexure elements 306 or a constrictor element 308, such as in relation to an aspiration conduit 242, refers to an upstream location that allows the flow constrictor 304, flexure elements 306 and/or constrictor element 308, as applicable, to vary a width of a variable-resistance pathway 315 with changing pressure differential across the flow constrictor 304.

Additionally, or in the alternative, as shown, at least a portion of the flow constrictor 304, such as at least a portion of the one or more flexure elements 306 and/or at least a portion of the constrictor element 308, may partially constrict an aspiration conduit-inlet 328. The aspiration conduit-inlet 328 may include one or more orifices, openings, or the like, providing fluid communication between the flexure chamber 310 and the aspiration conduit 242 located downstream from the flexure chamber 310. In some embodiments, the aspiration conduit-inlet 328 may define a flexure chamber-outlet 321. The flow constrictor 304 and/or the constrictor element 308 may increasingly constrict the aspiration conduit-inlet 328 and/or the flexure chamber-outlet 321, with increasing pressure differential across the flow constrictor 304 and/or the passive flow regulator 300. The aspiration conduit 242 located downstream from the flexure chamber 310 may include an aspiration conduit-outlet 330. The aspiration conduit-outlet 330 may include one or more orifices, openings, or the like, providing fluid communication between the aspiration conduit 242 and the fluid-bearing gap 240. The term "orifice" may refer to an aperture, a hole, or the like. The term "opening" may refer to a gap or space between adjacent surfaces.

As shown, for example, in FIGS. 5A and 5B, in some embodiments, at least a portion of a flow constrictor 304, such as at least a portion of the constrictor element 308 of the flow constrictor 304, may at least partially cover one or more flexure chamber-outlets 321. The flow constrictor 304 and/or the constrictor element 308 may be configured as a flap, a seal, a cover, or the like. Such portion of the flow constrictor 304 and/or constrictor element 308 may at least partially overlap, cover, or otherwise reside in front of the aspiration conduit-inlet 328 and/or the flexure chamber-outlet 321. An extent to which such portion of the flow constrictor 304 and/or constrictor element 308 overlaps, covers, or otherwise resides in front of the aspiration conduit-inlet 328 and/or the flexure chamber-outlet 321 may be described with reference to a variable-resistance pathway-parameter 316 corresponding to a width of a variable-resistance pathway 315, such as a distance between the flow constrictor-surface 314 and the pathway surface 317, such as an adjacently downstream surface of the flexure chamber 310. In some embodiments, as shown, for example, in FIGS. 5A and 5B, the flow constrictor-surface 314 may include a downstream surface of the constrictor element 308, and the pathway surface 317 may be adjacently downstream from the flow constrictor-surface 314. The flow constrictor-surface 314 may generate hydraulic resistance based at least in part on the variable-resistance pathway-parameter 316. The variable-resistance pathway-parameter 316 may indicate the flow constrictor-surface 314 increasingly approaching the pathway surface 317, with increasing pressure differential across the flow constrictor 304 and/or the passive flow regulator 300.

Figure 5C:
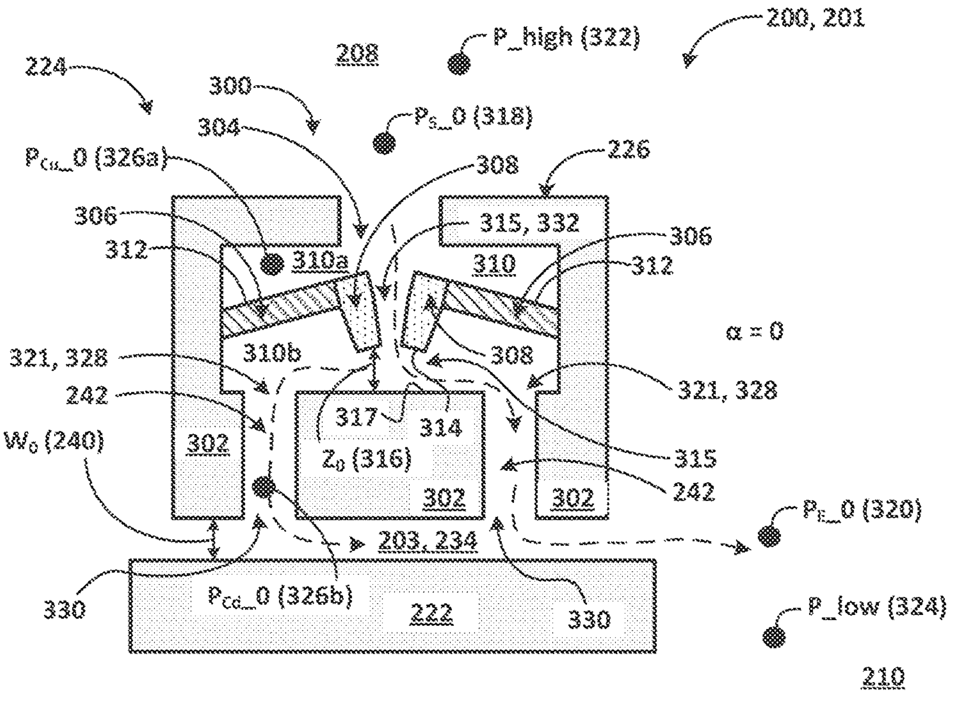
FIGS. 5C and 5D respectively show a schematic side cross-sectional view of yet another exemplary passive flow regulator, respectively depicting a position of a seal body of the passive flow regulator during operation at a first operating condition and a second operating condition.
Figure 5D:
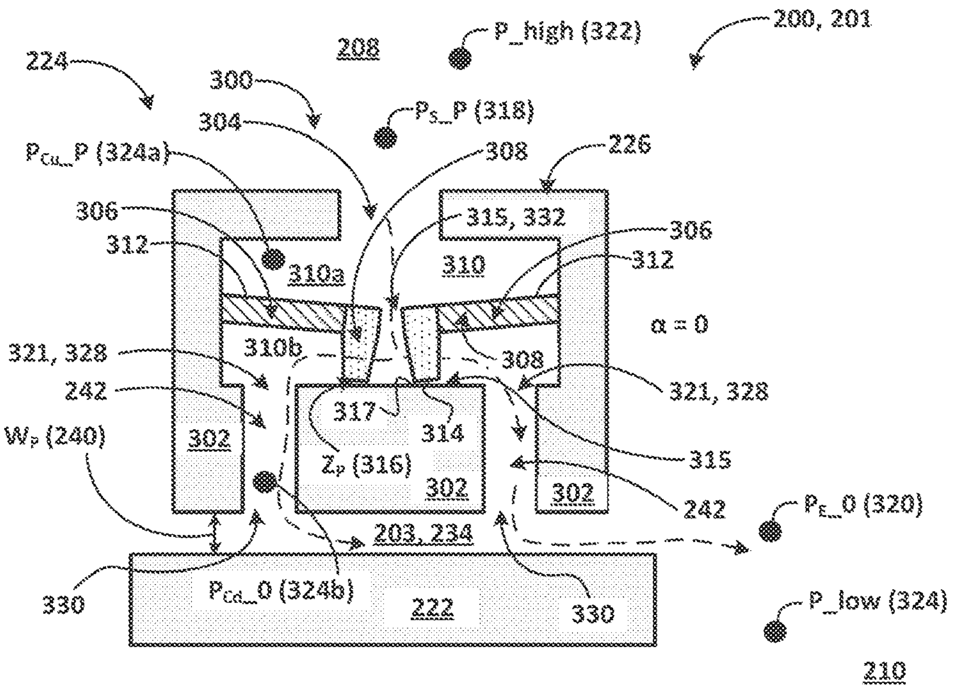

Referring now, by way of example, to FIGS. 5C and 5D, in some embodiments, a passive flow regulator 300 may include a flow constrictor 304 that defines one or more flexure apertures 332 that provide fluid communication through the flexure chamber 310. As shown, for example, in FIGS. 5C and 5D, the one or more flexure apertures 332 may be defined by one or more constrictor elements 308. For example, a flow constrictor 304 may include a constrictor element 308 that has one or more orifices, openings, or the like, providing fluid communication across the constrictor element 308, such as from a first side of the constrictor element 308 that defines a flexion surface 312 of the constrictor element 308 to a second side of the constrictor element 308 that defines the flow constrictor-surface 314 of the constrictor element 308. Additionally, or in the alternative, a flow constrictor 304 may include adjacently disposed constrictor elements 308. The adjacently disposed constrictor elements 308 may together define a flexure aperture 332 therebetween. At least a portion of the flow constrictor 304 defining the flexure aperture 332, such as at least a portion of the one or more constrictor elements 308, may be located adjacently upstream of one or more aspiration conduits 242. The flow constrictor 304 may be configured as a flap, a seal, a cover, or the like.

As shown, for example, in FIGS. 5C and 5D, a flow constrictor 304 may include one or more constrictor elements 308 that protrude from the corresponding one or more flexure elements 306. The one or more constrictor elements 308 may protrude in a downstream direction, such as into or towards the downstream-flexure chamber region 310*b*. A downstream portion of the respective constrictor elements 308 may define the flow constrictor-surface 314. Movement of the corresponding one or more flexure elements 306 responsive to a pressure differential across the flow constrictor 304 and/or the passive flow regulator 300 may cause the flow constrictor-surfaces 314 of the corresponding constrictor elements 308 to move in proximity to the corresponding pathway surface 317. A variable-resistance pathway-parameter 316 may represent a cross-sectional width and/or area of the variable-resistance pathway 315 defined between the respective flow constrictor-surfaces 314 and the corresponding pathway surface 317. Additionally, or in the alternative, such movement of the corresponding one or more flexure elements 306 may cause a change in a variable-resistance pathway-parameter 316 representing a cross-sectional width and/or area of the respective flexure aperture 332.

Figure 5E:
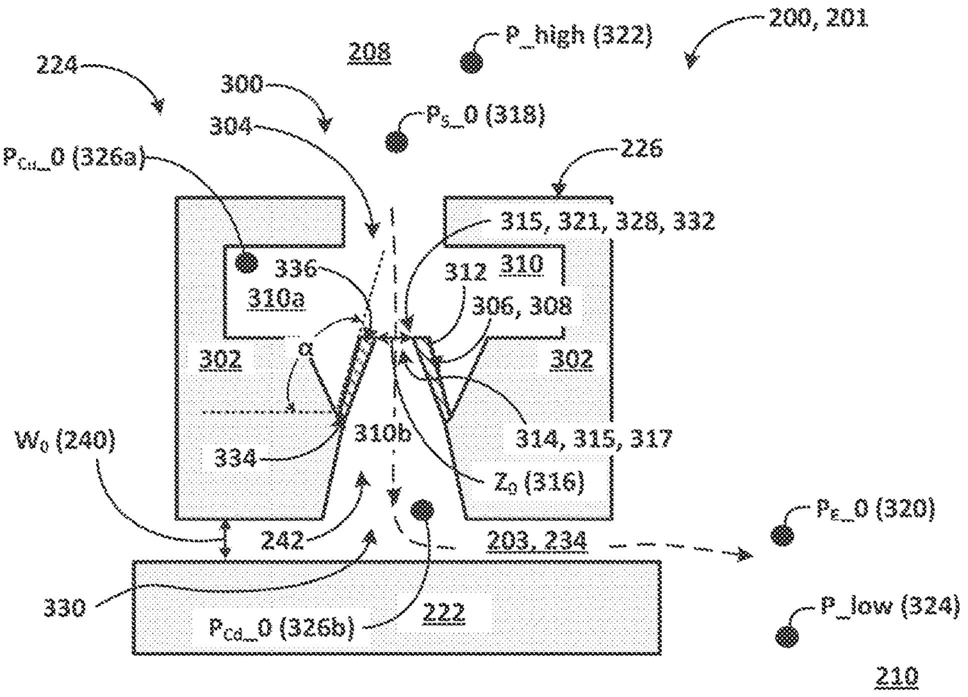
FIGS. 5E and 5F respectively show a schematic side cross-sectional view of yet another exemplary passive flow regulator, respectively depicting a position of a seal body of the passive flow regulator during operation at a first operating condition and a second operating condition.
Figure 5F:
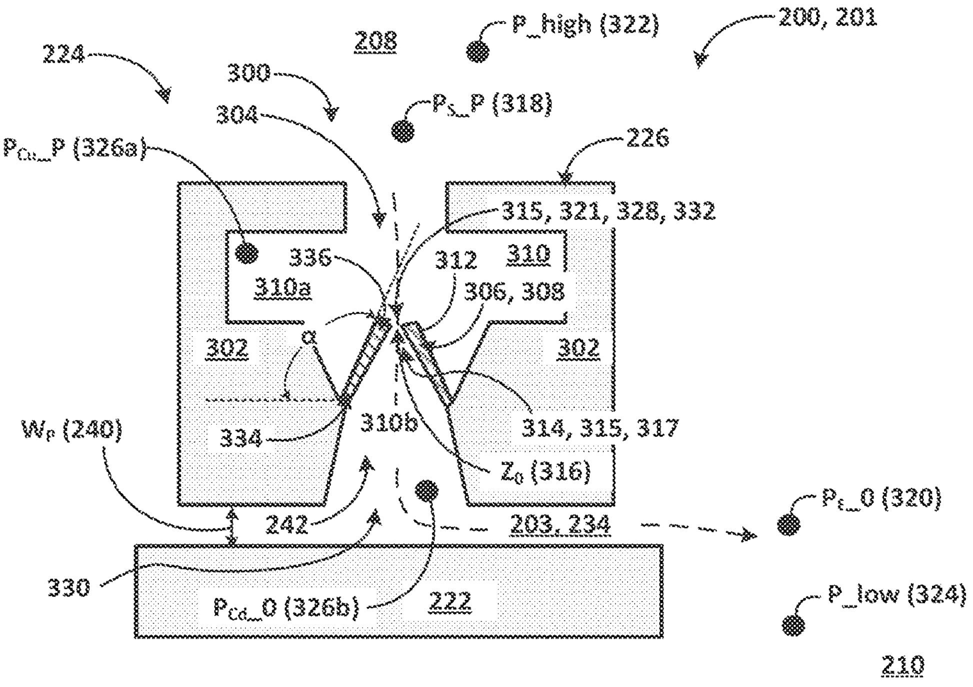

Referring now, by way of example, to FIGS. 5E and 5F, in some embodiments, a passive flow regulator 300 may include a flow constrictor 304 that has a plurality of adjacently disposed flexure elements 306. The adjacently disposed flexure elements 306 may define a flexure aperture 332 therebetween. A variable-resistance pathway-parameter 316 may be defined between the adjacently disposed flexure elements 306. The variable-resistance pathway-parameter 316 may represent a cross-sectional width and/or area of the flexure aperture 332. Movement of the adjacently disposed flexure elements 306 in relation to one another may contract the flexure aperture 332 with increasing pressure differential and may expand the flexure aperture 332 with decreasing pressure differential. The extent that the flexure aperture 332 contracts and/or expands may be described with reference to a variable-resistance pathway-parameter 316 corresponding to a cross-sectional width or area of the flexure aperture 332. In some embodiments, the adjacently disposed flexure elements 306 may respectively include a constrictor element 308. Additionally, or in the alternative, as shown in FIGS. 5E and 5F, the constrictor element 308 may be omitted from the flow constrictor 304, and/or the flexure elements 306 may respectively function as a constrictor element 308. At least a portion of the flow constrictor 304 defining the flexure aperture 332, such as at least a portion of the one or more flexure elements 306, may be located adjacently upstream of one or more aspiration conduits 242.

In some embodiments, as shown, for example, in FIGS. 5E and 5F, the adjacently disposed flexure elements 306 may be configured and arranged in a cantilevered position. A flexure element 306 configured and arranged in a cantilevered position may include a fixed portion 334 and a cantilever portion 336. The fixed portion 334 may be coupled to or monolithically integrated with the seal body 302. The cantilever portion 336 may extend into a flexure chamber 310 and/or aspiration conduit 242. The one or more flexure elements 306 may be respectively configured as a flap, a seal, a cover, or the like. The adjacently disposed flexure elements 306 may respectively include a flow constrictor-surface 314. The flow constrictor-surfaces 314 may be adjacently disposed from one another. Hydraulic resistance may be generated based at least in part on a distance between the adjacently disposed flow constrictor-surfaces 314. The adjacently disposed flow constrictor-surfaces 314 may together define at least a portion of a variable-resistance pathway 315. The variable-resistance pathway 315 may lead to and/or define a flexure chamber-outlet 321 and/or an aspiration conduit-inlet 328. At least a portion of a flexure element 306 configured and arranged in a cantilevered position may be located adjacently upstream of one or more aspiration conduits 242.

Figure 5G:
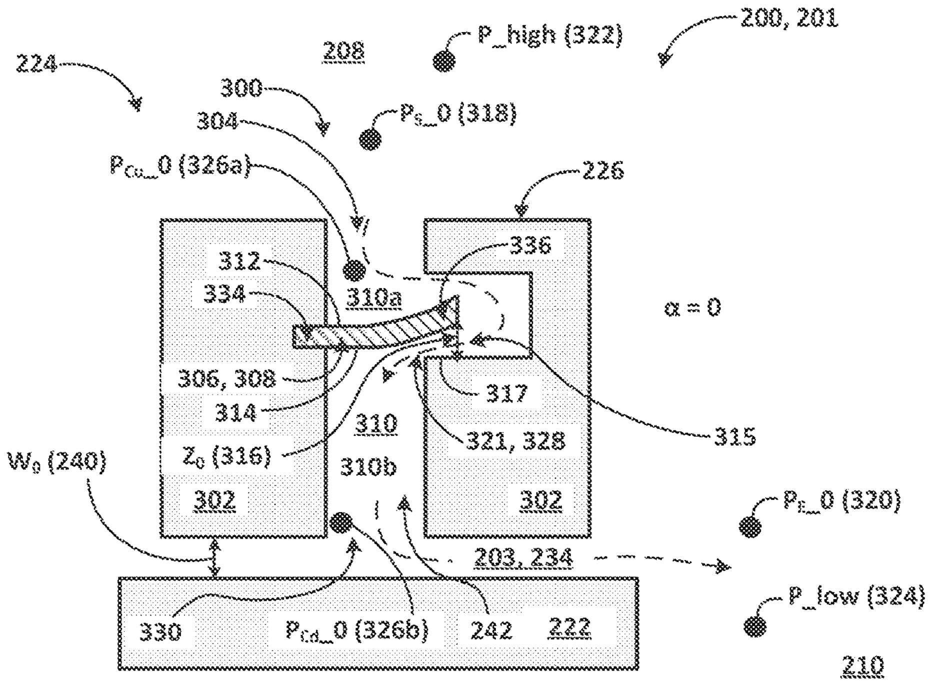
FIGS. 5G and 5H respectively show a schematic side cross-sectional view of yet another exemplary passive flow regulator, respectively depicting a position of a seal body of the passive flow regulator during operation at a first operating condition and a second operating condition.
Figure 5H:
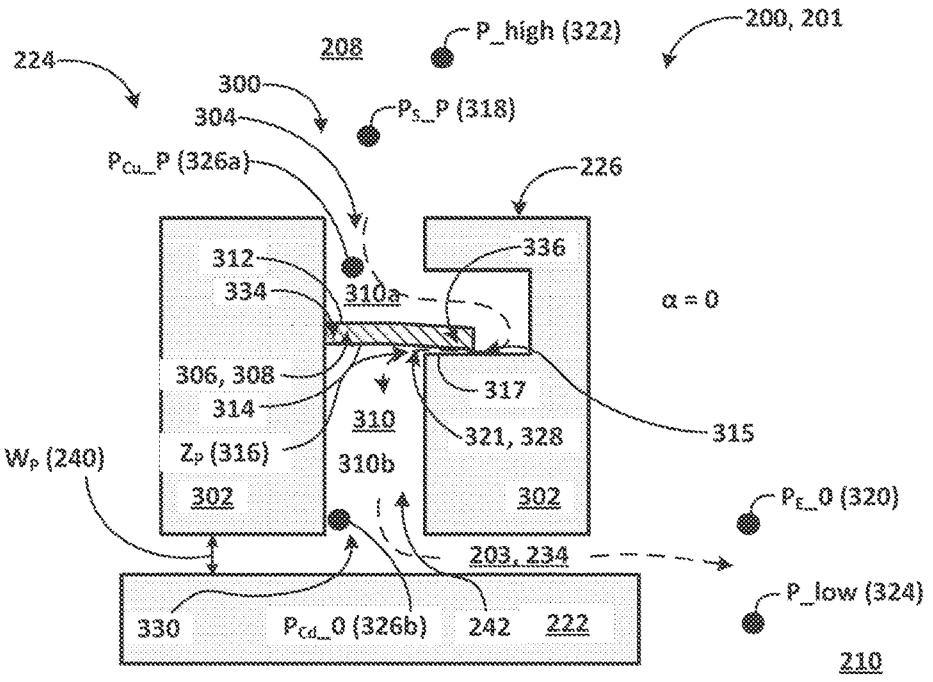

Referring now, by way of example, to FIGS. 5G and 5H, exemplary passive flow regulators 300 are further described. As shown, a flexure element 306 may include a cantilever portion 336 that extends into a flexure chamber 310 located adjacent to and in fluid communication with an aspiration conduit 242. The flexure chamber 310 located adjacent to the aspiration conduit 242 may surround at least part of the cantilever portion 336 of the flexure element 306. Additionally, or in the alternative, at least a part of the cantilever portion 336 may extend across aspiration conduit 242, such as at least partially into the adjacently located flexure chamber 310. A variable-resistance pathway 315 may be defined at least in part by the cantilever portion 336 of the flexure element 306 and at least in part by a pathway surface 317 defined by the seal body 302. The cantilever portion 336 of the flexure element 306 may include a flow constrictor-surface 314 disposed about a downstream side of the flexure element 306. The pathway surface 317 may be disposed adjacent to the flow constrictor-surface 314, such as adjacently downstream from the flow constrictor-surface 314. The flow constrictor-surface 314 and the pathway surface 317 may together define at least a portion of the variable-resistance pathway 315. The variable-resistance pathway 315 may lead to a flexure chamber-outlet 321 and/or an aspiration conduit-inlet 328. At least a portion of the flexure element 306, such as at least a portion of the cantilever portion 336 of the flexure element 306, may increasingly constrict the flexure chamber-outlet 321 and/or the aspiration conduit-inlet 328, with increasing pressure differential across the flow constrictor 304 and/or the passive flow regulator 300. The one or more flexure elements 306 may be respectively configured as a flap, a seal, a cover, or the like. In some embodiments, the flow constrictor 304 may include a constrictor element 308. In some embodiments, the constrictor element 308 may be omitted from the flow constrictor 304, and/or the cantilever portion 336 of the flexure element 306 may function as a constrictor element 308.

Figure 5I:
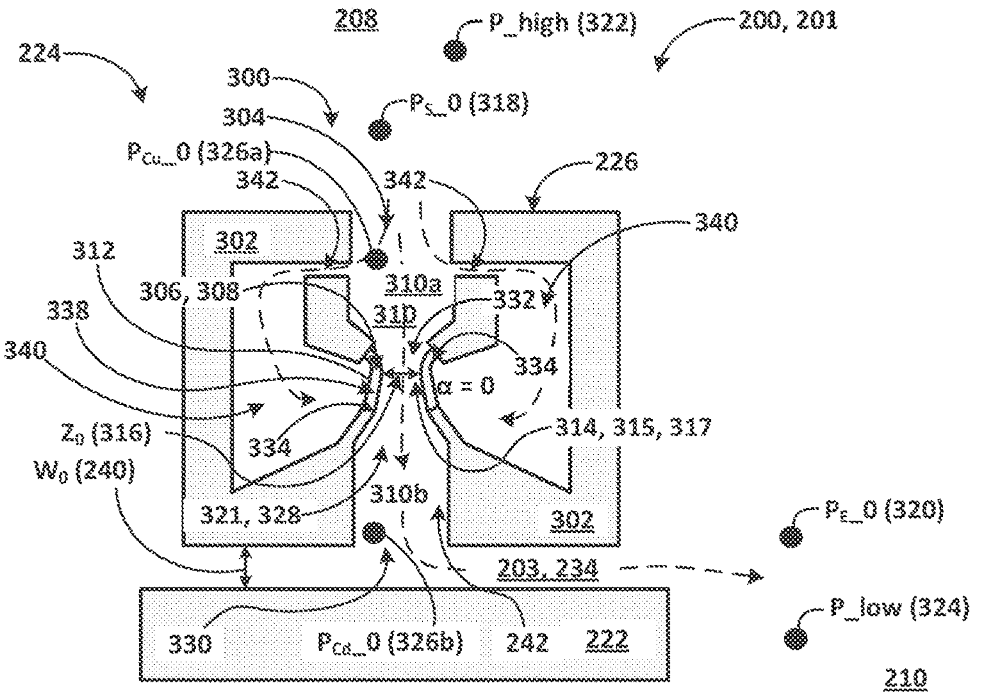
FIGS. 5I and 5J respectively show a schematic side cross-sectional view of yet another exemplary passive flow regulator, respectively depicting a position of a seal body of the passive flow regulator during operation at a first operating condition and a second operating condition.
Figure 5J:
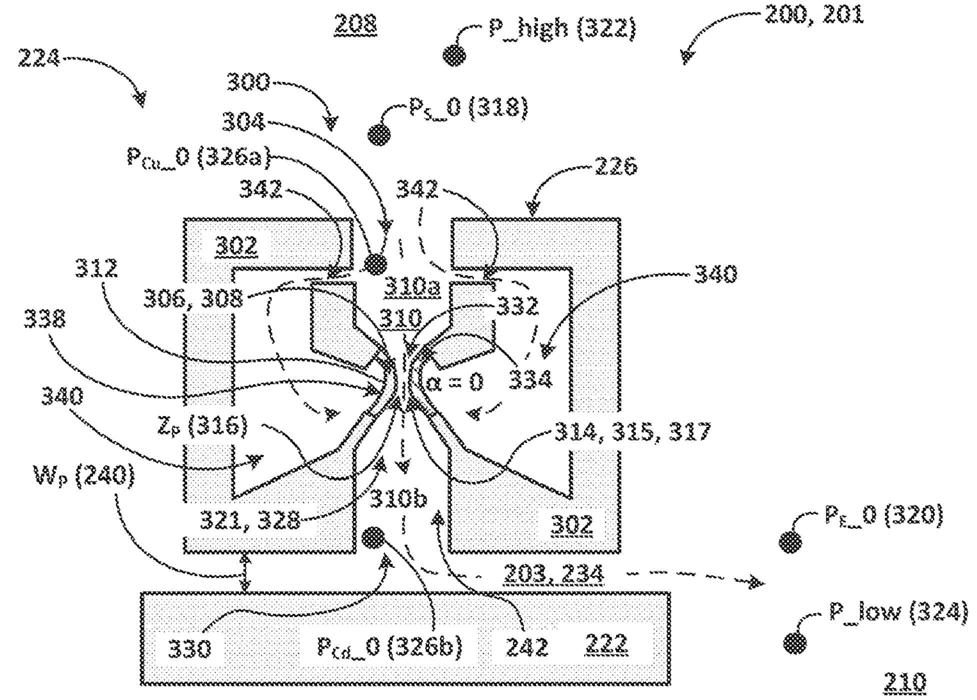

Referring now, by way of example, to FIGS. 5I and 5J, in some embodiments, a passive flow regulator 300 may include a flow constrictor 304 that has a plurality of adjacently disposed flexure elements 306, in which the respective flexure elements 306 include a fixed portion 334 at respectively opposite ends of the flexure element 306. The opposite ends of the flexure element 306 may be respectively coupled to or monolithically integrated with the seal body 302. Respective flexure elements 306 may include a first fixed portion 334 coupled to or monolithically integrated with a first portion of the seal body 302, and a second fixed portion 334 coupled to or monolithically integrated with a second portion of the seal body 302. The respective flexure elements 306 may include a flexure portion 338 adjacent to one or more fixed portions 334. For example, the flexure portion 338 may be disposed between the first fixed portion 334 and the second fixed portion 334. The adjacently disposed flexure elements 306 may define a flexure aperture 332 therebetween. At least a portion of the flexure elements 306 defining the flexure aperture 332 may be located adjacently upstream of one or more aspiration conduits 242. A variable-resistance pathway-parameter 316 may be defined between the adjacently disposed flexure elements 306. The variable-resistance pathway-parameter 316 may represent a cross-sectional width and/or area of the flexure aperture 332. Movement of the adjacently disposed flexure elements 306 in relation to one another, such as movement of the respective flexure portions 338, may contract the flexure aperture 332 with increasing pressure differential and may expand the flexure aperture 332 with decreasing pressure differential.

The extent to which the flexure aperture expands and/or contracts may be described with reference to a variable-resistance pathway-parameter 316 corresponding to a cross-sectional width or area of the flexure aperture 332. In some embodiments, the adjacently disposed flexure elements 306 may respectively include a constrictor element 308. Additionally, or in the alternative, the constrictor element 308 may be omitted from the flow constrictor 304, and/or the flexure elements 306 may respectively function as a constrictor element 308.

In some embodiments, as shown in FIGS. 5I and 5J, a seal body 302 may define one or more auxiliary chambers 340. The one or more auxiliary chambers 340 may fluidly communicate with a flexure chamber 310 and/or an aspiration conduit 242 by way of one or more auxiliary conduits 342 defined by the seal body 302. The one or more auxiliary conduits 342 may fluidly communicate with the flexure chamber 310 and/or the aspiration conduit 242 upstream from the adjacently disposed flexure elements 306. Fluid flow through the aspiration conduit 242 and/or the flexure chamber 310 may pressurize the one or more auxiliary chambers 340 by way of the one or more auxiliary conduits 342. The adjacently disposed flexure elements 306 may move in response to changes in a pressure within the corresponding one or more auxiliary chambers 340. Such a flexure element 306 may move to a flexed position when a pressure differential between a corresponding auxiliary chamber 340 and the flexure aperture 332 is greater than a threshold pressure differential sufficient to move the flexure element 306. The flexure element 306 may have a nominal position when a pressure differential between the corresponding auxiliary chamber 340 and the flexure aperture 332 is less than a threshold pressure differential sufficient to move the flexure element 306.

The sufficient changes in a pressure within the one or more auxiliary chambers 340 may correspondingly contract the variable-resistance pathway-parameter 316 representing a cross-sectional width and/or area of the flexure aperture 332 with increasing pressure and expand the variable-resistance pathway-parameter 316 with decreasing pressure. Additionally, or in the alternative, the adjacently disposed flexure elements 306 may move responsive to sufficient changes in a pressure within the flexure chamber 310 and/or aspiration conduit 242. The changes in a pressure within the flexure chamber 310 and/or the aspiration conduit 242 may correspondingly expand the variable-resistance pathway-parameter 316 representing a cross-sectional width and/or area of the flexure aperture 332 with increasing pressure and may correspondingly contract the variable-resistance pathway-parameter 316 with decreasing pressure.

Referring now to FIG. 6, FIGS. 7A and 7B, FIGS. 8A and 8B, FIGS. 9A and 9B, and with further reference, for example, to FIGS. 3A and 3B, exemplary flow regulation properties of seal assemblies that include a passive flow regulator 300 are further described.

In the context of aspirating seals used in rotary machines 50, such as turbine engines 100, including aeronautical gas turbine engines, provision of a suitable seal assembly that includes a passive flow regulator 300 may include carefully selecting a configuration for the passive flow regulator 300 that provides a suitable fluid flow rate through the aspiration conduits 242, and that yields a suitable hydraulic stiffness of the fluid-bearing gap 240 over an applicable range of operating conditions. For example, a flow regulator 300 that includes a flow constrictor 304 that moves too easily may result in unsuitably low flow rates with increasing pressure differential; whereas a flow constrictor 304 that is too resistant to movement may result in unsuitably high fluid flow rates at low pressure differentials. Additionally, or in the alternative, too high or too low of a fluid flow rate at a given pressure differential may affect the hydraulic stiffness. The present disclosure provides a flow regulation coefficient (k), a non-dimensional geometric parameter representing exemplary configurations of a passive flow regulator 300. This coefficient, defined below, was found, unexpectedly, to proscribe a desired geometric characteristics of a passive flow regulator taking into consideration both high and low fluid pressure situations.

In some embodiments, a passive flow regulator 300 may include a seal body 302 and one or more flow constrictors 304 configured and arranged such that the passive flow regulator 300 exhibits a desired flow regulation coefficient (k). The flow regulation coefficient (k) is described according to expression (2), as follows:

$$(k) = -\log 10\frac{A_P L^3 \cdot \cos\alpha}{3I \cdot Z_0} \tag{2}$$

The flow regulation coefficient (k) value depends on the sum of the following geometric features of the flow constrictor 304, including respective ones of the one or more flexure elements 306 and respective ones of the one or more constrictor elements 308: ($A_p$), representing a projected area of the sum of the one or more flexion surfaces 312 of the flow constrictor 304, such as the flexion surface 312 of respective ones of the one or more flexure elements 306 and/or respective ones of the one or more constrictor elements 308; (L), representing a length of respective ones of the one or more flexure elements 306; (α), representing represents the angle of incidence of the respective ones of the one or more flexion surfaces 312 in relation to the relatively higher-pressure fluid volume flowing through the aspiration conduit 242 and/or the flexure chamber 310 (e.g., the upstream-flexure chamber region 310*a*); (I), representing an area-moment of inertia of the flow constrictor 304, and ($Z_0$), representing a nominal value of the variable-resistance pathway-parameter (Z) 316 corresponding to a relaxation state of the flow constrictor 304.

The inventors found that exemplary passive flow regulators 300 that provide for a suitable fluid flow rate through the aspiration conduits 242, while further yielding a suitable hydraulic stiffness of the fluid-bearing gap 240 over an applicable range of operating conditions, may exhibit a flow regulation coefficient (k) within a range of from about 1 to 9, such as from about 3 to about 7, such as from about 1 to about 3, such as from about 7 to about 9, such as from about 2.5 to about 5.5, such as from about 2.5 to about 4.5, or such as from about 4.5 to about 5.5. Additionally, or in the alternative, a suitable fluid flow rate through the aspiration conduits 242 that also yields a suitable hydraulic stiffness of the fluid-bearing gap 240 over an applicable range of operating conditions may be realized by embodiments that have a flow regulation coefficient (k) outside the aforementioned range. Nevertheless, the aforementioned flow regulation coefficient (k) range encompass a broad category of exemplary embodiments that exhibit a desirable combination of suitable flow rate and hydraulic stiffness over an applicable range of operating conditions. Exemplary ranges of values for various aspects of the relationship defined by the flow regulation coefficient (k) are provided below.

In some embodiments, the parameter ($A_p$), representing the projected area of the sum of the one or more flexion surfaces 312, may have an area of from about $1\times10^{-5}$ square inch ($in^2$) to about $1\times10^{-1}$ $in^2$, such as from about $1\times10^{-4}$ $in^2$ to about $in^2$. In some embodiments, the parameter (L) representing the length of respective ones of the one or more flexion surfaces 312, may have a length of from about $1\times10^{-3}$ inch to about $5\times10^{-1}$ inch, such as from about $1\times10^{-2}$ inch to about $1\times10^{-1}$ inch. In some embodiments, parameter (I), representing the area-moment of inertia of the respective ones of the one or more flexure elements 306, may have a length-to-the-fourth-power, in inches ($in^4$), of from about $1\times10^{-10}$ $in^4$ to about $1\times10^{-5}$ $in^4$, such as from about $1\times10^{-8}$ $in^4$ to about $1\times10^{-6}$ $in^4$. In some embodiments, the nominal value ($Z_0$) of the variable-resistance pathway-parameter 316 may have a length or width of from about $1\times10^{-5}$ inch to about $1\times10^{-1}$ inch, such as from about $1\times10^{-4}$ inch to about inch. In some embodiments, the angle of incidence ($\alpha$) of the flexure elements 306 may be from about 0 degrees to about 90 degrees, such as from about 0 degrees to about 60 degrees, such as from about 0 degrees to about 45 degrees, such as from about 0 degrees to about 30 degrees, or such as from about 0 degrees to about 10 degrees.

Figure 6:
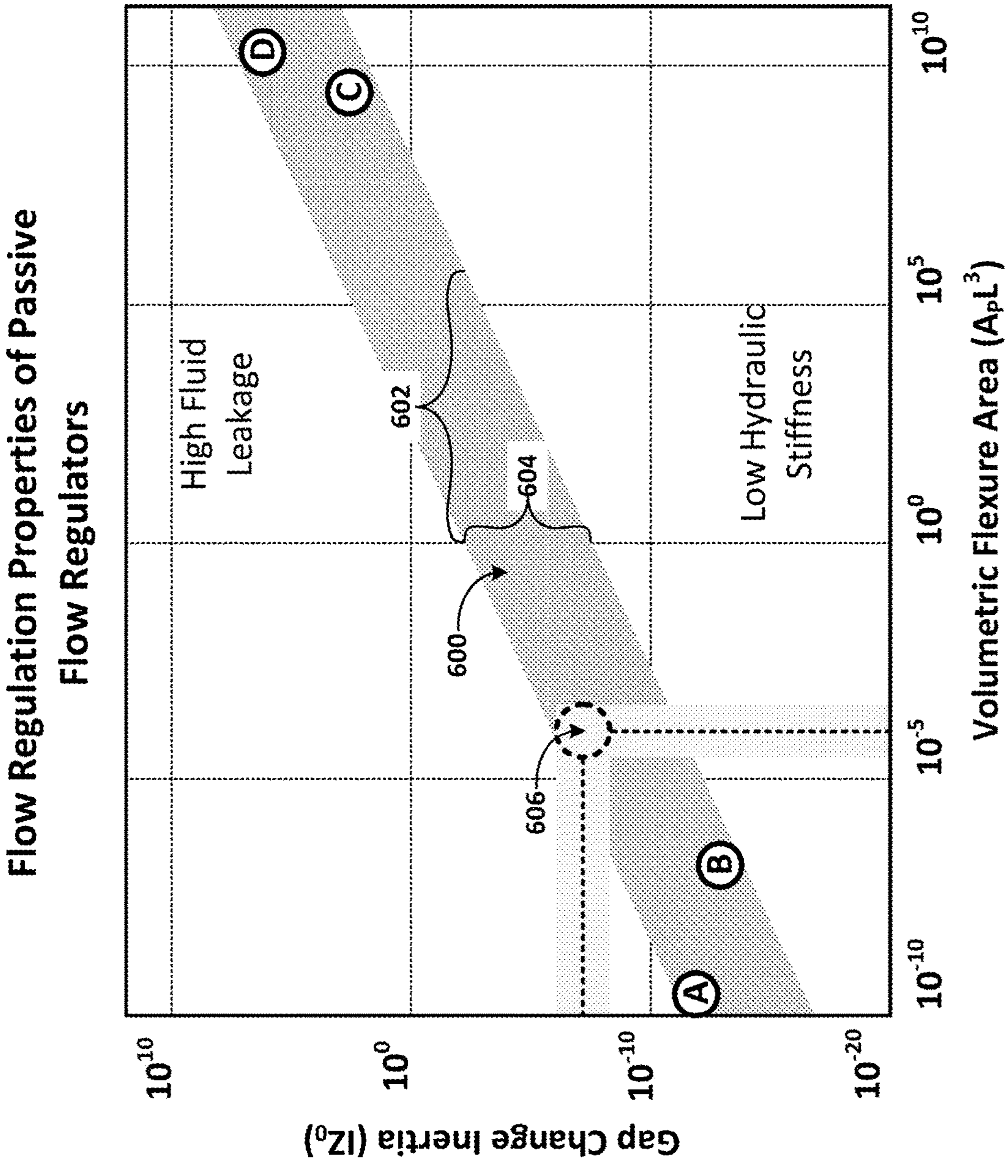
FIG. 6 shows a chart depicting exemplary configurations of passive flow regulators in respect of a gap change inertia and a volumetric flexure-area.

As shown in FIG. 6, exemplary flow regulation properties of seal assemblies 200 that include a passive flow regulator 300 may be described with reference to a volumetric flexure area ($A_PL^3$) representing a product of the parameter ($A_p$) and the parameter ($L^3$) described above with respect to expression (2). Additionally, or in the alternative, exemplary flow regulation properties of seal assemblies 200 that include a passive flow regulator 300 may be described with reference to a gap change inertia ($IZ_0$) representing a product of the parameter (I) and the parameter ($Z_0$) described above with respect to expression (2). As shown by expression (2), the flow regulation coefficient (k) depends at least in part on the gap change inertia ($IZ_0$) and the volumetric flexure area ($A_PL^3$). As shown in FIG. 6, the volumetric flexure area ($A_PL^3$) may be determined for a flow constrictor 304 that has one or more flexion surfaces 312 oriented normal to the relatively higher-pressure fluid volume, such that the angle of incidence ($\alpha$) of the one or more flexure elements 306 is zero. Additionally, or in the alternative, the volumetric flexure area ($A_PL^3$) may be augmented or scaled based at least in part on a cosine of the angle of incidence ($\alpha$), as shown in expression (2).

In some embodiments, a seal assembly 200 may include a passive flow regulator 300 with one or more flow constrictors 304 that exhibit a volumetric flexure area ($A_PL^3$) and/or a gap change inertia ($IZ_0$) as respectively shown in FIG. 6. The volumetric flexure area ($A_PL^3$) and/or the gap change inertia ($IZ_0$) of a flow constrictor 304 area may be selected at least in part to provide a suitable flow of fluid past the flow constrictor 304, and/or to provide a fluid-bearing gap 240 with a suitable hydraulic stiffness. FIG. 6 shows a first shaded region 600 representing an exemplary range of suitable values for the volumetric flexure area ($A_PL^3$) and/or the gap change inertia ($IZ_0$) of exemplary flow constrictors 304. The first shaded region 600 may correspond to suitable values for the volumetric flexure area ($A_PL^3$) and the gap change inertia ($IZ_0$) that exhibit a suitable flow regulation coefficient (k) according to expression (2). In some embodiments, the volumetric flexure area ($A_PL^3$) may be from about $10^{-10}$ to about $10^{10}$. Additionally, or in the alternative, in some embodiments, the gap change inertia ($IZ_0$) may be from about $10^{-20}$ to about $10^{10}$.

In some embodiments, as shown in FIG. 6, a flow constrictor 304 may have a relatively low volumetric flexure area ($A_PL^3$) and a relatively low gap change inertia ($IZ_0$). For example, embodiment (A) shown in FIG. 6 represents an exemplary flow constrictor 304 that has a relatively low volumetric flexure area ($A_PL^3$) and a corresponding maximum gap change inertia ($IZ_0$). For the exemplary flow constrictor 304 corresponding to embodiment (A), an increase in gap change inertia ($IZ_0$), and/or a decrease in volumetric flexure area ($A_PL^3$), may decrease sensitivity to pressure differential ($\Delta P$), for example, between a source pressure ($P_S$) 318 and an exit pressure ($P_E$) 320. Such a decrease in sensitivity to pressure differential ($\Delta P$) may correspond to an increasing fluid flow rate with increasing pressure differential, which may result in excess fluid flow across the seal assembly 200 at a relatively high pressure differential ($\Delta P$). As another example, embodiment (B) shown in FIG. 6 represents an exemplary flow constrictor 304 that has a relatively low volumetric flexure area ($A_PL^3$) and a corresponding minimum gap change inertia ($IZ_0$). For the exemplary flow constrictor 304 corresponding to embodiment (B), a decrease in gap change inertia ($IZ_0$), and/or an increase in volumetric flexure area ($A_PL^3$), may increase sensitivity to pressure differential ($\Delta P$), for example, between a source pressure ($P_S$) 318 and an exit pressure ($P_E$) 320. Such an increase in sensitivity to pressure differential ($\Delta P$) may correspond to a decreasing fluid flow rate with increasing pressure differential, which may starve the fluid-bearing gap 240 at a relatively high pressure differential ($\Delta P$).

In some embodiments, as shown in FIG. 6, a flow constrictor 304 may have a relatively high volumetric flexure area ($A_PL^3$) and a relatively high gap change inertia. For example, embodiment (C) shown in FIG. 6 represents an exemplary flow constrictor 304 that has a relatively high volumetric flexure area ($A_PL^3$) and a corresponding minimum gap change inertia ($IZ_0$). For the exemplary flow constrictor 304 corresponding to embodiment (C), a decrease in gap change inertia ($IZ_0$), and/or an increase in volumetric flexure area ($A_PL^3$), may increase sensitivity to pressure differential ($\Delta P$), for example, between a source pressure ($P_S$) 318 and an exit pressure ($P_E$) 320. Such an increase in sensitivity to pressure differential ($\Delta P$) may correspond to a decreasing fluid flow rate with increasing pressure differential, which may starve the fluid-bearing gap 240 at a relatively high pressure differential ($\Delta P$). As another example, embodiment (D) shown in FIG. 6 represents an exemplary flow constrictor 304 has a relatively high volumetric flexure area ($A_PL^3$) and a corresponding maximum gap change inertia ($IZ_0$). For the exemplary flow constrictor 304 corresponding to embodiment (D), an increase in gap change inertia ($IZ_0$), and/or a decrease in volumetric flexure area ($A_PL^3$), may decrease sensitivity to pressure differential ($\Delta P$), for example, between a source pressure ($P_S$) 318 and an exit pressure ($P_E$) 320. Such a decrease in sensitivity to pressure differential ($\Delta P$) may correspond to an increasing fluid flow rate with increasing pressure differential, which may result in excess fluid flow across the seal assembly 200 at a relatively high pressure differential ($\Delta P$).

In some embodiments, an exemplary flow constrictor 304 may exhibit a volumetric flexure area ($A_PL^3$) within a range 602 that has a maximum value and a minimum value separated by about $1\times10^7$, such as about $1\times10^7\pm20\%$. Additionally, or in the alternative, an exemplary flow constrictor 304 may exhibit a gap change inertia ($IZ_0$), within a range 604 that has a maximum value and a minimum value separated by about $1\times10^5$, such as about $1\times10^5\pm20\%$.

In some embodiments, as shown in FIG. 6 by a second shaded region 606, exemplary flow constrictors 304 that exhibit suitable flow regulation coefficient (k) according to expression (2) may be configured with a volumetric flexure area ($A_P L^3$) of from about $10^{-5}$ to about $10^0$, such as from about $10^{-5}$ to about $10^{-2}$, or such as from about $10^{-5}$ to about $10^{-3}$. Additionally, or in the alternative, as shown by the second shaded region 606, exemplary flow constrictors 304 that exhibit suitable flow regulation coefficient (k) according to expression (2) may be configured with a gap change inertia ($IZ_0$) of from about $10^{-10}$ to about $10^0$, such as from about $10^{-10}$ to about $10^{-5}$, or such as from about $10^{-8}$ to about $10^{-6}$.

Figure 7A:
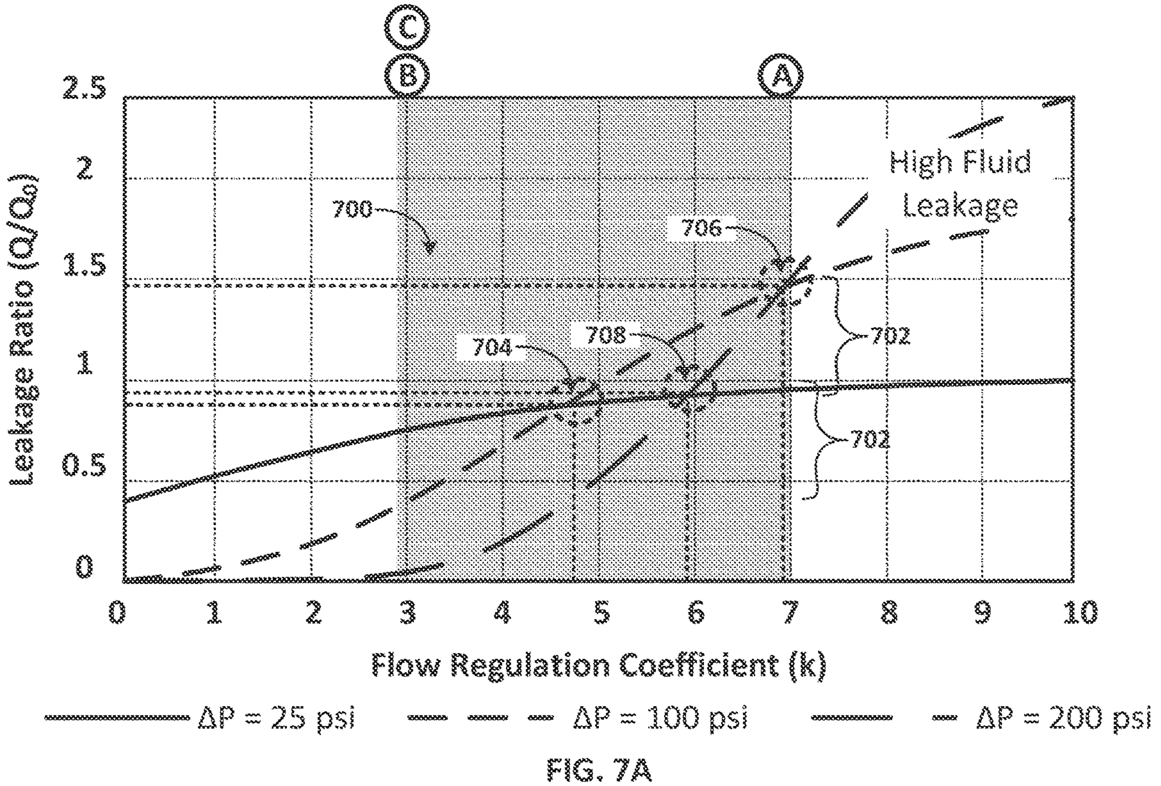
FIG. 7A shows a chart depicting exemplary configurations of passive flow regulators in respect of a leakage ratio and a flow regulation coefficient.
Figure 7B:
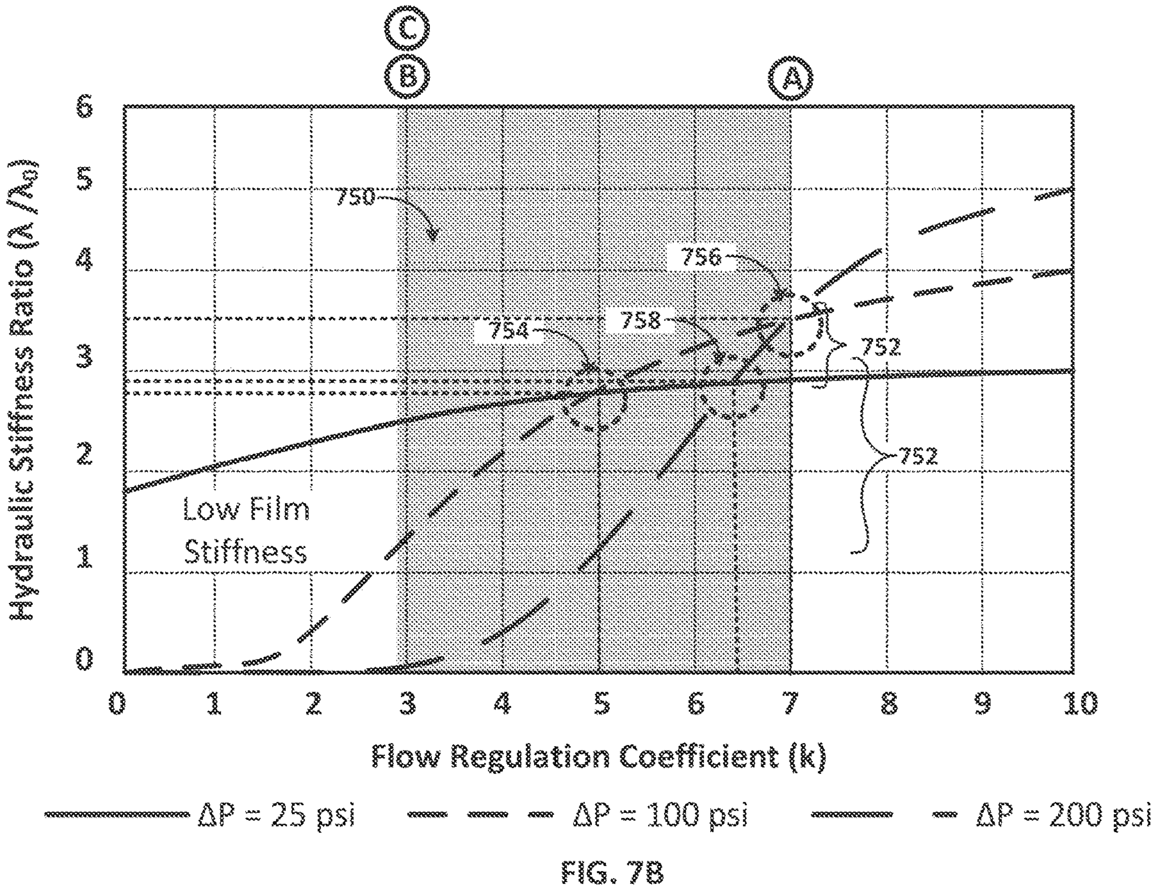
FIG. 7B shows a chart depicting exemplary configurations of passive flow regulators in respect of a hydraulic stiffness ratio and a flow regulation coefficient.

Referring now to FIGS. 7A and 7B, exemplary flow regulation properties of seal assemblies 200 that include a passive flow regulator 300 are further described. As shown in FIG. 7A, an exemplary passive flow regulator 300 may be described with reference to a leakage ratio ($Q/Q_0$), where ($Q_0$) represents a fluid flow rate across the passive flow regulator 300 and/or the flow constrictor 304 with the flow constrictor 304 in a relaxation state, and where (Q) represents a fluid flow rate across the passive flow regulator 300 and/or the flow constrictor 304 with the flow constrictor 304 in a flexion state corresponding to a given pressure differential (ΔP). The parameter ($Q_0$) may sometimes be referred to as a "relaxation fluid flow rate," and the parameter (Q) may sometimes be referred to as a "flexion fluid flow rate." In some embodiments, the leakage ratio may depend at least in part on the flow regulation coefficient (k) described with reference to expression (2). Additionally, or in the alternative, the leakage ratio may depend at least in part on the pressure differential (ΔP).

A leakage ratio of 1.0 represents relatively constant flow rate as between the relaxation state and the flexion state corresponding to a given pressure differential (ΔP). A leakage ratio of less than 1.0 indicates that the passive flow regulator 300 has a lower flow rate at a flexion state corresponding to a given pressure differential (ΔP) relative to the relaxation state. For example, a decreasing leakage ratio, such as a leakage ratio approaching zero, with increasing pressure differential (ΔP) represents a decreasing fluid flow rate with increasing pressure differential, which may starve the fluid-bearing gap 240 at a relatively high pressure differential (ΔP). A leakage ratio of greater than 1.0 indicates that the passive flow regulator 300 has a higher flow rate at a flexion state corresponding to a given pressure differential (ΔP) relative to the relaxation state. For example, a leakage ratio increasingly greater than 1.0 with increasing pressure differential (ΔP) represents an increasing fluid flow rate with increasing pressure differential, which may result in excess fluid flow across the seal assembly 200 at a relatively high pressure differential (ΔP).

In some embodiments, a relatively low flow regulation coefficient (k) may correspond to a leakage ratio ($Q/Q_0$) of less than 1.0 at a given pressure differential (ΔP). For example, as shown in FIG. 7A, embodiments (B) and (C) may exhibit a flow regulation coefficient (k) of about 2.5 to about 3.5, such as about 2.8 to about 3.2. With such a flow regulation coefficient (k), embodiments (B) and (C) may exhibit a decreasing leakage ratio with increasing pressure differential (ΔP). For example, as shown, embodiments (B) and (C) may exhibit a leakage ratio of from about 0.05 to about 1.0, such as from about 0.1 to about 0.7, over a pressured differential range corresponding to an operating range of the seal assembly 200. For example, at a pressure differential of about 25 psi, embodiments (B) and (C) may exhibit a leakage ratio of from about 0.6 to about 1.0, such as from about 0.7 to about 0.9. Additionally, or in the alternative, at a pressure differential of about 100 psi, embodiments (B) and (C) may exhibit a leakage ratio of from about 0.2 to about 0.5, such as from about 0.3 to about 0.4. Additionally, or in the alternative, at a pressure differential of about 200 psi, embodiments (B) and (C) may exhibit a leakage ratio of from about 0.05 to about such as from about 0.1 to about 0.15.

Additionally, or in the alternative, in some environments, a relatively high flow regulation coefficient (k) may correspond to a leakage ratio ($Q/Q_0$) of greater than 1.0 at a given pressure differential (ΔP). For example, as shown in FIG. 7A, embodiment (A) may exhibit a flow regulation coefficient (k) of about 6.5 to about 6.5, such as about 6.8 to about 7.2. With such a flow regulation coefficient (k), embodiment (A) may exhibit an increasing leakage ratio with increasing pressure differential (ΔP). For example, as shown, embodiment (A) may exhibit a leakage ratio of from about 0.7 to about 1.7, such as from about 0.9 to about 1.5, over a pressured differential range corresponding to an operating range of the seal assembly 200. For example, at a pressure differential of about 25 psi, embodiment (A) may exhibit a leakage ratio of from about 0.7 to about 1.1, such as from about 0.9 to about 1.0. Additionally, or in the alternative, at a pressure differential of about 100 psi, and/or at a pressure differential of about 200 psi, embodiment (A) may exhibit a leakage ratio of from about 1.3 to about 1.7, such as from about 1.4 to about 1.5.

FIG. 7A shows a first shaded region 700 representing an exemplary range of values for a flow regulation coefficient (k) that exhibit a suitable leakage ratio ($Q/Q_0$) over a pressure differential range corresponding to an exemplary operating range of a seal assembly 200. As shown, an exemplary range for the flow regulation coefficient (k) may be from about 3.0 to about 7.0. In some embodiments, a flow regulation coefficient (k) for a passive flow regulator 300, such as a passive flow regulator 300 that exhibits a flow regulation coefficient (k) of from about 3.0 to about 7.0, may exhibit a leakage ratio of from about 0.1 to about 2.5, such as from about 0.1 to about 1.5, such as from about 0.5 to about 1.0, or such as from about 1.0 to about 1.5, over a pressure differential range corresponding to an operating range of the seal assembly 200 that includes the passive flow regulator 300. For example, the pressure differential (ΔP) across the passive flow regulator 300 may range from about 25 psi to about 200 psi, such as from about 25 psi to about 100 psi, or such as from about 100 psi to about 200 psi. Additionally, or in the alternative, the passive flow regulator 300, such as a passive flow regulator 300 that exhibits a flow regulation coefficient (k) from about 3.0 to about 7.0, may exhibit a leakage ratio within a range 702 that has a maximum value and a minimum value separated by less than about 0.7, such as about 0.5. The range 702 of the leakage ratio may be determined for a pressure differential range corresponding to an operating range of the seal assembly 200 that includes the passive flow regulator 300, such as from about 25 psi to about 200 psi, such as from about 25 psi to about 100 psi, or such as from about 100 psi to about 200 psi.

By way of example, a passive flow regulator 300 configured according to a first embodiment 704 may exhibit a flow regulation coefficient (k) of from about 4.5 to about 5.0, such as from about 4.6 to about 4.9. A passive flow regulator 300 configured according to the first embodiment 704 may exhibit a leakage ratio ($Q/Q_0$) range of from about 0.3 to about 1.2 over an operating range of the seal assembly 200 that includes the passive flow regulator 300, such as from about 25 psi to about 200 psi, such as from about 25 psi to about 100 psi, or such as from about 100 psi to about 200 psi. In some embodiments, as shown in FIG. 7A, a passive flow regulator 300 configured according to the first embodiment 704 may exhibit a relatively constant leakage ratio over at least a portion of such operating range, such as between a first pressure differential and a second pressure differential. For example, the first pressure differential may be about 25 psi and the second pressure differential may be about 100 psi. Additionally, or in the alternative, the first pressure differential and the second pressure differential may differ from one another by up to about 75 psi or more, such as at least about 25 psi, such as at least about 50 psi, or such as at least about 70 psi. The relatively constant leakage ratio may include a flexion fluid flow rate (Q) that differs from a relaxation fluid flow rate ($Q_0$) by less than 20%, such as less than 10%, such as less than 5%.

Additionally, or in the alternative, in some embodiments, a passive flow regulator 300 configured according to the first embodiment 704 may exhibit a decreasing leakage ratio ($Q/Q_0$) over at least a portion of such operating range, such as over a portion of the operating range with respect to which the passive flow regulator 300 exhibits a pressure differential that is greater than the pressure differential corresponding to the portion of the operating range with respect to which the passive flow regulator 300 exhibits a relatively constant leakage ratio. For example, the passive flow regulator 300 may exhibit a decreasing leakage ratio as between the second pressure differential and a third pressure differential. The second pressure differential and the third pressure differential may differ from one another by up to about 100 psi or more, such as at least about 25 psi, such as at least about 50 psi, or such as at least about 75 psi. The decreasing leakage ratio may include a first leakage ratio value corresponding to the second pressure differential and a second leakage ratio value corresponding to the third pressure differential, for example, with the first leakage ratio value and the second leakage ratio value differing from one another by less than 0.5, such as less than 0.2.

Referring still to FIG. 7A, by way of further example, a passive flow regulator 300 configured according to a second embodiment 706 may exhibit a flow regulation coefficient (k) of from about 6.7 to about 7.2, such as from about 6.9 to about 7.1. A passive flow regulator 300 configured according to the second embodiment 706 may exhibit a leakage ratio ($Q/Q_0$) range of from about 0.7 to about 1.6 over an operating range of the seal assembly 200 that includes the passive flow regulator 300, such as from about 25 psi to about 200 psi, such as from about 25 psi to about 100 psi, or such as from about 100 psi to about 200 psi. In some embodiments, as shown in FIG. 7A, a passive flow regulator 300 configured according to the second embodiment 706 may exhibit an increasing leakage ratio over at least a portion of such operating range, such as between a first pressure differential and a second pressure differential. The first pressure differential and the second pressure differential may differ from one another by up to about 75 psi or more, such as at least about 25 psi, such as at least about 50 psi, or such as at least about 70 psi. The increasing leakage ratio may include a first leakage ratio value corresponding to the first pressure differential and a second leakage ratio value corresponding to the second pressure differential, for example, with the first leakage ratio value and the second leakage ratio value differing from one another by less than 0.5, such as less than 0.2.

Additionally, or in the alternative, in some embodiments, a passive flow regulator 300 configured according to the second embodiment 706 may exhibit a relatively constant leakage ratio ($Q/Q_0$) over at least a portion of such operating range, such over a portion of the operating range with respect to which the passive flow regulator 300 exhibits a pressure differential that is greater than the pressure differential corresponding to the portion of the operating range with respect to which the passive flow regulator 300 exhibits an increasing leakage ratio. For example, the passive flow regulator 300 may exhibit a relatively constant leakage ratio as between the second pressure differential and a third pressure differential. For example, the second pressure differential may be about 100 psi and the third pressure differential may be about 200 psi. Additionally, or in the alternative, the second pressure differential and the third pressure differential may differ from one another by up to about 100 psi or more, such as at least about 25 psi, such as at least about 50 psi, or such as at least about 75 psi. The relatively constant leakage ratio may include a flexion fluid flow rate (Q) that differs from a relaxation fluid flow rate ($Q_0$) by less than 20%, such as less than 10%, such as less than 5%.

Referring still to FIG. 7A, by way of further example, a passive flow regulator 300 configured according to a third embodiment 708 may exhibit a flow regulation coefficient (k) of from about 4.5 to about 5.0, such as from about 4.6 to about 4.8. A passive flow regulator 300 configured according to the third embodiment 708 may exhibit a leakage ratio ($Q/Q_0$) range of from about 0.7 to about 1.2 over an operating range of the seal assembly 200 that includes the passive flow regulator 300, such as from about 25 psi to about 200 psi, such as from about 25 psi to about 100 psi, or such as from about 100 psi to about 200 psi. In some embodiments, as shown in FIG. 7A, a passive flow regulator 300 configured according to the third embodiment 708 may exhibit an increasing leakage ratio over at least a portion of such operating range, such as between a first pressure differential and a second pressure differential. The first pressure differential and the second pressure differential may differ from one another by up to about 75 psi or more, such as at least about 25 psi, such as at least about 50 psi, or such as at least about 70 psi. The increasing leakage ratio may include a first leakage ratio value corresponding to the first pressure differential and a second leakage ratio value corresponding to the second pressure differential, for example, with the first leakage ratio value and the second leakage ratio value differing from one another by less than 0.5, such as less than 0.2.

Additionally, or in the alternative, in some embodiments, a passive flow regulator 300 configured according to the third embodiment 708 may exhibit a decreasing leakage ratio ($Q/Q_0$) over at least a portion of such operating range, such as over a portion of the operating range with respect to which the passive flow regulator 300 exhibits a pressure differential that is greater than the pressure differential corresponding to the portion of the operating range with respect to which the passive flow regulator 300 exhibits an increasing leakage ratio. For example, the passive flow regulator 300 may exhibit a decreasing leakage ratio as between the second pressure differential and a third pressure differential. The second pressure differential and the third pressure differential may differ from one another by up to about 100 psi or more, such as at least about 25 psi, such as at least about 50 psi, or such as at least about 75 psi. The decreasing leakage ratio may include the leakage ratio value corresponding to the second pressure differential and a third leakage ratio value corresponding to the third pressure differential, for example, with the second leakage ratio value and the third leakage ratio value differing from one another by less than 0.5, such as less than 0.2.

Additionally, or in the alternative, in some embodiments, a passive flow regulator 300 configured according to the third embodiment 708 may exhibit a relatively constant leakage ratio ($Q/Q_0$) a first operating condition and a second operating condition with respect to which the passive flow regulator 300 exhibits a respectively different pressure differential. The passive flow regulator 300 may exhibit a first pressure differential at the first operating condition and a second pressure differential at the second operating condition. The first pressure differential and the second pressure differential may differ from one another by up to about 175 psi or more, such as at least about 50 psi, such as at least about 75 psi, such as at least about 100 psi, or such as at least about 150 psi. The first pressure differential corresponding to the first operating condition may be within the operating range with respect to which the passive flow regulator 300 exhibits an increasing leakage ratio. Additionally, or in the alternative, the second pressure differential corresponding to the second operating condition may be within the operating range with respect to which the passive flow regulator 300 exhibits a decreasing leakage ratio. For example, the second pressure differential may be about 25 psi and the second pressure differential may be about 200 psi. The relatively constant leakage ratio may include a flexion fluid flow rate (Q) that differs from a relaxation fluid flow rate ($Q_0$) by less than 20%, such as less than 10%, such as less than 5%.

Referring now to FIG. 7B, an exemplary passive flow regulator 300 may be described with reference to a hydraulic stiffness ratio ($\lambda/\lambda_0$), where ($\lambda_4$) represents a hydraulic stiffness of a fluid, such as a fluid film, in the fluid-bearing gap 240 with the flow constrictor 304 in a relaxation state, and where ($\lambda$) represents a hydraulic stiffness of a fluid, such as a fluid film, in the fluid-bearing gap 240 with the flow constrictor 304 in a flexion state corresponding to a given pressure differential ($\Delta P$). The parameter ($\lambda_0$) may sometimes be referred to as a "relaxation hydraulic stiffness," and the parameter ($\lambda$) may sometimes be referred to as a "flexion hydraulic stiffness." In some embodiments, the hydraulic stiffness ratio may depend at least in part on the flow regulation coefficient (k) described with reference to expression (2). Additionally, or in the alternative, the hydraulic stiffness ratio may depend at least in part on the pressure differential ($\Delta P$). A hydraulic stiffness ratio of 1.0 represents relatively constant hydraulic stiffness as between the relaxation state and the flexion state corresponding to a given pressure differential ($\Delta P$). A hydraulic stiffness ratio of less than 1.0 indicates that the passive flow regulator 300 has a lower hydraulic stiffness at a flexion state corresponding to a given pressure differential ($\Delta P$) relative to the relaxation state. For example, a decreasing hydraulic stiffness ratio, such as a hydraulic stiffness ratio approaching zero, with increasing pressure differential ($\Delta P$) represents a decreasing hydraulic stiffness with increasing pressure differential, which may starve the fluid-bearing gap 240 at a relatively high pressure differential ($\Delta P$). A hydraulic stiffness ratio of greater than 1.0 indicates that the passive flow regulator 300 has a higher hydraulic stiffness at a flexion state corresponding to a given pressure differential ($\Delta P$) relative to the relaxation state. For example, a hydraulic stiffness ratio increasingly greater than 1.0 with increasing pressure differential ($\Delta P$) represents an increasing hydraulic stiffness with increasing pressure differential, which may result in excess fluid flow across the seal assembly 200 at a relatively high pressure differential ($\Delta P$).

In some embodiments, a relatively low flow regulation coefficient (k) may correspond to a decreasing hydraulic stiffness ratio with increasing pressure differential ($\Delta P$). For example, as shown in FIG. 7B, embodiments (B) and (C) may exhibit a flow regulation coefficient (k) of about 2.5 to about 3.5, such as about 2.8 to about 3.2. With such a flow regulation coefficient (k), embodiments (B) and (C) may exhibit a decreasing hydraulic stiffness ratio with increasing pressure differential ($\Delta P$). For example, as shown, embodiments (B) and (C) may exhibit a hydraulic stiffness ratio of from about 0.05 to about 3.0, such as from about 0.1 to about 2.6, over a pressured differential range corresponding to an operating range of the seal assembly 200. For example, at a pressure differential of about 25 psi, embodiments (B) and (C) may exhibit a hydraulic stiffness ratio of from about 2.2 to about 2.8, such as from about 2.4 to about 2.6. Additionally, or in the alternative, at a pressure differential of about 100 psi, embodiments (B) and (C) may exhibit a hydraulic stiffness ratio of from about 1.0 to about 1.8, such as from about 1.3 to about 1.5. Additionally, or in the alternative, at a pressure differential of about 200 psi, embodiments (B) and (C) may exhibit a hydraulic stiffness ratio of from about 0.05 to about 0.2, such as from about 0.1 to about 0.15.

Additionally, or in the alternative, in some environments, a relatively high flow regulation coefficient (k) may correspond to an increasing hydraulic stiffness ratio with increasing pressure differential ($\Delta P$). For example, as shown in FIG. 7B, embodiment (A) may exhibit a flow regulation coefficient (k) of about 6.5 to about 6.5, such as about 6.8 to about 7.2. With such a flow regulation coefficient (k), embodiment (A) may exhibit an increasing hydraulic stiffness ratio with increasing pressure differential ($\Delta P$). For example, as shown, embodiment (A) may exhibit a hydraulic stiffness ratio of from about 2.5 to about 4.0, such as from about 2.9 to about 3.5, over a pressured differential range corresponding to an operating range of the seal assembly 200. For example, at a pressure differential of about 25 psi, embodiment (A) may exhibit a hydraulic stiffness ratio of from about 2.6 to about 3.1, such as from about 2.7 to about 2.9. Additionally, or in the alternative, at a pressure differential of about 100 psi, and/or at a pressure differential of about 200 psi, embodiment (A) may exhibit a hydraulic stiffness ratio of from about 3.1 to about 3.7, such as from about 3.3 to about 3.6.

FIG. 7B shows a first shaded region 750 representing an exemplary range of values for a flow regulation coefficient (k) that exhibit a suitable hydraulic stiffness ratio over a pressure differential range corresponding to an exemplary operating range of a seal assembly 200. As shown, an exemplary range for the flow regulation coefficient (k) may be from about 3.0 to about 7.0. In some embodiments, a flow regulation coefficient (k) for a passive flow regulator 300, such as a passive flow regulator 300 that exhibits a flow regulation coefficient (k) of from about 3.0 to about 7.0, may exhibit a hydraulic stiffness ratio of from about 0.1 to about 4.0, such as from about 1.0 to about 4.0, or such as from about 2.5 to about 3.5, over a pressure differential range corresponding to an operating range of the seal assembly 200 that includes the passive flow regulator 300. For example, the pressure differential ($\Delta P$) across the passive flow regulator 300 may range from about 25 psi to about 200 psi, such as from about 25 psi to about 100 psi, or such as from about 100 psi to about 200 psi. Additionally, or in the alternative, the passive flow regulator 300, such as a passive flow regulator 300 that exhibits a flow regulation coefficient (k) from about 3.0 to about 7.0, may exhibit a hydraulic stiffness ratio within a range 752 that has a maximum value and a minimum value separated by less than about 2.0, such as less than about 1.0, or such as less than about 0.5. The range 752 of the hydraulic stiffness ratio may be determined for a pressure differential range corresponding to an operating range of the seal assembly 200 that includes the passive flow regulator 300, such as from about 25 psi to about 200 psi, such as from about 25 psi to about 100 psi, or such as from about 100 psi to about 200 psi.

By way of example, a passive flow regulator 300 configured according to a first embodiment 754 may exhibit a flow regulation coefficient (k) of from about 4.5 to about 5.5, such as from about 4.8 to about 5.1. A passive flow regulator 300 configured according to the first embodiment 754 may exhibit a hydraulic stiffness ratio range of from about 1.0 to about 3.2 over an operating range of the seal assembly 200 that includes the passive flow regulator 300, such as from about 25 psi to about 200 psi, such as from about 25 psi to about 100 psi, or such as from about 100 psi to about 200 psi. In some embodiments, as shown in FIG. 7B, a passive flow regulator 300 configured according to the first embodiment 754 may exhibit a relatively constant hydraulic stiffness ratio over at least a portion of such operating range, such as between a first pressure differential and a second pressure differential. For example, the first pressure differential may be about 25 psi and the second pressure differential may be about 100 psi. Additionally, or in the alternative, the first pressure differential and the second pressure differential may differ from one another by up to about 75 psi or more, such as at least about 25 psi, such as at least about 50 psi, or such as at least about 70 psi. The relatively constant hydraulic stiffness ratio may include a flexion hydraulic stiffness ($\lambda$) that differs from a relaxation hydraulic stiffness ($\rightarrow\lambda_4$) by less than 20%, such as less than 10%, such as less than 5%.

Additionally, or in the alternative, in some embodiments, a passive flow regulator 300 configured according to the first embodiment 754 may exhibit a decreasing hydraulic stiffness ratio over at least a portion of such operating range, such as over a portion of the operating range with respect to which the passive flow regulator 300 exhibits a pressure differential that is greater than the pressure differential corresponding to the portion of the operating range with respect to which the passive flow regulator 300 exhibits a relatively constant hydraulic stiffness ratio. For example, the passive flow regulator 300 may exhibit a decreasing hydraulic stiffness ratio as between the second pressure differential and a third pressure differential. The second pressure differential and the third pressure differential may differ from one another by up to about 100 psi or more, such as at least about 25 psi, such as at least about 50 psi, or such as at least about 75 psi. The decreasing hydraulic stiffness ratio may include a first hydraulic stiffness ratio value corresponding to the second pressure differential and a second hydraulic stiffness ratio value corresponding to the third pressure differential, for example, with the first hydraulic stiffness ratio value and the second hydraulic stiffness ratio value differing from one another by less than 2.0, such as less than 1.5, or such as less than 1.0.

Referring still to FIG. 7B, by way of further example, a passive flow regulator 300 configured according to a second embodiment 756 may exhibit a flow regulation coefficient (k) of from about 6.8 to about 7.2, such as from about 6.9 to about 7.1. A passive flow regulator 300 configured according to the second embodiment 756 may exhibit a hydraulic stiffness ratio range of from about 2.8 to about 3.6 over an operating range of the seal assembly 200 that includes the passive flow regulator 300, such as from about 25 psi to about 200 psi, such as from about 25 psi to about 100 psi, or such as from about 100 psi to about 200 psi. In some embodiments, as shown in FIG. 7B, a passive flow regulator 300 configured according to the second embodiment 756 may exhibit an increasing hydraulic stiffness ratio over at least a portion of such operating range, such as between a first pressure differential and a second pressure differential. The first pressure differential and the second pressure differential may differ from one another by up to about 75 psi or more, such as at least about 25 psi, such as at least about 50 psi, or such as at least about 70 psi. The increasing hydraulic stiffness ratio may include a first hydraulic stiffness ratio value corresponding to the first pressure differential and a second hydraulic stiffness ratio value corresponding to the second pressure differential, for example, with the first hydraulic stiffness ratio value and the second hydraulic stiffness ratio value differing from one another by less than 1.0, such as less than 0.5.

Additionally, or in the alternative, in some embodiments, a passive flow regulator 300 configured according to the second embodiment 756 may exhibit a relatively constant hydraulic stiffness ratio over at least a portion of such operating range, such over a portion of the operating range with respect to which the passive flow regulator 300 exhibits a pressure differential that is greater than the pressure differential corresponding to the portion of the operating range with respect to which the passive flow regulator 300 exhibits an increasing hydraulic stiffness ratio. For example, the passive flow regulator 300 may exhibit a relatively constant hydraulic stiffness ratio as between the second pressure differential and a third pressure differential. For example, the second pressure differential may be about 100 psi and the third pressure differential may be about 200 psi. Additionally, or in the alternative, the second pressure differential and the third pressure differential may differ from one another by up to about 100 psi or more, such as at least about 25 psi, such as at least about 50 psi, or such as at least about 75 psi. The relatively constant hydraulic stiffness ratio may include a flexion hydraulic stiffness ($\lambda$) that differs from a relaxation hydraulic stiffness ($\lambda_0$) by less than 20%, such as less than 10%, such as less than 5%.

Referring still to FIG. 7B, by way of further example, a passive flow regulator 300 configured according to a third embodiment 758 may exhibit a flow regulation coefficient (k) of from about 6.1 to about 6.6, such as from about 6.3 to about 6.5. A passive flow regulator 300 configured according to the third embodiment 758 may exhibit a hydraulic stiffness ratio range of from about 2.8 to about 3.4 over an operating range of the seal assembly 200 that includes the passive flow regulator 300, such as from about 25 psi to about 200 psi, such as from about 25 psi to about 100 psi, or such as from about 100 psi to about 200 psi. In some embodiments, as shown in FIG. 7B, a passive flow regulator 300 configured according to the third embodiment 758 may exhibit an increasing hydraulic stiffness ratio over at least a portion of such operating range, such as between a first pressure differential and a second pressure differential. The first pressure differential and the second pressure differential may differ from one another by up to about 75 psi or more, such as at least about 25 psi, such as at least about 50 psi, or such as at least about 70 psi. The increasing hydraulic stiffness ratio may include a first hydraulic stiffness ratio value corresponding to the first pressure differential and a second hydraulic stiffness ratio value corresponding to the second pressure differential, for example, with the first hydraulic stiffness ratio value and the second hydraulic stiffness ratio value differing from one another by less than 0.5, such as less than 0.2.

Additionally, or in the alternative, in some embodiments, a passive flow regulator 300 configured according to the third embodiment 758 may exhibit a decreasing hydraulic stiffness ratio over at least a portion of such operating range, such as over a portion of the operating range with respect to which the passive flow regulator 300 exhibits a pressure differential that is greater than the pressure differential corresponding to the portion of the operating range with respect to which the passive flow regulator 300 exhibits an increasing hydraulic stiffness ratio. For example, the passive flow regulator 300 may exhibit a decreasing hydraulic stiffness ratio as between the second pressure differential and a third pressure differential. The second pressure differential and the third pressure differential may differ from one another by up to about 100 psi or more, such as at least about 25 psi, such as at least about 50 psi, or such as at least about 75 psi. The decreasing hydraulic stiffness ratio may include the hydraulic stiffness ratio value corresponding to the second pressure differential and a third hydraulic stiffness ratio value corresponding to the third pressure differential, for example, with the second hydraulic stiffness ratio value and the third hydraulic stiffness ratio value differing from one another by less than 0.5, such as less than 0.2.

Additionally, or in the alternative, in some embodiments, a passive flow regulator 300 configured according to the third embodiment 758 may exhibit a relatively constant hydraulic stiffness ratio a first operating condition and a second operating condition with respect to which the passive flow regulator 300 exhibits a respectively different pressure differential. The passive flow regulator 300 may exhibit a first pressure differential at the first operating condition and a second pressure differential at the second operating condition. The first pressure differential and the second pressure differential may differ from one another by up to about 175 psi or more, such as at least about 50 psi, such as at least about 75 psi, such as at least about 100 psi, or such as at least about 150 psi. The first pressure differential corresponding to the first operating condition may be within the operating range with respect to which the passive flow regulator 300 exhibits an increasing hydraulic stiffness ratio. Additionally, or in the alternative, the second pressure differential corresponding to the second operating condition may be within the operating range with respect to which the passive flow regulator 300 exhibits a decreasing hydraulic stiffness ratio. For example, the second pressure differential may be about 25 psi and the second pressure differential may be about 200 psi. The relatively constant hydraulic stiffness ratio may include a flexion hydraulic stiffness ($\lambda$) that differs from a relaxation hydraulic stiffness (ko) by less than 20%, such as less than 10%, such as less than 5%.

Figure 8A:
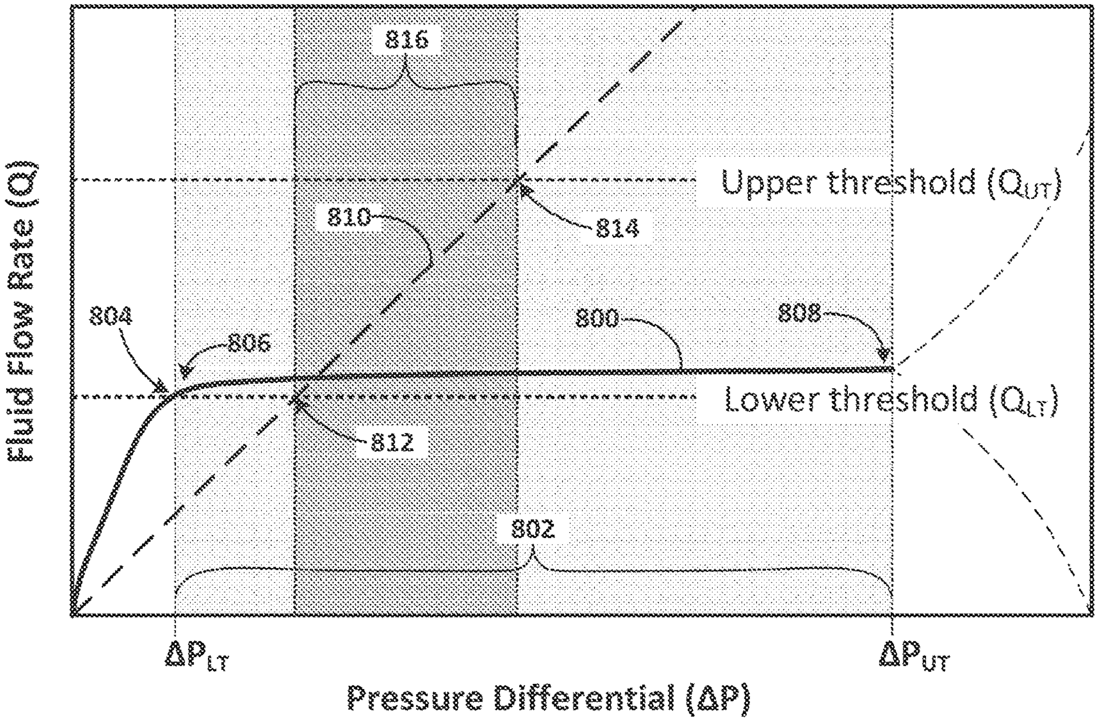
FIG. 8A shows a chart depicting a relationship between fluid flow rate and pressure differential for exemplary passive flow regulators.
Figure 8B:
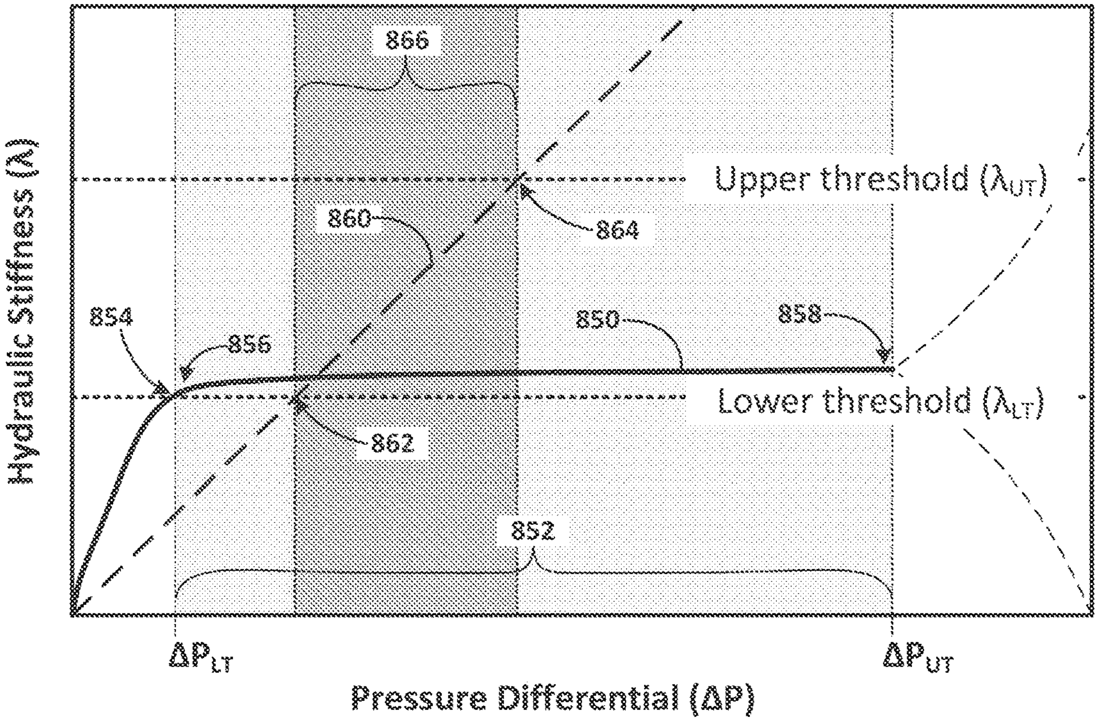
FIG. 8B shows a chart depicting a relationship between hydraulic stiffness and pressure differential for exemplary passive flow regulators.

Referring now to FIGS. 8A and 8B, exemplary flow regulation properties of seal assemblies 200 that include a passive flow regulator 300 are further described. With further reference to FIGS. 2A and 2B, a seal assembly 200 may be configured to provide a seal interface at a rotor 204, such as a fluid-bearing gap 240 that exhibits a non-contacting interface 234. The fluid-bearing gap 240 may be disposed between a rotor 204 and a stator 206 (e.g., between a stator face 236 and a rotor face 238) of a rotary machine 50, such as a turbine engine 100. As shown in FIG. 8A, the seal assembly 200 may have a lower-flow rate threshold ($Q_{LT}$), representing a flow rate of fluid to the fluid-bearing gap 240 sufficient for nominal operation of the seal assembly 200. The lower-flow rate threshold ($Q_{LT}$) may correspond to a minimum flow rate sufficient to provide a hydraulic stiffness the fluid-bearing gap 240 sufficient for nominal operation of the seal assembly 200. Such nominal operation of the seal assembly 200 may include a margin sufficient to avoid unnecessary and/or excessive friction, wear, contact, or other events, for example, that may lead to damage and/or shortened useful life of the seal assembly 200. In some embodiments, the seal assembly 200 may have an upper-flow rate threshold ($Q_{UT}$), representing a flow rate of fluid to the fluid-bearing gap 240 above which additional fluid flow would be unnecessary and/or excessive for nominal operation of the seal assembly 200. The upper-flow rate threshold ($Q_{UT}$) may correspond to a maximum flow rate sufficient to avoid excessive leakage across the fluid-bearing gap 240, and/or a maximum flow rate sufficient to provide a hydraulic stiffness the fluid-bearing gap 240 sufficient for nominal operation of the seal assembly 200. Such nominal operation of the seal assembly 200 may include a margin sufficient to avoid inadequate or unsuitable sealing properties of the seal assembly 200.

As shown in FIG. 8A, the fluid flow rate (Q) across a passive flow regulator 300 and/or a flow constrictor 304 of a seal assembly 200 may depend at least in part on a pressure differential ($\Delta P$), for example, between a source pressure ($P_S$) 318 and an exit pressure ($P_E$) 320. As shown, a seal assembly 200 that includes a passive flow regulator 300 may exhibit a flow rate curve 800 representing fluid flow rate (Q) as a function of pressure differential ($\Delta P$) across the passive flow regulator 300. As illustrated by the flow rate curve 800, the fluid flow rate (Q) may initially increase with increasing pressure differential ($\Delta P$) to a value at least above the lower-flow rate threshold ($Q_{LT}$). As the pressure differential continues to increase, the fluid flow rate (Q) may remain between the lower-flow rate threshold ($Q_{LT}$) and the upper-flow rate threshold ($Q_{UT}$), at least within an operating range 802 for the pressure differential ($\Delta P$) of the seal assembly 200. The operating range 802 for the pressure differential ($\Delta P$) of the seal assembly 200 may be defined between a lower-pressure differential threshold ($\Delta P_{LT}$) and an upper-pressure differential threshold ($\Delta P_{UT}$).

The lower-pressure differential threshold ($\Delta P_{LT}$) may correspond to a low-pressure intersection 804 between the flow rate curve 800 and the lower-flow rate threshold ($Q_{LT}$). The lower-pressure differential threshold ($\Delta P_{LT}$) may represent a pressure differential ($\Delta P$) sufficient for nominal operation of the seal assembly 200. The lower-pressure differential threshold ($\Delta P_{LT}$) may correspond to a minimum pressure differential sufficient to provide a suitable fluid flow rate (Q) to the fluid-bearing gap 240 for nominal operation of the seal assembly 200. The lower-pressure differential threshold ($\Delta P_{LT}$) may include a margin sufficient to avoid unnecessary and/or excessive friction, wear, contact, or other events, for example, that may lead to damage and/or shortened useful life of the seal assembly 200. The operating range 802 for the pressure differential ($\Delta P$) of the seal assembly 200 may be defined at least in part by the lower-pressure differential threshold ($\Delta P_{LT}$).

As shown in FIG. 8A, the flow rate curve 800 may exhibit a low-pressure inflection point 806. The low-pressure inflection point 806 may represent a decreasing slope of the flow rate curve 800. In some embodiments, the low-pressure inflection point 806 may coincide with the low-pressure intersection 804. Alternatively, the low-pressure inflection point 806 may correspond to a pressure differential that is less than or greater than the lower-pressure differential threshold ($\Delta P_{LT}$). In some embodiments, as shown in FIG. 8A, the fluid flow rate (Q) may remain relatively constant with increasing pressure differential at least within the operating range 802. Additionally, or in the alternative, the fluid flow rate (Q) may increase and/or decrease with increasing pressure differential, for example, while remaining between the lower-flow rate threshold ($Q_{LT}$) and the upper-flow rate threshold ($Q_{UT}$).

In some embodiments, as shown in FIG. 8A, at an increasingly large pressure differential (ΔP), the fluid flow rate (Q) may either decrease below the lower-pressure differential threshold ($\Delta P_{LT}$) or increase above the upper-pressure differential threshold ($\Delta P_{UT}$), for example, at a pressure differential (ΔP) above upper-pressure differential threshold ($\Delta P_{UT}$). The upper-pressure differential threshold ($\Delta P_{UT}$) may represent a pressure differential (ΔP) at which the fluid flow rate (Q) exhibits a high-pressure inflection point 808. Additionally, or in the alternative, the upper-pressure differential threshold ($\Delta P_{UT}$) may represent a pressure differential (ΔP) at which the fluid flow rate (Q) decreases below the lower-flow rate threshold ($Q_{LT}$) or increases above the upper-flow rate threshold ($Q_{UT}$). The upper-pressure differential threshold ($\Delta P_{UT}$) may correspond to a maximum pressure differential sufficient to avoid excessive leakage across the fluid-bearing gap 240, and/or a maximum flow rate sufficient to provide a hydraulic stiffness the fluid-bearing gap 240 sufficient for nominal operation of the seal assembly 200. The upper-pressure differential threshold ($\Delta P_{UT}$) may include a margin sufficient to avoid inadequate or unsuitable sealing properties of the seal assembly 200. The operating range 802 for the pressure differential (ΔP) of the seal assembly 200 may be defined at least in part by the upper-pressure differential threshold ($\Delta P_{UT}$).

Referring still to FIG. 8A, a seal assembly 200 that includes a passive flow regulator 300 may be described with reference to a comparative flow rate curve 810. The comparative flow rate curve 810 may represent a fluid flow rate (Q) as a function of pressure differential (ΔP), as determined for the seal assembly 200 as though the one or more flow constrictors 304 of the passive flow regulator 300 were fixed in a relaxation state. By way of example, relaxation state is shown in FIG. 3A. The comparative flow rate curve 810 represents fluid flow rate (Q) as a function of pressure differential (ΔP) for a hypothetical seal assembly 200 that has a corresponding structure with the exception that the one or more flow constrictors 304 of the passive flow regulator 300 do not move from the relaxation state. The comparative flow rate curve 810 may be determined for comparative purposes, and does not represent the actual fluid flow rate (Q) through the seal assembly 200 at least because the one or more flow constrictors 304 are configured to move when the one or more flow constrictors 304 are in a flexion state. The comparative flow rate curve 810 may be utilized as a point of reference for describing one or more flow regulation properties of the seal assembly 200.

As shown in FIG. 8A, in some embodiments, the comparative flow rate curve 810 may represent a proportional and/or linear increase in fluid flow rate (Q) with increasing pressure differential. The comparative flow rate curve 810 may intersect the lower-flow rate threshold ($Q_{LT}$) at a comparative flow-low pressure intersection 812. The comparative flow rate curve 810 may intersect the upper-flow rate threshold ($Q_{UT}$) at a comparative flow-high pressure intersection 814. The comparative flow-low pressure intersection 812 and the comparative flow-high pressure intersection 814 may define a comparative range 816 for the pressure differential (ΔP) of the seal assembly 200.

As shown in FIG. 8A, the operating range 802 for the pressure differential (ΔP) of the seal assembly 200 may be greater than (e.g., wider than) the comparative range 816. In some embodiments, the lower-pressure differential threshold ($\Delta P_{LT}$) may be less than a comparative pressure differential (ΔP) corresponding to the comparative flow-low pressure intersection 812. For example, a slope of the flow rate curve 800 may be greater than (e.g., steeper than) a slope of the comparative flow rate curve 810 over at least a portion of the pressure differential range below the lower-pressure differential threshold ($\Delta P_{LT}$). The lower-pressure differential threshold ($\Delta P_{LT}$) may be less than a comparative pressure differential (ΔP) corresponding to the comparative flow-low pressure intersection 812 at least in part due to the slope of the flow rate curve 800 being greater than (e.g., steeper than) the slope of the comparative flow rate curve 810. In some embodiments, a ratio of the lower-pressure differential threshold ($\Delta P_{LT}$) to the comparative pressure differential (ΔP) corresponding to the comparative flow-low pressure intersection 812 may be from about 0.1 to about 0.9, such as from about 0.1 to about 0.6, or such as from about 0.1 to about 0.4.

Additionally, or in the alternative, in some embodiments, the upper-pressure differential threshold ($\Delta P_{UT}$) may be greater than a comparative pressure differential (ΔP) corresponding to the comparative flow-high pressure intersection 814. For example, a slope of the flow rate curve 800 may be less than (e.g., flatter than) a slope of the comparative flow rate curve 810 over at least a portion of the pressure differential range above the lower-pressure differential threshold ($\Delta P_{LT}$), for example, over at least a portion of the pressure differential range between the lower-pressure differential threshold ($\Delta P_{LT}$) and the upper-pressure differential threshold ($\Delta P_{UT}$). The upper-pressure differential threshold ($\Delta P_{UT}$) may be greater than the comparative pressure differential (ΔP) corresponding to the comparative flow-high pressure intersection 814 at least in part due to the slope of the flow rate curve 800 being less than (e.g., flatter than) the slope of the comparative flow rate curve 810. In some embodiments, a ratio of the comparative pressure differential (ΔP) corresponding to the comparative flow-high pressure intersection 814 to the upper-pressure differential threshold ($\Delta P_{UT}$) may be from about 0.1 to about 0.9, such as from about 0.1 to about 0.6, or such as from about 0.1 to about 0.4.

Referring now to FIG. 8B, the seal assembly 200 may have a lower-hydraulic stiffness threshold ($\lambda_{LT}$), representing a hydraulic stiffness of the fluid-bearing gap 240 sufficient for nominal operation of the seal assembly 200. The lower-hydraulic stiffness threshold ($\lambda_{LT}$) may correspond to a minimum hydraulic stiffness of fluid-bearing gap 240 sufficient for nominal operation of the seal assembly 200. Such nominal operation of the seal assembly 200 may include a margin sufficient to avoid unnecessary and/or excessive friction, wear, contact, or other events, for example, that may lead to damage and/or shortened useful life of the seal assembly 200. In some embodiments, the seal assembly 200 may have an upper-hydraulic stiffness threshold ($\lambda_{UT}$), representing a hydraulic stiffness of the fluid-bearing gap 240 above which additional hydraulic stiffness would be unnecessary and/or excessive for nominal operation of the seal assembly 200. The upper-hydraulic stiffness threshold ($\lambda_{UT}$) may correspond to a maximum hydraulic stiffness of the fluid-bearing gap 240 sufficient for nominal operation of the seal assembly 200 and/or a maximum hydraulic stiffness corresponding to a hydraulic stiffness (λ) sufficient to avoid excessive leakage across the fluid-bearing gap 240. Such nominal operation of the seal assembly 200 may include a margin sufficient to avoid inadequate or unsuitable sealing properties of the seal assembly 200.

As shown in FIG. 8B, the hydraulic stiffness (λ) of the fluid-bearing gap 240 of a seal assembly 200 may depend at least in part on a pressure differential (ΔP), for example, between a source pressure ($P_S$) 318 and an exit pressure ($P_E$)

320. As shown, a seal assembly 200 that includes a passive flow regulator 300 may exhibit a hydraulic stiffness curve 850. As illustrated by the hydraulic stiffness curve 850, the hydraulic stiffness (λ) may initially increase with increasing pressure differential (ΔP) to a value at least above the lower-hydraulic stiffness threshold ($\lambda_{LT}$). As the pressure differential continues to increase, the hydraulic stiffness (λ) may remain between the lower-hydraulic stiffness threshold ($\lambda_{LT}$) and the upper-hydraulic stiffness threshold ($\lambda_{UT}$), at least within an operating range 852 for the pressure differential (ΔP) of the seal assembly 200. The operating range 852 for the pressure differential (ΔP) of the seal assembly 200 may be defined between a lower-pressure differential threshold ($\Delta P_{LT}$) and an upper-pressure differential threshold ($\Delta P_{UT}$).

The lower-pressure differential threshold ($\Delta P_{LT}$) may correspond to a low-pressure intersection 854 between the hydraulic stiffness curve 850 and the lower-hydraulic stiffness threshold ($\lambda_{LT}$). The lower-pressure differential threshold ($\Delta P_{LT}$) may represent a pressure differential (ΔP) sufficient for nominal operation of the seal assembly 200. The lower-pressure differential threshold ($\Delta P_{LT}$) may correspond to a minimum pressure differential sufficient to provide a suitable hydraulic stiffness (λ) to the fluid-bearing gap 240 for nominal operation of the seal assembly 200. The lower-pressure differential threshold ($\Delta P_{LT}$) may include a margin sufficient to avoid unnecessary and/or excessive friction, wear, contact, or other events, for example, that may lead to damage and/or shortened useful life of the seal assembly 200. The operating range 852 for the pressure differential (ΔP) of the seal assembly 200 may be defined at least in part by the lower-pressure differential threshold ($\Delta P_{LT}$).

As shown in FIG. 8B, the hydraulic stiffness curve 850 may exhibit a low-pressure inflection point 856. The low-pressure inflection point 856 may represent a decreasing slope of the hydraulic stiffness curve 850. In some embodiments, the low-pressure inflection point 856 may coincide with the low-pressure intersection 854. Alternatively, the low-pressure inflection point 856 may correspond to a pressure differential that is less than or greater than the lower-pressure differential threshold ($\Delta P_{LT}$). In some embodiments, as shown in FIG. 8B, the hydraulic stiffness (λ) may remain relatively constant with increasing pressure differential at least within the operating range 852. Additionally, or in the alternative, the hydraulic stiffness (λ) may increase and/or decrease with increasing pressure differential, for example, while remaining between the lower-hydraulic stiffness threshold ($\lambda_{LT}$) and the upper-hydraulic stiffness threshold ($\lambda_{UT}$).

In some embodiments, as shown in FIG. 8B, at an increasingly large pressure differential (ΔP), the hydraulic stiffness (λ) may either decrease below the lower-pressure differential threshold ($\Delta P_{LT}$) or increase above the upper-pressure differential threshold ($\Delta P_{UT}$), for example, at a pressure differential (ΔP) above upper-pressure differential threshold ($\Delta P_{UT}$). The upper-pressure differential threshold ($\Delta P_{UT}$) may represent a pressure differential (ΔP) at which the hydraulic stiffness (λ) exhibits a high-pressure inflection point 858. Additionally, or in the alternative, the upper-pressure differential threshold ($\Delta P_{UT}$) may represent a pressure differential (ΔP) at which the hydraulic stiffness (λ) decreases below the lower-hydraulic stiffness threshold ($\lambda_{LT}$) or increases above the upper-hydraulic stiffness threshold ($\lambda_{UT}$). The upper-pressure differential threshold ($\Delta P_{UT}$) may correspond to a maximum pressure differential sufficient to avoid excessive leakage across the fluid-bearing gap 240, and/or a maximum flow rate sufficient to provide a hydraulic stiffness the fluid-bearing gap 240 sufficient for nominal operation of the seal assembly 200. The upper-pressure differential threshold ($\Delta P_{UT}$) may include a margin sufficient to avoid inadequate or unsuitable sealing properties of the seal assembly 200. The operating range 852 for the pressure differential (ΔP) of the seal assembly 200 may be defined at least in part by the upper-pressure differential threshold ($\Delta P_{UT}$).

Referring still to FIG. 8B, a seal assembly 200 that includes a passive flow regulator 300 may be described with reference to a comparative hydraulic stiffness curve 860. The comparative hydraulic stiffness curve 860 may represent a hydraulic stiffness (λ) as a function of pressure differential (ΔP), as determined for the seal assembly 200 as though the one or more flow constrictors 304 of the passive flow regulator 300 were fixed in a relaxation state. By way of example, relaxation state is shown in FIG. 3A. The comparative hydraulic stiffness curve 860 represents hydraulic stiffness (λ) as a function of pressure differential (ΔP) for a hypothetical seal assembly 200 that has a corresponding structure with the exception that the one or more flow constrictors 304 of the passive flow regulator 300 do not move from the relaxation state. The comparative hydraulic stiffness curve 860 may be determined for comparative purposes, and does not represent the actual hydraulic stiffness (λ) through the seal assembly 200 at least because the one or more flow constrictors 304 are configured to move when the one or more flow constrictors 304 are in a flexion state. The comparative hydraulic stiffness curve 860 may be utilized as a point of reference for describing one or more flow regulation properties of the seal assembly 200.

As shown in FIG. 8B, in some embodiments, the comparative hydraulic stiffness curve 860 may represent a proportional and/or linear increase in hydraulic stiffness (λ) with increasing pressure differential. The comparative hydraulic stiffness curve 860 may intersect the lower-hydraulic stiffness threshold ($\lambda_{LT}$) at a comparative hydraulic stiffness-low pressure intersection 862. The comparative hydraulic stiffness curve 860 may intersect the upper-hydraulic stiffness threshold ($\lambda_{UT}$) at a comparative hydraulic stiffness-high pressure intersection 864. The comparative hydraulic stiffness-low pressure intersection 862 and the comparative hydraulic stiffness-high pressure intersection 864 may define a comparative range 866 for the pressure differential (ΔP) of the seal assembly 200.

As shown in FIG. 8B, the operating range 852 for the pressure differential (ΔP) of the seal assembly 200 may be greater than (e.g., wider than) the comparative range 866. In some embodiments, the lower-pressure differential threshold ($\Delta P_{LT}$) may be less than a comparative pressure differential (ΔP) corresponding to the comparative hydraulic stiffness-low pressure intersection 862. For example, a slope of the hydraulic stiffness curve 850 may be greater than (e.g., steeper than) a slope of the comparative hydraulic stiffness curve 860 over at least a portion of the pressure differential range below the lower-pressure differential threshold ($\Delta P_{LT}$). The lower-pressure differential threshold ($\Delta P_{LT}$) may be less than the comparative pressure differential (ΔP) corresponding to the comparative hydraulic stiffness-low pressure intersection 862 at least in part due to the slope of the hydraulic stiffness curve 850 being greater than (e.g., steeper than) the slope of the comparative hydraulic stiffness curve 860. In some embodiments, a ratio of the lower-pressure differential threshold ($\Delta P_{LT}$) to the comparative pressure differential (ΔP) corresponding to the comparative hydraulic stiffness-low pressure intersection 862 may be from about 0.1 to about 0.9, such as from about 0.1 to about 0.6, or such as from about 0.1 to about 0.4.

Additionally, or in the alternative, in some embodiments, the upper-pressure differential threshold ($\Delta P_{UT}$) may be greater than a comparative pressure differential ($\Delta P$) corresponding to the comparative hydraulic stiffness-high pressure intersection 864. For example, a slope of the hydraulic stiffness curve 850 may be less than (e.g., flatter than) a slope of the comparative hydraulic stiffness curve 860 over at least a portion of the pressure differential range above the lower-pressure differential threshold ($\Delta P_{LT}$), for example, over at least a portion of the pressure differential range between the lower-pressure differential threshold ($\Delta P_{LT}$) and the upper-pressure differential threshold ($\Delta P_{UT}$). The upper-pressure differential threshold ($\Delta P_{UT}$) may be greater than the comparative pressure differential ($\Delta P$) corresponding to the comparative hydraulic stiffness-high pressure intersection 864 at least in part due to the slope of the hydraulic stiffness curve 850 being less than (e.g., flatter than) the slope of the comparative hydraulic stiffness curve 860. In some embodiments, a ratio of the comparative pressure differential ($\Delta P$) corresponding to the comparative hydraulic stiffness-high pressure intersection 864 to the upper-pressure differential threshold ($\Delta P_{UT}$) may be from about 0.1 to about 0.9, such as from about 0.1 to about or such as from about 0.1 to about 0.4.

Figure 9A:
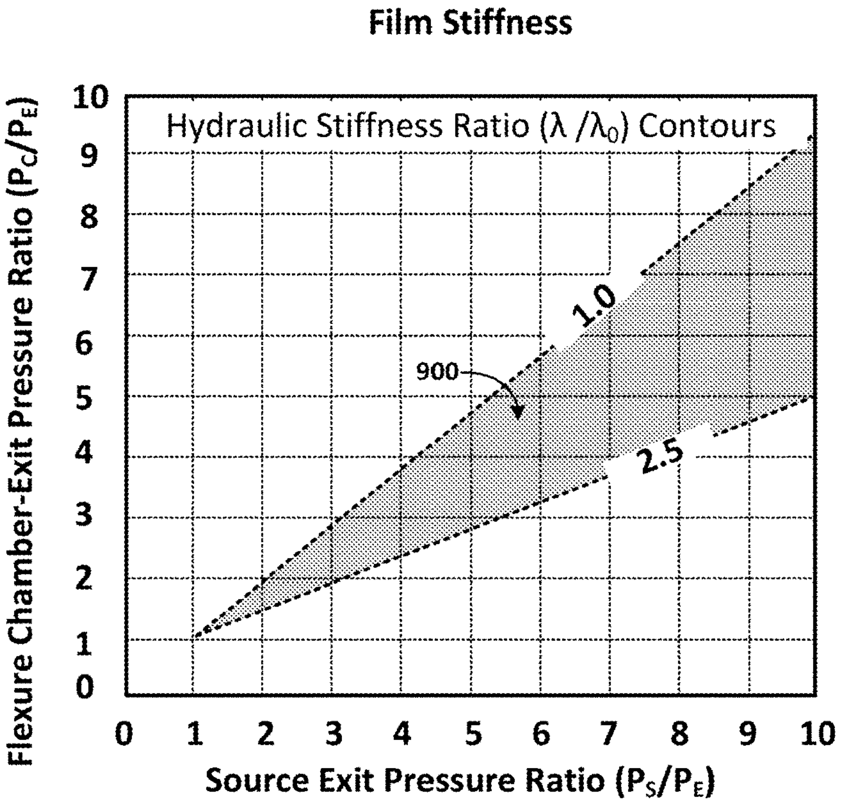
FIG. 9A shows a chart depicting a relationship between a flexure chamber-exit pressure ratio and a source exit pressure ratio in respect of hydraulic stiffness of exemplary passive flow regulators.
Figure 9B:
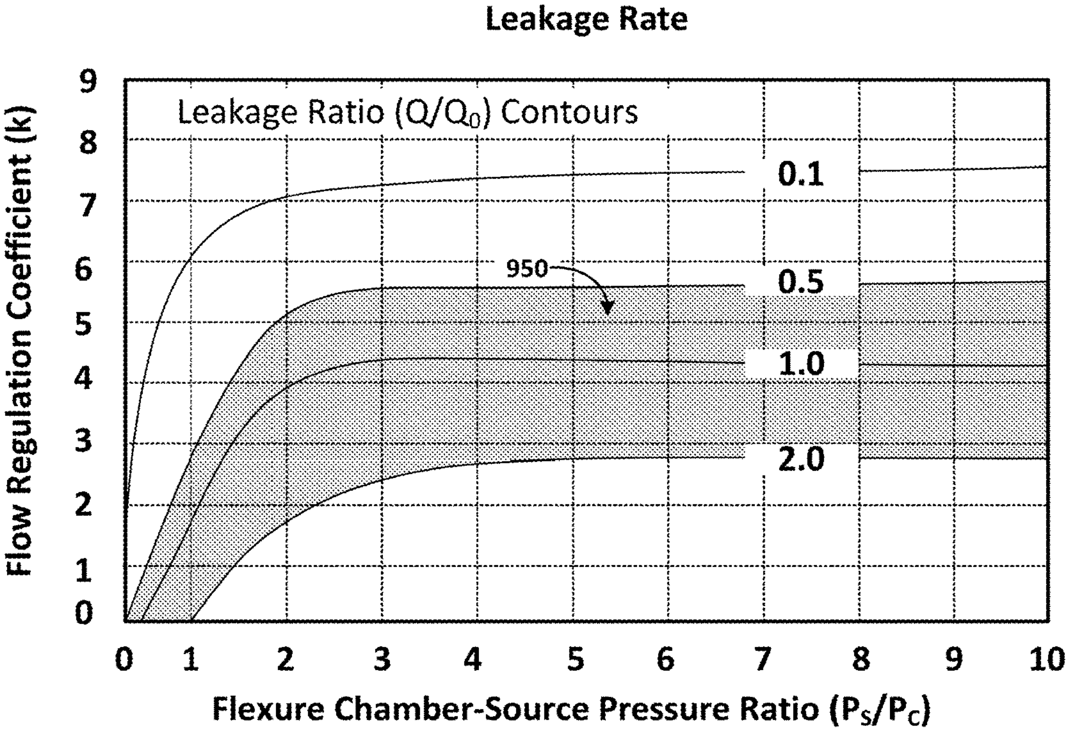
FIG. 9B shows a chart depicting a relationship between a flow regulation coefficient and a flexure chamber-source pressure ratio in respect of fluid flow of exemplary passive flow regulators.

Referring now to FIGS. 9A and 9B, exemplary flow regulation properties of seal assemblies 200 that include a passive flow regulator 300 are further described. As shown in FIG. 9A, a seal assembly 200 that includes a passive flow regulator 300 may be described with reference to one or more pressure ratios. In some embodiments, a seal assembly 200 that includes a passive flow regulator 300 may be described with reference to a source exit pressure ratio ($P_S/P_E$), representing a ratio of a source pressure ($P_S$) 318 and an exit pressure ($P_E$) 320 of the passive flow regulator 300. The source exit pressure ratio ($P_S/P_E$) may correspond to a pressure differential ($\Delta P$) across the passive flow regulator 300. In some embodiments, as shown, the source exit pressure ratio ($P_S/P_E$) may be from about 0.1 to about 10.0, such as from about 1.0 to about 9.0. Additionally, or in the alternative, a seal assembly 200 that includes a passive flow regulator 300 may be described with reference to a flexure chamber-exit pressure ratio ($P_C/P_E$), representing a ratio of a flexure chamber-pressure ($P_C$) 326 to the exit pressure ($P_E$) 320 of the passive flow regulator 300. The flexure chamber-pressure ($P_C$) 326 may be an upstream flexure chamber-pressure ($P_{Cu}$) 326*a* representing a pressure of the upstream-flexure chamber region 310*a*, or a downstream flexure chamber-pressure ($P_{Cd}$) 326*b* representing a pressure of the downstream-flexure chamber region 310*b*. The flexure chamber-exit pressure ratio ($P_C/P_E$) may correspond to a pressure differential ($\Delta P$) from the flexure chamber to a relatively lower-pressure fluid volume, such as an outlet plenum 210. In some embodiments, as shown, the flexure chamber-exit pressure ratio ($P_C/P_E$) may be from about 0.1 to about 10.0, such as from about 1.0 to about 9.0.

As shown in FIG. 9A, a shaded region 900 may represent an exemplary range of suitable values for the source exit pressure ratio ($P_S/P_E$) and the flexure chamber-exit pressure ratio ($P_C/P_E$). In some embodiments, the source exit pressure ratio ($P_S/P_E$) may be greater than or about equal to the flexure chamber-exit pressure ratio ($P_C/P_E$). For example, in some embodiments, the source exit pressure ratio ($P_S/P_E$) differ from and/or exceed the flexure chamber-exit pressure ratio ($P_C/P_E$) by a factor of about 1.0 to a about 1.5. As shown, a source exit pressure ratio ($P_S/P_E$) that is about equal to the flexure chamber-exit pressure ratio ($P_C/P_E$) may correspond to a hydraulic stiffness ratio ($\lambda/\lambda_0$) of about 1.0. As shown, a source exit pressure ratio ($P_S/P_E$) that differ from and/or exceeds the flexure chamber-exit pressure ratio ($P_C/P_E$) by a factor of about 1.5 may correspond to a hydraulic stiffness ratio ($\lambda/\lambda_0$) of about 2.5. In some embodiments, the shaded region 900 representing an exemplary range of suitable values for the source exit pressure ratio ($P_S/P_E$) and the flexure chamber-exit pressure ratio ($P_C/P_E$) may correspond to a hydraulic stiffness ratio ($\lambda/\lambda_0$) of from about 1.0 to about 2.5.

Referring now to FIG. 9B, a seal assembly 200 that includes a passive flow regulator 300 may be described with reference to a flexure chamber-source pressure ratio ($P_S/P_C$), representing a ratio of a source pressure ($P_S$) 318 of the passive flow regulator 300 to a flexure chamber-pressure ($P_C$) 326. The flexure chamber-pressure ($P_C$) 326 may be an upstream flexure chamber-pressure ($P_{Cu}$) 326*a* representing a pressure of the upstream-flexure chamber region 310*a*, or a downstream flexure chamber-pressure ($P_{Cd}$) 326*b* representing a pressure of the downstream-flexure chamber region 310*b*. The flexure chamber-source pressure ratio ($P_S/P_C$) may correspond to a pressure differential ($\Delta P$) from a relatively higher-pressure fluid volume, such as an inlet plenum 208 to the flexure chamber 310. In some embodiments, as shown, the flexure chamber-source pressure ratio ($P_S/P_C$) may be from about 0.1 to about 10.0, such as from about 1.0 to about 10.0.

In some embodiments, as shown in FIG. 9B, a shaded region 950 may represent an exemplary range of suitable values for the flexure chamber-source pressure ratio ($P_S/P_C$) and a flow regulation coefficient (k). In some embodiments, as reflected by the shaded region 950 in FIG. 9B, a passive flow regulator 300 of a seal assembly 200 may be configured with a flexure chamber-source pressure ratio ($P_S/P_C$) and a flow regulation coefficient (k) such that the passive flow regulator 300 exhibits a leakage ratio ($Q/Q_0$) of from about 0.5 to about 2.0. In some embodiments, a flow regulation coefficient (k) may have a substantially linear relationship with a flexure chamber-source pressure ratio ($P_S/P_C$) of passive flow regulator 300. The flow regulation coefficient may correspond substantially linearly to the leakage ratio. The substantially linear relationship may correspond to a flexure chamber-source pressure ratio ($P_S/P_C$) of from about 2.0 to about 10.0, such as from about 3.0 to about 10.0. By way of example, for a leakage ratio ($Q/Q_0$) of from about 1.5 to about 2.5, such as from about 1.8 to about 2.2, such as about 2.0, a passive flow regulator 300 may exhibit a flow regulation coefficient (k) of from about 2.5 to about 3.5, such as from about 2.8 to about 3.2, such as about 3.0, across a flexure chamber-source pressure ratio ($P_S/P_C$) of from about 2.0 to about 10.0, such as from about 3.0 to about 10.0.

As another example, for a leakage ratio ($Q/Q_0$) of from about 0.8 to about 1.2, such as from about 0.9 to about 1.1, such as about 1.0, a passive flow regulator 300 may exhibit a flow regulation coefficient (k) of from about 3.5 to about 4.5, such as from about 3.8 to about 4.2, such as about 4.0, across a flexure chamber-source pressure ratio ($P_S/P_C$) of from about 2.0 to about 10.0, such as from about 3.0 to about 10.0. As yet another example, for a leakage ratio ($Q/Q_0$) of from about 0.3 to about such as from about 0.4 to about 0.6, such as about 0.5, a passive flow regulator 300 may exhibit a flow regulation coefficient (k) of from about 5.0 to about 6.0, such as from about 5.2 to about 6.8, such as about 5.5, across a flexure chamber-source pressure ratio ($P_S/P_C$) of from about 2.0 to about 10.0, such as from about 3.0 to about 10.0.

Figure 10:
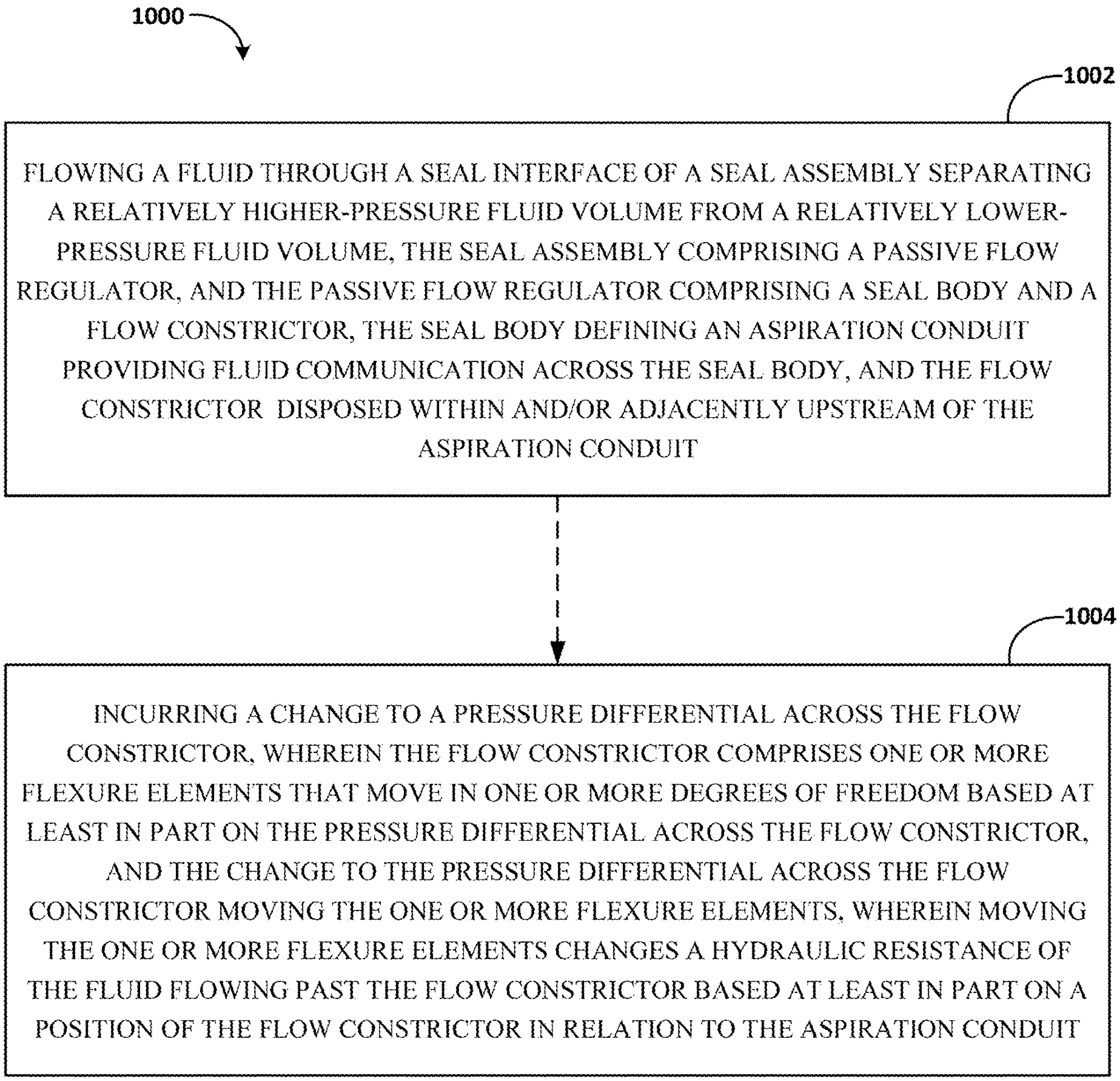
FIG. 10 shows a flow chart depicting a method of operating a rotary machine.

Now referring to FIG. 10, exemplary methods of operating a rotary machine 50, such as a turbine engine 100, are described with reference to a flow chart 1000. As shown, an exemplary method may include sealing an interface of a rotor of a rotary machine, such as an interface of a rotor of an aeronautical gas turbine engine. As shown in FIG. 10, an exemplary method may include, at block 1002 of the flow chart 1000, flowing a fluid through a seal interface 203 of a seal assembly 200 separating a relatively higher-pressure fluid volume from a relatively lower-pressure fluid volume. The seal assembly 200 may include a passive flow regulator 300, and the passive flow regulator 300 may include a seal body 302 and a flow constrictor 304. The seal body 302 may define an aspiration conduit 242 providing fluid communication across the seal body 302. The flow constrictor 304 may be disposed within and/or adjacently upstream of the aspiration conduit 242. As shown in FIG. 10, the exemplary method may include, at block 1004 of the flow chart 1000, incurring a change to a pressure differential across the flow constrictor 304. The flow constrictor 304 may include one or more flexure elements 306 that move in one or more degrees of freedom based at least in part on the pressure differential across the flow constrictor 304. The change to the pressure differential across the flow constrictor 304 may move the one or more flexure elements 306, and moving the one or more flexure elements may change a hydraulic resistance of the fluid flowing past the flow constrictor 304 based at least in part on a position of the flow constrictor 304 in relation to the aspiration conduit 242.

Further aspects are provided by the subject matter of the following clauses:

A seal assembly for an aeronautical gas turbine engine, the seal assembly, comprising: a passive flow regulator, the passive flow regulator comprising: a seal body defining an aspiration conduit, and a flow constrictor comprising one or more flexure elements, the flow constrictor disposed within and/or adjacently upstream of the aspiration conduit.

The seal assembly of any preceding clause, wherein the aspiration conduit provides fluid communication across the seal body from a relatively higher-pressure fluid volume to a relatively lower-pressure fluid volume.

The seal assembly of any preceding clause, wherein the one or more flexure elements are coupled to or monolithically integrated with the seal body.

The seal assembly of any preceding clause, wherein the flow constrictor comprises a constrictor element coupled to or monolithically integrated with the one or more flexure elements.

The seal assembly of any preceding clause, wherein the constrictor element comprises a geometric configuration that includes at least one of: a polyhedron, a prismatoid, a cylinder, an annulus, or a truncated cone.

The seal assembly of any preceding clause, wherein the aspiration conduit comprises a flexure chamber wherein at least a portion of the flow constrictor is located within the flexure chamber.

The seal assembly of any preceding clause, wherein at least a portion of the flow constrictor and at least a portion of the flexure chamber have a geometrically complementary configuration.

The seal assembly of any preceding clause, wherein the geometrically complementary configuration comprises at least one of: a conical shape, a frusto-conical shape, a pyramid shape, or a frustum shape.

The seal assembly of any preceding clause, wherein at least a portion of the aspiration conduit is located downstream from the flexure chamber.

The seal assembly of any preceding clause, wherein the flow constrictor defines one or more flexure apertures that provide fluid communication through the flexure chamber.

The seal assembly of any preceding clause, wherein the flow constrictor comprises one or more constrictor elements, the one or more constrictor elements defining an orifice or an opening, the orifice or the opening providing fluid communication across the one or more constrictor elements.

The seal assembly of any preceding clause, wherein the flow constrictor exhibits movement in one or more degrees of freedom as a result of changes in a pressure differential across the flow constrictor, the movement changing a hydraulic resistance of fluid flow through the aspiration conduit based at least in part on a position of the flow constrictor in relation to the aspiration conduit.

The seal assembly of any preceding clause, wherein a portion of the flow constrictor and a portion of the aspiration conduit define a variable-resistance pathway therebetween, wherein a variable-resistance pathway-parameter of the variable-resistance pathway changes in correspondence with a changing position of the flow constrictor.

The seal assembly of any preceding clause, wherein the one or more flexure elements comprises a plurality of adjacently disposed flexure elements.

The seal assembly of any preceding clause, wherein the one or more flexure elements are configured and arranged in a cantilevered position.

The seal assembly of any preceding clause, wherein the aspiration conduit comprises an aspiration conduit-inlet, and wherein the flow constrictor at least partially constricts the aspiration conduit-inlet.

The seal assembly of any preceding clause, wherein the one or more flexure elements comprise: a first fixed portion, a second fixed portion, and a flexure portion disposed between the first fixed portion and the second fixed portion, the first fixed portion and the second fixed portion coupled to or monolithically integrated with the seal body.

The seal assembly of any preceding clause, wherein the seal body comprises a flexure chamber, the flexure chamber defining at least a portion of the aspiration conduit, wherein at least a portion of the flow constrictor is located within the flexure chamber; wherein the seal body defines one or more auxiliary chambers and one or more auxiliary conduits, the one or more auxiliary conduits providing fluid communication between the aspiration conduit and the one or more auxiliary chambers; wherein the one or more flexure elements comprises a plurality of adjacently disposed flexure elements, the plurality of adjacently disposed flexure elements defining a flexure aperture therebetween, the flexure aperture providing fluid communication through the flexure chamber; wherein an increase in pressure within the one or more auxiliary chambers above a threshold pressure correspondingly contracts the flexure aperture, and wherein a decrease in pressure within the one or more auxiliary chambers below the threshold pressure correspondingly expands the flexure aperture; and wherein a hydraulic resistance of the flexure aperture depends at least in part on a variable-resistance pathway-parameter comprising a cross-sectional width or area of the flexure aperture.

The seal assembly of any preceding clause, wherein the flow constrictor comprises one or more flexion surfaces in fluid contact with and/or oriented towards a relatively higher-pressure fluid volume; wherein a portion of the flow constrictor and a portion of the aspiration conduit define a variable-resistance pathway therebetween, wherein a variable-resistance pathway-parameter of the variable-resistance pathway changes in correspondence with a changing position of the flow constrictor; and wherein the passive flow regulator exhibits a flow regulation coefficient (k) of from 1 to 9.

The seal assembly of any preceding clause, wherein:

$$(k) = -\log 10 \frac{A_P L^3 \cdot \cos\alpha}{3I \cdot Z_0},$$

wherein (Ap) represents a projected area of a sum of the respective one of the one or more flexion surfaces, (L) representing a length of the respective one of the one or more flexion surfaces, (α) represents an angle of incidence of the respective one of the one or more flexion surfaces in relation to the relatively higher-pressure fluid volume, wherein (I) represents an area-moment of inertia of the flow constrictor, and ($Z_0$) represents a nominal value of the variable-resistance pathway-parameter corresponding to a relaxation state of the flow constrictor.

A seal assembly for an aeronautical gas turbine engine, the seal assembly comprising: a passive flow regulator, the passive flow regulator comprising: a seal body defining an aspiration conduit, and a flow constrictor disposed within and/or adjacently upstream of the aspiration conduit; wherein the flow constrictor comprises one or more flexion surfaces in fluid contact with and/or oriented towards a relatively higher-pressure fluid volume; wherein a portion of the flow constrictor and a portion of the aspiration conduit define a variable-resistance pathway therebetween, wherein a variable-resistance pathway-parameter of the variable-resistance pathway changes in correspondence with a changing position of the flow constrictor; and wherein the passive flow regulator exhibits a flow regulation coefficient (k) of from 1 to 9, wherein:

$$(k) = -\log 10 \frac{A_P L^3 \cdot \cos\alpha}{3I \cdot Z_0},$$

wherein (Ap) represents a projected area of a sum of the respective one of the one or more flexion surfaces (L) representing a length of the respective one of the one or more flexion surfaces, (α) represents an angle of incidence of the respective one of the one or more flexion surfaces in relation to the relatively higher-pressure fluid volume, wherein (I) represents an area-moment of inertia of the flow constrictor, and ($Z_0$) represents a nominal value of the variable-resistance pathway-parameter corresponding to a relaxation state of the flow constrictor.

The seal assembly of any preceding clause, wherein ($A_p$) is from about $1\times10^{-5}$ square inch to about $1\times10^{-1}$ square inch.

The seal assembly of any preceding clause, wherein (L) is from about $1\times10^{-3}$ inch to about $5\times10^{-1}$ inch.

The seal assembly of any preceding clause, wherein (I) has a length-to-the-fourth-power ($in^4$) of from about $1\times10^{-10}$ $in^4$ to about $1\times10^{-5}$ $in^4$.

The seal assembly of any preceding clause, wherein ($Z_0$) is from about $1\times10^{-5}$ inch to about $1\times10^{-1}$ inch.

The seal assembly of any preceding clause, wherein (α) is from about 0 degrees to about 90 degrees.

The seal assembly of any preceding clause, wherein the flow constrictor exhibits a volumetric flexure area ($A_P L^3$) of from $10^{-10}$ to $10^{10}$.

The seal assembly of any preceding clause, wherein the flow constrictor exhibits a gap change inertia ($IZ_0$) of from $10^{-20}$ to $10^{10}$.

The seal assembly of any preceding clause, wherein the flow constrictor exhibits a volumetric flexure area ($A_P L^3$) within a first range defined by a first maximum and a first minimum separated from one another by $1\times10^7\pm20\%$, and wherein the flow constrictor exhibits a gap change inertia ($IZ_0$) with a second range defined by a second maximum and a second minimum separated from one another by $1\times10^5\pm20\%$.

The seal assembly of any preceding clause, wherein the volumetric flexure area ($A_P L^3$) is from $10^{-5}$ to $10^0$, and wherein the gap change inertia ($IZ_0$) is from $10^{-10}$ to $10^0$.

The seal assembly of any preceding clause, wherein the flow regulation coefficient (k) is from 3 to 7.

The seal assembly of any preceding clause, wherein the passive flow regulator exhibits a leakage ratio ($Q/Q_0$) of from about 0.1 to about 2.5, wherein ($Q_0$) represents a fluid flow rate across the passive flow regulator with the flow constrictor in a relaxation state, and wherein (Q) represents the fluid flow rate across the passive flow regulator with the flow constrictor in a flexion state corresponding to a pressure differential across the passive flow regulator of from 25 psi to 200 psi.

The seal assembly of any preceding clause, wherein the passive flow regulator exhibits a difference of less than 20% between (i) the fluid flow rate across the passive flow regulator with the flow constrictor in the flexion state, and (ii) the fluid flow rate across the passive flow regulator with the flow constrictor in a relaxation state.

The seal assembly of any preceding clause, wherein the aspiration conduit provides fluid communication from the relatively higher-pressure fluid volume to a fluid-bearing gap, wherein the passive flow regulator exhibits a hydraulic stiffness ratio ($\lambda/\lambda_0$), of from about 0.1 to about 2.5, wherein ($\lambda_0$) represents a hydraulic stiffness of a fluid in the fluid-bearing gap with the flow constrictor in a relaxation state, and wherein (λ) represents the hydraulic stiffness of the fluid in the fluid-bearing gap with the flow constrictor in a flexion state corresponding to a pressure differential across the passive flow regulator of from 25 psi to 200 psi.

The seal assembly of any preceding clause, wherein the passive flow regulator exhibits a difference of less than 20% between (i) the hydraulic stiffness of the fluid in the fluid-bearing gap with the flow constrictor in the flexion state, and (ii) the hydraulic stiffness of the fluid in the fluid-bearing gap with the flow constrictor in the relaxation state.

The seal assembly of any preceding clause, wherein the passive flow regulator exhibits a flow rate curve representing a fluid flow rate as a function of pressure differential across the passive flow regulator, wherein the seal assembly exhibits a lower-flow rate threshold and a lower-pressure differential threshold correspond to an intersection between the flow rate curve and the lower-flow rate threshold, wherein the lower-pressure differential threshold is less than a comparative pressure differential corresponding to a comparative flow-low pressure intersection, the comparative flow-low pressure intersection comprising an intersection of a comparative flow rate curve with the lower-flow rate threshold, the comparative flow rate curve representing the fluid flow rate as a function of pressure differential as determined for the seal assembly as though the flow constrictor were fixed in a relaxation state.

The seal assembly of any preceding clause, wherein a ratio of the lower-pressure differential threshold to the comparative pressure differential is from 0.1 to 0.9.

The seal assembly of any preceding clause, wherein the seal assembly exhibits a hydraulic stiffness curve representing a hydraulic stiffness as a function of pressure differential across the passive flow regulator, wherein the seal assembly exhibits a lower-hydraulic stiffness threshold and a lower-pressure differential threshold correspond to an intersection between the hydraulic stiffness curve and the lower-hydraulic stiffness threshold, wherein the lower-pressure differential threshold is less than a comparative pressure differential corresponding to a comparative hydraulic stiffness-low pressure intersection, the comparative hydraulic stiffness-low pressure intersection comprising an intersection of a comparative hydraulic stiffness curve with the lower-hydraulic stiffness threshold, the comparative hydraulic stiffness curve representing the hydraulic stiffness as a function of pressure differential as determined for the seal assembly as though the flow constrictor were fixed in a relaxation state.

The seal assembly of any preceding clause, wherein a ratio of the lower-pressure differential threshold to the comparative pressure differential is from 0.1 to 0.9.

An aeronautical gas turbine engine, comprising: a core engine comprising a rotor, and a seal assembly providing a seal interface with the rotor, wherein the seal assembly comprises: a passive flow regulator, the passive flow regulator comprising: a seal body defining an aspiration conduit, and a flow constrictor comprising one or more flexure elements, the flow constrictor disposed within and/or adjacently upstream of the aspiration conduit.

An aeronautical gas turbine engine, comprising: a core engine comprising a rotor, and a seal assembly providing a seal interface with the rotor, wherein the seal assembly comprises: a passive flow regulator, the passive flow regulator comprising: a seal body defining an aspiration conduit, and a flow constrictor disposed within and/or adjacently upstream of the aspiration conduit; wherein the flow constrictor comprises one or more flexion surfaces in fluid contact with and/or oriented towards a relatively higher-pressure fluid volume; wherein a portion of the flow constrictor and a portion of the aspiration conduit define a variable-resistance pathway therebetween, wherein a variable-resistance pathway-parameter of the variable-resistance pathway changes in correspondence with a changing position of the flow constrictor; and wherein the passive flow regulator exhibits a flow regulation coefficient (k) of from 1 to 9, wherein:

$$(k) = -\log 10 \frac{A_P L^3 \cdot \cos\alpha}{3I \cdot Z_0},$$

wherein ($A_P$) represents a projected area of a sum of the respective one of the one or more flexion surfaces, (L) representing a length of the respective one of the one or more flexion surfaces, (α) represents an angle of incidence of the respective one of the one or more flexion surfaces in relation to the relatively higher-pressure fluid volume, wherein (I) represents an area-moment of inertia of the flow constrictor, and ($Z_0$) represents a nominal value of the variable-resistance pathway-parameter corresponding to a relaxation state of the flow constrictor.

The aeronautical gas turbine engine of any preceding clause, comprising the seal assembly of any preceding clause.

A method of sealing an interface of a rotor of an aeronautical gas turbine engine, the method comprising: flowing a fluid through a seal interface of a seal assembly separating a relatively higher-pressure fluid volume from a relatively lower-pressure fluid volume, the seal assembly comprising a passive flow regulator, and the passive flow regulator comprising a seal body and a flow constrictor, the seal body defining an aspiration conduit providing fluid communication across the seal body, and the flow constrictor disposed within and/or adjacently upstream of the aspiration conduit; and incurring a change to a pressure differential across the flow constrictor, wherein the flow constrictor comprises one or more flexure elements that move in one or more degrees of freedom based at least in part on the pressure differential across the flow constrictor, and the change to the pressure differential across the flow constrictor moving the one or more flexure elements, wherein moving the one or more flexure elements changes a hydraulic resistance of the fluid flowing past the flow constrictor based at least in part on a position of the flow constrictor in relation to the aspiration conduit.

The method of any preceding clause, wherein the method is performed using the seal assembly of any preceding clause.

This written description uses examples to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. The scope of the claims encompasses such other examples that include structural elements that do not differ from the literal language of the claims or that have insubstantial differences from the literal languages of the claims.

What is claimed is:

1. A seal assembly for an aeronautical turbine engine, the seal assembly, comprising:

- a passive flow regulator, the passive flow regulator comprising:
  - a seal body comprising a seal slider and a stator shoe defining a stator face, the seal body defining an aspiration conduit extending through the seal body from the seal slider through the stator face, and
  - a flow constrictor comprising one or more flexure elements and a constrictor element, the flow constrictor disposed within the aspiration conduit between the seal slider and the stator face, wherein both the flexure elements and the constrictor element move as a result of changes in a pressure differential across the passive flow regulator.

2. The seal assembly of claim 1, wherein the aspiration conduit provides fluid communication across the seal body from a relatively higher-pressure fluid volume to a relatively lower-pressure fluid volume.

3. The seal assembly of claim 1, wherein the one or more flexure elements are coupled to or monolithically integrated with the seal body.

4. The seal assembly of claim 1, wherein the constrictor element is coupled to or monolithically integrated with the one or more flexure elements.

5. The seal assembly of claim 4, wherein the constrictor element comprises a geometric configuration that includes at least one of: a polyhedron, a prismatoid, a cylinder, an annulus, or a truncated cone.

6. The seal assembly of claim 1, wherein the aspiration conduit comprises a flexure chamber wherein at least a portion of the flow constrictor is located within the flexure chamber.

7. The seal assembly of claim 6, wherein at least a portion of the flow constrictor and at least a portion of the flexure chamber have a geometrically complementary configuration comprising at least one of: a conical shape, a frusto-conical shape, a pyramid shape, or a frustum shape.

8. The seal assembly of claim 6, wherein at least a portion of the aspiration conduit is located downstream from the flexure chamber.

9. The seal assembly of claim 6, wherein the flow constrictor defines one or more flexure apertures that provide fluid communication through the flexure chamber.

10. The seal assembly of claim 9, wherein the flow constrictor comprises a plurality of constrictor elements, the plurality of constrictor elements defining an orifice or an opening, the orifice or the opening providing fluid communication across the one or more constrictor elements.

11. The seal assembly of claim 1, wherein the flow constrictor exhibits movement in one or more degrees of freedom as a result of changes in a pressure differential across the flow constrictor, the movement changing a hydraulic resistance of fluid flow through the aspiration conduit based at least in part on a position of the flow constrictor in relation to the aspiration conduit.

12. The seal assembly of claim 1, wherein a portion of the flow constrictor and a portion of the aspiration conduit define a variable-resistance pathway therebetween, wherein a variable-resistance pathway-parameter of the variable-resistance pathway changes in correspondence with a changing position of the flow constrictor.

13. The seal assembly of claim 1, wherein the one or more flexure elements comprises a plurality of adjacently disposed flexure elements.

14. The seal assembly of claim 1, wherein the one or more flexure elements are configured and arranged in a cantilevered position.

15. The seal assembly of claim 1, wherein the aspiration conduit comprises an aspiration conduit-inlet, and wherein the flow constrictor at least partially constricts the aspiration conduit-inlet.

16. The seal assembly of claim 1, wherein the one or more flexure elements comprise: a first fixed portion, a second fixed portion, and a flexure portion disposed between the first fixed portion and the second fixed portion, the first fixed portion and the second fixed portion coupled to or monolithically integrated with the seal body.

17. The seal assembly of claim 1, wherein the seal body comprises a flexure chamber, the flexure chamber defining at least a portion of the aspiration conduit, wherein at least a portion of the flow constrictor is located within the flexure chamber;

wherein the seal body defines one or more auxiliary chambers and one or more auxiliary conduits, the one or more auxiliary conduits providing fluid communication between the aspiration conduit and the one or more auxiliary chambers;

wherein the one or more flexure elements comprises a plurality of adjacently disposed flexure elements, the plurality of adjacently disposed flexure elements defining a flexure aperture therebetween, the flexure aperture providing fluid communication through the flexure chamber;

wherein an increase in pressure within the one or more auxiliary chambers above a threshold pressure correspondingly contracts the flexure aperture, and wherein a decrease in pressure within the one or more auxiliary chambers below the threshold pressure correspondingly expands the flexure aperture; and wherein a hydraulic resistance of the flexure aperture depends at least in part on a variable-resistance pathway-parameter comprising a cross-sectional width or area of the flexure aperture.

18. The seal assembly of claim 1, wherein the flow constrictor comprises one or more flexion surfaces in fluid contact with and/or oriented towards a relatively higher-pressure fluid volume;

wherein a portion of the flow constrictor and a portion of the aspiration conduit define a variable-resistance pathway therebetween, wherein a variable-resistance pathway-parameter of the variable-resistance pathway changes in correspondence with a changing position of the flow constrictor; and wherein the passive flow regulator exhibits a flow regulation coefficient (k) of from 1 to 9.

19. A seal assembly for an aeronautical turbine engine, the seal assembly, comprising:

a passive flow regulator, the passive flow regulator comprising:

a seal body defining an aspiration conduit, wherein the seal body comprises a flexure chamber, the flexure chamber defining at least a portion of the aspiration conduit, wherein at least a portion of the flow constrictor is located within the flexure chamber, wherein the seal body defines one or more auxiliary chambers and one or more auxiliary conduits, the one or more auxiliary conduits providing fluid communication between the aspiration conduit and the one or more auxiliary chambers; and a flow constrictor comprising one or more flexure elements, the flow constrictor disposed within and/or adjacently upstream of the aspiration conduit, wherein the one or more flexure elements comprises a plurality of adjacently disposed flexure elements, the plurality of adjacently disposed flexure elements defining a flexure aperture therebetween, the flexure aperture providing fluid communication through the flexure chamber;

wherein an increase in pressure within the one or more auxiliary chambers above a threshold pressure correspondingly contracts the flexure aperture, and wherein a decrease in pressure within the one or more auxiliary chambers below the threshold pressure correspondingly expands the flexure aperture; and wherein a hydraulic resistance of the flexure aperture depends at least in part on a variable-resistance pathway-parameter comprising a cross-sectional width or area of the flexure aperture.

20. A seal assembly for an aeronautical gas turbine engine, the seal assembly comprising:

a passive flow regulator, the passive flow regulator comprising:

a seal body defining an aspiration conduit; and a flow constrictor disposed within and/or adjacently upstream of the aspiration conduit;

wherein the flow constrictor comprises one or more flexion surfaces in fluid contact with and/or oriented towards a relatively higher-pressure fluid volume;

wherein a portion of the flow constrictor and a portion of the aspiration conduit define a variable-resistance pathway therebetween, wherein a variable-resistance pathway-parameter of the variable-resistance pathway changes in correspondence with a changing position of the flow constrictor; and wherein the passive flow regulator exhibits a flow regulation coefficient (k) of from 1 to 9, wherein:

$$(k) = -\log 10 \frac{A_p L^3 \cdot \cos\alpha}{3I \cdot Z_0}$$

wherein (Ap) represents a projected area of a sum of the respective one of the one or more flexion surfaces (L) representing a length of the respective one of the one or more flexion surfaces, (α) represents an angle of incidence of the respective one of the one or more flexion surfaces in relation to the relatively higher-pressure fluid volume, wherein (I) represents an area-moment of inertia of the flow constrictor, and (Z0) represents a nominal value of the variable-resistance pathway-parameter corresponding to a relaxation state of the flow constrictor.

* * * * *